US010412536B2

(12) United States Patent
Gabel

(10) Patent No.: US 10,412,536 B2
(45) Date of Patent: Sep. 10, 2019

(54) PROVIDING SECURE SERVICE PROVIDER REVERSE AUCTIONS USING CERTIFICATION IDENTIFIERS, SYMMETRIC ENCRYPTION KEYS AND ENCRYPTED UNIFORM RESOURCE LOCATORS

(71) Applicant: Minutepros.com Corp., Santa Monica, CA (US)

(72) Inventor: Gershon Gabel, Santa Monica, CA (US)

(73) Assignee: Minutepros.com Corp., Santa Monica, CA (US)

( * ) Notice: Subject to any disclaimer, the term of this patent is extended or adjusted under 35 U.S.C. 154(b) by 65 days.

(21) Appl. No.: 15/691,409

(22) Filed: Aug. 30, 2017

(65) Prior Publication Data
US 2017/0374502 A1 Dec. 28, 2017

Related U.S. Application Data

(63) Continuation-in-part of application No. 15/190,976, filed on Jun. 23, 2016, now Pat. No. 9,763,271.

(51) Int. Cl.
*H04W 12/06* (2009.01)
*H04W 4/02* (2018.01)
(Continued)

(52) U.S. Cl.
CPC ............ *H04W 4/02* (2013.01); *G06F 3/0412* (2013.01); *G06F 3/1423* (2013.01); *G06F 3/167* (2013.01);
(Continued)

(58) Field of Classification Search
CPC ......... H04W 4/02; H04W 76/10; H04W 4/16; H04W 84/12; H04W 4/90; H04W 88/08;
(Continued)

(56) References Cited

U.S. PATENT DOCUMENTS 5,850,442 A * 12/1998 Muftic ................... G06Q 20/02
705/65
6,405,033 B1 6/2002 Kennedy, III
(Continued)

FOREIGN PATENT DOCUMENTS

| JP | 06-119578 A | 4/1994 |
|---|---|---|
| JP | 5151799 B2 | 2/2013 |

(Continued)

OTHER PUBLICATIONS

Kim, Wooyoung, et al. "Web e-speak: Facilitating web-based e-services." IEEE MultiMedia 9.1 (2002): 43-55 (Year: 2002).*

(Continued)

*Primary Examiner* — Marissa Thein
*Assistant Examiner* — Michelle T Kringen
(74) *Attorney, Agent, or Firm* — Knobbe, Martens, Olson & Bear LLP

(57) ABSTRACT

A kiosk system is described that may have multilevel displays and multiple network antennas. Upper level displays may be non-touch and a lower level display may include a touch display. The upper level displays may be affixed to a body of the kiosk using brackets. The kiosk may include first and second network interfaces. The first network interface may be provided to enable user terminals local to the kiosk to wirelessly access network resources via the kiosk system. The second network interface may enable the kiosk to access a remote system. The kiosk may be equipped with a camera, microphone, and/or a speaker.

22 Claims, 49 Drawing Sheets

(51) Int. Cl.

| | |
|---|---|
| G06F 3/041 | (2006.01) |
| G06F 3/14 | (2006.01) |
| H04W 4/16 | (2009.01) |
| G06F 3/16 | (2006.01) |
| G06Q 30/08 | (2012.01) |
| H04N 1/12 | (2006.01) |
| H04W 84/12 | (2009.01) |
| H04W 76/10 | (2018.01) |
| G06Q 10/00 | (2012.01) |
| G06Q 10/10 | (2012.01) |
| G06Q 30/00 | (2012.01) |
| G06Q 30/06 | (2012.01) |
| G06Q 50/18 | (2012.01) |
| G06Q 50/26 | (2012.01) |
| H04W 88/08 | (2009.01) |
| H04W 4/90 | (2018.01) |

(52) U.S. Cl.
CPC .............. *G06Q 10/00* (2013.01); *G06Q 10/10* (2013.01); *G06Q 30/00* (2013.01); *G06Q 30/06* (2013.01); *G06Q 30/08* (2013.01); *G06Q 50/18* (2013.01); *G06Q 50/26* (2013.01); *H04N 1/121* (2013.01); *H04W 4/16* (2013.01); *H04W 12/0609* (2019.01); *H04W 76/10* (2018.02); *H04W 84/12* (2013.01); *H04N 2201/04* (2013.01); *H04W 4/90* (2018.02); *H04W 88/08* (2013.01)

(58) Field of Classification Search
CPC ...... G06F 3/0412; G06F 3/0423; G06F 3/167; G06Q 10/00; G06Q 30/00; G06Q 30/06; G06Q 30/08; G06Q 50/18; G06Q 50/26; G06Q 20/38215; G06Q 20/40975; G06Q 20/40; H04N 1/121; H04N 2201/04
USPC .......................... 705/26.1, 27.1, 26.3, 26.35
See application file for complete search history.

(56) References Cited

U.S. PATENT DOCUMENTS

| | | | |
|---|---|---|---|
| 6,658,389 | B1 | 12/2003 | Alpdemir |
| 7,016,897 | B2 | 3/2006 | Hill et al. |
| 7,398,461 | B1 | 7/2008 | Broder et al. |
| 7,702,524 | B1 | 4/2010 | Whibbs et al. |
| 7,752,054 | B1 | 7/2010 | Anthony-Hoppe et al. |
| 7,769,826 | B2 | 8/2010 | Gustafsson |
| 8,024,317 | B2 * | 9/2011 | Nair ................ G06Q 30/02 707/709 |
| 8,175,230 | B2 | 5/2012 | Bangalore |
| 9,330,275 | B1 | 5/2016 | Endresen |
| 9,412,103 | B1 | 8/2016 | d'Escragnolle |
| 9,426,638 | B1 | 8/2016 | Johnson |
| 9,805,123 | B2 * | 10/2017 | Nair ................ H04L 63/102 |
| 2001/0044735 | A1 | 11/2001 | Colburn et al. |
| 2002/0038233 | A1 * | 3/2002 | Shubov ............ G06Q 30/0611 705/26.4 |
| 2002/0059084 | A1 | 5/2002 | Wahlbin |
| 2002/0091879 | A1 | 7/2002 | Beriker |
| 2002/0115423 | A1 | 8/2002 | Hatae et al. |
| 2003/0028406 | A1 | 2/2003 | Herz et al. |
| 2003/0069744 | A1 | 4/2003 | Craig et al. |
| 2003/0149577 | A1 | 8/2003 | Young et al. |
| 2004/0083395 | A1 | 4/2004 | Blechman |
| 2004/0087301 | A1 | 5/2004 | Tobin |
| 2004/0093280 | A1 | 5/2004 | Yamaguchi |
| 2005/0010563 | A1 | 1/2005 | Gross et al. |
| 2005/0033641 | A1 | 2/2005 | Jha et al. |
| 2005/0035208 | A1 | 2/2005 | Elliot |
| 2005/0099272 | A1 | 5/2005 | Kuo |
| 2005/0102159 | A1 | 5/2005 | Mondshine |
| 2006/0085216 | A1 | 4/2006 | Guerrero |
| 2006/0108063 | A1 | 5/2006 | Umemoto et al. |
| 2006/0193004 | A1 | 8/2006 | Wasilewski |
| 2007/0011128 | A1 | 1/2007 | Meyers |
| 2007/0176743 | A1 | 8/2007 | Murphy |
| 2007/0179818 | A1 | 8/2007 | Magnus |
| 2007/0179845 | A1 | 8/2007 | Jain |
| 2007/0179846 | A1 | 8/2007 | Jain et al. |
| 2007/0179847 | A1 | 8/2007 | Jain |
| 2007/0179848 | A1 | 8/2007 | Jain et al. |
| 2007/0179849 | A1 | 8/2007 | Jain |
| 2007/0179853 | A1 | 8/2007 | Feige et al. |
| 2007/0204164 | A1 * | 8/2007 | Cattrone ............ H04N 1/32101 713/176 |
| 2007/0260520 | A1 | 11/2007 | Jha et al. |
| 2007/0294258 | A1 | 12/2007 | Caldwell |
| 2008/0010077 | A1 * | 1/2008 | Hasseler ............ G06Q 30/0641 705/80 |
| 2008/0065726 | A1 | 3/2008 | Schoenberg |
| 2008/0103823 | A1 | 5/2008 | Papa |
| 2008/0192129 | A1 | 8/2008 | Walker |
| 2008/0306996 | A1 | 12/2008 | McClellan et al. |
| 2009/0198521 | A1 | 8/2009 | Barker |
| 2009/0276708 | A1 | 11/2009 | Smith |
| 2010/0004989 | A1 | 1/2010 | Bonalle et al. |
| 2010/0231714 | A1 | 9/2010 | Flores |
| 2011/0058326 | A1 | 3/2011 | Idems |
| 2011/0099116 | A1 | 4/2011 | Gabel |
| 2011/0167059 | A1 * | 7/2011 | Fallah ................ G06Q 30/08 707/723 |
| 2011/0173549 | A1 | 7/2011 | Hipskind |
| 2011/0222784 | A1 | 9/2011 | Rowe |
| 2011/0290871 | A1 | 12/2011 | Jon |
| 2012/0109690 | A1 | 5/2012 | Weinrauch |
| 2012/0129577 | A1 | 5/2012 | Vaknin |
| 2012/0232980 | A1 | 9/2012 | Wald |
| 2012/0322401 | A1 | 12/2012 | Collins |
| 2013/0078916 | A1 | 3/2013 | Glickman |
| 2013/0173287 | A1 | 7/2013 | Cashman |
| 2013/0182002 | A1 | 7/2013 | Macciola |
| 2013/0263227 | A1 | 10/2013 | Gongaware |
| 2013/0297353 | A1 | 11/2013 | Strange |
| 2013/0325943 | A1 | 12/2013 | Al-Harthi |
| 2013/0335027 | A1 | 12/2013 | Xin |
| 2014/0040287 | A1 | 2/2014 | Frome |
| 2014/0114691 | A1 | 4/2014 | Pearce |
| 2014/0123300 | A1 * | 5/2014 | Jung ................ G06F 21/44 726/26 |
| 2014/0203071 | A1 | 7/2014 | Eggert |
| 2014/0279149 | A1 * | 9/2014 | Barlow ................ G06Q 30/08 705/26.3 |
| 2014/0297100 | A1 | 10/2014 | Miura |
| 2014/0365281 | A1 | 12/2014 | Onischuk |
| 2014/0368601 | A1 | 12/2014 | deCharms |
| 2015/0009327 | A1 | 1/2015 | Love |
| 2015/0026174 | A1 | 1/2015 | Nuggehalli |
| 2015/0081362 | A1 | 3/2015 | Chadwick |
| 2015/0087265 | A1 * | 3/2015 | Disraeli ................ H04W 12/06 455/411 |
| 2015/0127570 | A1 | 5/2015 | Doughty |
| 2015/0172894 | A1 | 6/2015 | Gabel |
| 2015/0223348 | A1 | 8/2015 | Sagar et al. |
| 2015/0294431 | A1 | 10/2015 | Fiorucci |
| 2015/0339888 | A1 | 11/2015 | Hong et al. |
| 2015/0341225 | A1 | 11/2015 | Baarman |
| 2015/0350440 | A1 * | 12/2015 | Steiner ................ H04M 3/5232 379/266.01 |
| 2015/0350463 | A1 | 12/2015 | Moore |
| 2015/0363485 | A1 * | 12/2015 | Bennett ............ G06F 17/30646 707/694 |
| 2016/0098690 | A1 | 4/2016 | Silva et al. |
| 2016/0132849 | A1 | 5/2016 | Melo et al. |
| 2016/0154991 | A1 | 6/2016 | Berini |

(56) References Cited

U.S. PATENT DOCUMENTS

2016/0171596 A1  6/2016  Angerbauer et al.
2016/0294199 A1  10/2016  Poffinbarger, II

FOREIGN PATENT DOCUMENTS

KR   10-2003-0008655 A   1/2003
KR       10-1095156 B1   12/2011
WO   WO 2015/0095235     6/2015

OTHER PUBLICATIONS

U.S. Appl. No. 62/029,4246, filed Feb. 11, 2016, Gabel.
HispanicMarketWeekly, Referral Services: Legal and Medical, Published: Apr. 3, 2008 (http://www.hispanicmarketweekly.com/featureArticle.cms?id=972&mode=print), 2 pages, parent.
International Search Report for International Application No. PCT/US2014/070670, dated Apr. 13, 2015, 3 pp., parent.
LegalMatch, Find the Right Lawyer Now!, Copyright 1999-2010 http://web.archive.org/web/20091027232223/http://www.legalmatch.com/), 1 page, parent.
Office Action from Mexican Patent Application No. MX/a/2010/010404, dated Sep. 1, 2012, 3 pages, parent.
Written Opinion of the International Searching Authority for International Application No. PCT/US2014/070670, dated Apr. 13, 2015, 6 pp., parent.
U.S. Appl. No. 15/048,834, filed Feb. 19, 2016, Gabel.

* cited by examiner

FIG. 9A1

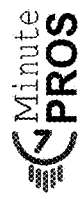

SIGN UP

Already have a MinutePros account? Login

Let's get started!
First tell us what you are looking for.

I am looking for an attorney
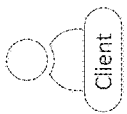
Client

Set your maximum budget for legal fees, post your case and start a reverse auction

I want to defend a client
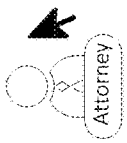
Attorney

Go through the approval process, buy bid credit and start competing in a reverse auction Copyright © 2016 MinutePros. All rights reserved | MinutePros is a Grupo MedLegal ® company | Privacy Policy | Terms of Service

FIG. 9C

REGISTER- A / ATTORNEY

Become a MinutePros verified attorney and start bidding!

What is your website address?

[www.minutepros] [.com]

What is your bar membership registered address?

- First name
- Last name
- Address 1
- Address 2
- City
- State
- Zip Code
- Work Phone
- Cell Phone

| State bar association | State bar membership number |
|---|---|
| California State Bar, San Francisco | |
| | |

| Local bar association | Local bar membership number |
|---|---|
| Alameda County Bar Association | |

What is your area of practice? *Please choose just one, you will be able to add more right below*

- Immigration
- Personal Injury
- Car Accidents
- Criminal
- Divorce

Where are you licensed to practice the selected specialty?

- California
- Florida
- Illinois
- New Jersey
- New York
- Pennsylvania
- All US States ( + Add another practice area )

○ Yes, I understand that MinutePros will send me a letter with a pin on the above address and I will have to login to my MinutePros account and type the pin where is indicated in order to start bidding on cases. Until then I will only be able to browse.

○ I confirm that I am insured for at least $100,000 per claim under a policy of professional liability insurance.

( Submit )

Minute PROS
*Pros in a minute by the minute.™*

ACTIVITY / WON / LEAVE FEEDBACK FOR @CLIENT

New Case Alerts ⌄ ( Get Bid Credit )  USD $0.00 ⌄ ( Start Bidding ) ?  👤 🗓 🔔

Search Cases...  All Specialties ⌄  All Locations ⌄  ( SEARCH )

Activity

Featured Cases

⌄ Bids
   Live
   Won
   Didn't win

⌄ Reviews
   Feedback left for you
   Feedback left for others

| Activity | Messages (3) | Account | Billing |

Leave feedback for @antonio83

Rate the service received
○ Positive  ○ Neutral  ○ Negative  ○ I'll leave feedback later

Tell us more  80 characters left

[                                                                ]

Rate details
Did the attorney demonstrate job knowledge?  ★★☆☆☆
How quickly did the attorney respond to you inquiries?  ☆☆☆☆☆
Did the attorney deliver the desired results?  ★★★★★

( Leave feedback )  ( Cancel )

*Once you leave feedback you can't edit or take it back*

---

Minute PROS
*Pros in a minute by the minute.™*

CONTACT US
📞 1 844 606 0604
✉ support@minutepros.com

HANDY LINKS
Attorneys
Clients
⊕ How it Works
Blog
Sign Up
Login

FIND US
California
Florida
Illinois
New York
New Jersey
Pennsylvania

FOLLOW US
f  ⓨ  ◉  ⊙  G+

SUBSCRIBE TO NEWSLETTER
[ user@email.com ]  ( Go )
☐ *By sending your email in the list of MinutePros you agree that you agree to receive messages for marketing purposes. You can unsubscribe at any time.*

⊕ English ⌄

Copyright © 2016 MinutePros. All rights reserved  |  MinutePros is a Grupo Medialegal™ company  |  Privacy Policy  |  Terms of Service  |  Site Map

FIG. 9L

Minute PROS
*Pros in a minute by the minute.™*

New Case Alerts › ( Get Bid Credit )  USD $0.00 ⌄  ( Start Bidding )  ?  🌐  ⊞  👤

ACTIVITY / DIDN'T WIN

Search Cases...

All Specialties ⌄ | All Locations ⌄ | ( SEARCH )

🔍 Activity

| Activity | Messages (3) | Account | Billing |

Featured Cases                                    Sort: Time: Recently Ended ⌄

⌄ Bids
   Live
   Won

| Case Title | WINNING BID | Starting Bid: $7,000 |
| Immigration ¦ California | US $ 6,780.00 | Bid decrement: $10.00 |
| @client  ⭐ 5.0 | @marcotorres23 | Credit charge per bid: $2,090.00 |
| | ( view similar cases ) | Time decrement: 20 sec. |
| | | 5 Bidders |

Didn't win

⌄ Reviews
   Feedback left for you
   Feedback left for others

| Case Title | WINNING BID | Starting Bid: $7,000 |
| Immigration ¦ California | US $ 6,780.00 | Bid decrement: $10.00 |
| @client  ⭐ 5.0 | @marcotorres23 | Credit charge per bid: $2,090.00 |
| | ( view similar cases ) | Time decrement: 20 sec. |
| | | 5 Bidders |

---

Minute PROS
*Pros in a minute by the minute.™*

CONTACT US
📞 1 844 606 0604
✉ support@minutepros.com

HANDY LINKS
Attorneys
Client:
ⓘ How it Works
Blog
Sign Up
Login

FIND US
California
Florida
Illinois
New York
New Jersey
Pennsylvania

FOLLOW US
f  🐦  📷  G+

SUBSCRIBE TO NEWSLETTER
[ user@email.com ]  ( Go )
☐ By providing your email to the list of MinutePros you declare that you agree to receive messages for marketing purposes. You can unsubscribe at any time.

Copyright© 2016 MinutePros. All rights reserved | MinutePros is a Grupo MedLegal™ company | Privacy Policy | Terms of Service | Site Map     ⊕ English ⌄

ACCOUNT / VERIFY MOBILE

MinutePros
Pros in a minute by the minute.℠

New Case Alerts > (Get Bid Credit) USD $0.00 ∨ (Start Bidding) ? 🔍 ⌨ 👤

[Search Cases...] All Specialties ∨ All Locations ∨ (SEARCH)

| Activity | Messages | Account | Billing |

Account

- Profile
- Bar Membership
- Practice Areas
- Verify PIN
- Verify Mobile
- Change Password
- Email Notifications
- Close My Account Your phones:

(202) 390-7977 Verified Change | primary
+44 7881 564635 Verified Change | remove | Make primary
+44 7881 545566 Verified Change | remove | Make primary + Add another mobile phone number You have 2 registered phones, but none are activated for text messaging.

☐ By activating text messaging, I consent to receive text notifications so as to enable the auction process to function properly.

(Activate Text Messaging)  (Cancel)

Already received a confirmation code?

[Confirmation code]  (Confirm)

---

MinutePros
Pros in a minute by the minute.℠

CONTACT US
📞 1 844 606 0604
✉ support@minutepros.com

HANDY LINKS
Attorneys
Clients
⊙ How it Works
Blog
Sign Up
Login

FIND US
California
Florida
Illinois
New York
New Jersey
Pennsylvania

FOLLOW US
f  𝕏  ▢  ⊙  G+

SUBSCRIBE TO NEWSLETTER
[user@email.com]  (Go)
☐ By enrolling your email in the list of MinutePros you declare that you agree to receive messages for marketing purposes. You can unsubscribe at any time.

Copyright© 2016 MinutePros. All rights reserved. | MinutePros is a Grupo MediLegal® company | Privacy Policy | Terms of Service | Site Map    ⊙ English ∨

BILLING / PAYMENT HISTORY

Minute PROS — New Case Alerts › [Get Bid Credit]    USD $0.00   [Start Bidding]   ?   🔔   ⊞

Search Cases...

| All Specialties ∨ | | | All Locations ∨ | | [SEARCH] |
|---|---|---|---|---|---|

Billing

- Bids
  - Bid packs
  - New case alert plans
- Billing methods
  - Auto recharge
  - Redeem voucher
  - Purchase history
- Earnings
  - Get paid
  - Earnings history

| Activity | Messages (3) | Account | Billing | | |
|---|---|---|---|---|---|
| Case Alert Plans ∨ | Bid Packs ∨ | Date Purchased ∨ | Payments ∨ | Billing Method ∨ | Ballance ∨ |
| Close Plan | Medium Pck | 16/10/2016 | $0.00 | Credit Card | $0.00 |
| Quick Plan | Large Pack | 01/10/2016 | $0.00 | PayPal | $0.00 |
| Early Plan | Small Pack | 09/09/2016 | $0.00 | Paypal | |
| Rush Plan | Large Plan | 04/05/2016 | $0.00 | Credit Card | $0.00 |

Minute PROS — Pros in a minute by the minute.™

HANDY LINKS
- Attorneys
- Clients
- ⓘ How it Works
- Blog
- Sign Up
- Login

FIND US
- California
- Florida
- Illinois
- New York
- New Jersey
- Pennsylvania

FOLLOW US
f   ▶   ■   ◎   G+

SUBSCRIBE TO NEWSLETTER

[user@email.com]   [Go]

☐ By encoding your email to the list of MinutePros you declare that you agree to receive messages for marketing purposes. You can unsubscribe at any time.

CONTACT US
📞 1 844 606 0604
✉ support@minutepros.com

Copyright© 2016 MinutePros. All rights reserved | MinutePros is a Grupo MedLegal® company | Privacy Policy | Terms of Service | Site Map    ⊕ English ∨

FIG. 9W

CREATE A FREE CLIENT ACCOUNT

Minute PROS
Pros in a minute by the minute.™

Already have a MinutePros account?   Login

Minute PROS
Pros in a minute by the minute.™

YOU ARE ABOUT TO SUBSCRIBE TO THE LEADING LEGAL SERVICE REVERSE AUCTION WEBSITE IN THE US.

With 35 years of experience in the sector the benefits are numerous, and include the following:

- Legal fees are within your budget
- You get legal help within minutes
- You hire expert local attorneys
- You can leave a review for their work

Create a Free Client Account
Looking to work? Sign up as an attorney

First name | Last name

Email Address

Cell Phone

Username

Password    ● Show

Must be at least 8 characters, use at least one letter and number or symbol

○ Yes! Send me genuinely useful emails every now and then to help me get the most out of MinutePros.
○ Yes! I understand and agree to the MinutePros Terms of service and Privacy Policy.

Get Started

Copyright © 2016 MinutePros. All rights reserved | MinutePros is a Grupo MedLegal® company | Privacy Policy | Terms of Service

ACTIVITY / SUBMITTED

Minute PROS
Pros in a minute by the minute.™

Search Cases...

New Case Alerts | Get Bid Credit | ? | 🔔 | ▦ | 👤

All Specialties | Account | All Locations | Billing | SEARCH

Activity

My cases
- Live

Submitted
- Scheduled
- Working
- Ended
- Drafts

✓ Reviews
- Feedback left for you
- Feedback left for others

| Activity | Messages |
|---|---|
| Specialty | Starting Bid |
| Criminal (Case Details) | $0.00 |
| Divorce (Case Details) | $0.00 |
| Immigration (Case Details) | $0.00 |
| Car Accident (Case Details) | $0.00 |

Minute PROS
Pros in a minute by the minute.™

CONTACT US
📞 1 844 606 0604
✉ support@minutepros.com

HANDY LINKS
- Attorneys
- Clients
- How It Works
- Blog
- Sign Up
- Login

FIND US
- California
- Florida
- Illinois
- New York
- New Jersey
- Pennsylvania

FOLLOW US
f  🐦  ▦  G+

SUBSCRIBE TO NEWSLETTER
user@email.com  Go

☐ By entering your email into the list of MinutePros you declare that you agree to receive messages for marketing purposes. You can unsubscribe at any time.

Copyright © 2016 MinutePros. All rights reserved. | MinutePros is a Grupo MediLegal® company | Privacy Policy | Terms of Service | Site Map | 🌐 English ▼

FIG. 9JJ

Minute PROS
*Pros in a minute by the minute.*

ACTIVITY / WORKING

Invite a Attorney | Submit a case | ? | 🦆 | 🎛️ | 👤

Search Cases...

Activity

Submit a case

My cases
- Live
- Submitted
- Scheduled

Working
- Ended
- Drafts
- Reviews
  - Feedback left for you
  - Feedback left for others

| Activity | | Messages | | Account | | Billing | | |
|---|---|---|---|---|---|---|---|---|
| All Specialties ∨ | | | | All Locations ∨ | | SEARCH | | |
| Specialty ∨ | Attorney ∨ | Auction Started ∨ | Auction Ended ∨ | Starting Budget ∨ | Winning Bid ∨ | Budget Saved ∨ |
| Criminal | @attorney0189 | 16/10/2016 | 17/10/2016 | $0.00 | $0.00 | $0.00 |
| Divorce | @attorney0189 | 01/10/2016 | 02/10/2016 | $0.00 | $0.00 | $0.00 |
| Immigration | @attorney0189 | 09/09/2016 | 10/09/2016 | $0.00 | $0.00 | $0.00 |
| Car Accident | @attorney0189 | 04/05/2016 | 05/05/2016 | $0.00 | $0.00 | $0.00 |

(Case Details buttons beside Criminal, Divorce, Immigration, Car Accident)

Minute PROS
*Pros in a minute by the minute.*

| HANDY LINKS | FIND US | FOLLOW US |
|---|---|---|
| Attorneys | California | f 🐦 ▶ |
| Clients | Florida | 📷 G+ |

Minute PROS — Pros in a minute by the minute.™

ACTIVITY / ENDED

Search Cases....   Invite a Attorney ˅   Submit a case   ?

Activity

| Activity | Messages | Account | Billing | | | |
|---|---|---|---|---|---|---|
| | All Specialties ˅ | All Locations ˅ | | | | SEARCH |
| Specialty ˅ | Auction Started ˅ | Auction Ended ˅ | Starting Budget ˅ | Winning Bid ˅ | Budget Saved ˅ | Status ˅ |
| Criminal | 16/10/2016 | 17/10/2016 | $0.00 | $0.00 | $0.00 | Completed |
| Divorce | 01/10/2016 | 02/10/2016 | $0.00 | $0.00 | $0.00 | Incomplete |
| Immigration | 09/09/2016 | 10/09/2016 | $0.00 | $0.00 | $0.00 | Incomplete |
| Car Accident | 04/05/2016 | 05/05/2016 | $0.00 | $0.00 | $0.00 | Incomplete |

˅ My cases
- Live — Case Details
- Submitted — Case Details
- Scheduled — Case Details
- Working — Case Details

Ended
- Drafts
- ˅ Reviews
  - Feedback left for you
  - Feedback left for others

---

Minute PROS — Pros in a minute by the minute.™

CONTACT US
📞 1 844 606 0604
✉ support@minutepros.com

HANDY LINKS
- Attorneys
- Clients
- ⚙ How it Works
- Blog
- Sign Up
- Login

FIND US
- California
- Florida
- Illinois
- New York
- New Jersey
- Pennsylvania

FOLLOW US
f ⌨ ▪ ◉ G+

SUBSCRIBE TO NEWSLETTER
[ user@email.com ] [ Go ]
☐ By enrolling your email in the list of MinutePros you declare that you agree to receive messages for marketing purposes. You can unsubscribe at any time.

Copyright© 2016 MinutePros. All rights reserved  |  MinutePros is a Grupo MedLegal® company  |  Privacy Policy  |  Terms of Service  |  Site Map    🌐 English ˅

Minute PROS
*Pros in a minute by the minute.™*

ACCOUNT / PROFILE CLIENT

Search Cases...    Invite an Attorney »  ( Submit a case )  ?  👥  ▦  👤

| Activity | All Specialties ∨ | | All Locations ∨ | SEARCH |

Account

Profile

Address
Verify mobile
Change Password
Email Notifications
Close My Account

| | Messages | Account | Billing |

Cristina Quintanilla
★★★★★  5.0
@Cristin23

Time Zone:
UTC-05:00 Eastern Time (US & Canada) ∨
UTC-08:00 Pacific Time (US & Canada)
UTC-06:00 Central Time (US & Canada)

Member since October 2016

| Cases Stats | Won |
|---|---|
| 8 Submitted | 1 Immigration |
| 4 Scheduled | 1 Criminal |
| 1 Rejected | |
| 2 Working | |
| 2 Completed | |
| 4 Drafts | |
| Spent | Earned |
| USD $4,300 | USD $700 |

Minute PROS
*Pros in a minute by the minute.™*

CONTACT US
📞 1 844 606 0604
✉ support@minutepros.com

HANDY LINKS
Attorneys
Clients
How it Works
Blog
Sign Up
Login

FIND US
California
Florida
Illinois
New York
New Jersey
Pennsylvania

FOLLOW US
f  🐦  ▶  ⓘ  G+

SUBSCRIBE TO NEWSLETTER
user@email.com  [ Go ]

☐ By enrolling your email in the list of MinutePros you declare that you agree to receive messages for marketing purposes. You can unsubscribe at any time.

Copyright © 2016 MinutePros. All rights reserved  | MinutePros is a Grupo MediLegal® company | Privacy Policy | Terms of Service | Site Map  🌐 English ∨

PROVIDING SECURE SERVICE PROVIDER REVERSE AUCTIONS USING CERTIFICATION IDENTIFIERS, SYMMETRIC ENCRYPTION KEYS AND ENCRYPTED UNIFORM RESOURCE LOCATORS

BACKGROUND OF THE INVENTION

Field of the Invention

This disclosure relates in general to the field of communications and, more particularly, to managing and distributing content via a network environment.

Description of the Related Art

Broadband networks have become ever more important to adequately access online environments. However, large numbers of people still do not have ready access to broadband networks and so are precluded from adequately accessing many online services.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the disclosure relates to a kiosk, the kiosk comprising: a body; an antenna mounted to the body; two or more weather-sealed displays attached, using bolts and/or brackets, to the body above a first vertical level, wherein display portions of the two or more weather-sealed displays attached to the body above the first vertical level are non-touch and optionally the first vertical level is at least 4 feet; a first wireless network interface coupled to the antenna; a second network interface; a weather-sealed touch display positioned at a second level lower than the first level; a camera; a microphone; a computing system comprising at least a computing device and non-transitory memory that stores program instructions executable by the computing device to perform operations comprising: enable user terminals to wirelessly connect to the first wireless network interface; receive via the second network interface content from a remote system; display at least a portion of the received content on the two or more weather-sealed non-touch displays attached to the body above the first vertical level; display an accident, immigration, and/or matrimonial incident reporting user interface via the touch display positioned at the second level; populate at least a portion of the reporting user interface with a user input provided via a keyboard and/or via the microphone; perform a geolocation operation to determine location information related to the report; securely transmit using the second network interface at least a portion of the user input used to populate the reporting user interface and the location information to a remote system.

Optionally, the user input used to populate the accident reporting user interface comprises user contact information, accident location information, an indication as to whether the user was a driver of a vehicle involved in the accident, an indication as to how many people were injured in the accident, a description on injuries, a description of property damage, media recordings related to the accident, insurance information, whether the user is above a first age, whether the user is a citizen of the country where the accident occurred, whether the user is lawfully in the country where the accident occurred.

Optionally, at least partly in response to receiving user input used to populate the reporting user interface, the remote system: identifies service providers that can provide service related to the reported incident to the user that meet one or more criteria; transmits over a network a notification to destinations associated with the identified service providers regarding: the reported incident subject matter, a start time for a reverse auction to bid on providing the user with reported incident related service, an auction length, a bid period, and a bid emolument that will be charged for a submitted bid, the notification further comprising a control via which a service provider may indicate an interest in participating in the reverse auction; at least partly in response to an interest indication received from a given service provider terminal, provides the given service provider via a service provider terminal with anonymized user reported information; in response to receipt of a first bid comprising a first bid amount, transmits the first bid amount to destinations associated with service providers that indicated an interest in participating in the reverse auction, wherein the first bid amount is displayed in association with a countdown clock corresponding to the bid period; determines whether another bid for a bid amount lower than the first bid amount was received within the bid period; at least partly in response to a determination that another bid for a bid amount lower than the first bid amount was not received within the bid period, terminates the auction; transmits to the user terminal a subset of the bids received in association with information, including a respective service provider website link, regarding the service providers that submitted the subset of bids; receives a bid selection by the user; transmits non-anonymized user reported information to the service provider that submitted the bid selected by the user.

Optionally, at least partly in response to receiving user input used to populate the reporting user interface, the remote system: identifies a first plurality of service providers that can provide service related to the reported incident to the user that meet one or more criteria; transmits over a network a notification to destinations associated with the identified first plurality of service providers regarding: the reported incident subject matter, a start time for a reverse auction to bid on providing the user with a report incident related service, an auction length, a bid period, and a bid emolument that will be charged for a submitted bid; provides at least a portion of the first plurality of service providers with anonymized user reported information; in response to receipt of a first bid comprising a first bid amount, transmits the first bid amount to destinations associated with at least a portion of the first plurality of service providers, wherein the first bid amount is displayed in association with a countdown clock corresponding to the bid period; determines whether another bid for a bid amount lower than the first bid amount was received within the bid period; at least partly in response to a determination that another bid for a bid amount lower than the first bid amount was not received within the bid period, terminates the auction; transmits to the user terminal at least a portion of the bids received in association with information, including a respective service provider website link, regarding respective service providers;

receives a bid selection by the user; determines whether the user has selected the lowest bid; at least partly in response to determining that the user has not selected the lowest bid, refunding bid emoluments to the service provider that provided the lowest bid; transmits non-anonymized user reported information to the service provider that submitted the bid selected by the user.

Optionally, at least partly in response to receiving user input used to populate the reporting user interface, the remote system: identifies a first plurality of service providers that can provide service related to the reported incident to the user that meet one or more criteria; transmits a notification to destinations associated with the identified first plurality of service providers regarding: the reported incident subject matter, a start time for a reverse auction to bid on providing the user with a report related service, an auction length, a bid period, and a bid emolument that will be charged for a submitted bid; provides at least a portion of the first plurality of service providers with anonymized user reported information; in response to receipt of a first bid comprising a first bid amount, transmits the first bid amount to destinations associated with at least a portion of the first plurality of service providers, wherein the first bid amount is displayed in association with a countdown clock corresponding to the bid period; determines whether another bid for a bid amount lower than the first bid amount was received within the bid period; at least partly in response to a determination that another bid for a bid amount lower than the first bid amount was not received within the bid period, terminates the auction; transmits to the user terminal at least a subset of the bids received in association with information, including a respective service provider website link, regarding the service providers that submitted the subset of bids; determines that the user has declined to accept a bid from the subset of bids; if the user has declined to accept a bid from the subset of bids, refund bid emoluments to the service providers that were charged emoluments for submitting bids.

Optionally, at least partly in response to receiving user input used to populate the reporting user interface, the remote system: identifies a first plurality of service providers that can provide service related to the reported incident to the user that meet one or more criteria; transmits a notification to destinations associated with the identified first plurality of service providers regarding: the reported incident subject matter, a start time for a reverse auction to bid on providing the user with a reported incident related service, an auction length, a bid period, and a bid emolument that will be charged for a submitted bid; provides at least a portion of the first plurality of service providers with anonymized user reported information; in response to receipt of a first bid comprising a first bid amount, transmits the first bid amount to destinations associated with at least a portion of the first plurality of service providers, wherein the first bid amount is displayed in association with a countdown clock corresponding to the bid period; determines whether another bid for a bid amount lower than the first bid amount was received within the bid period; at least partly in response to a determination that another bid for a bid amount lower than the first bid amount was not received within the bid period, terminates the auction; transmits to the user terminal a subset of the bids received in association with information, including a respective service provider website link, regarding the service providers that submitted the subset of bids; determines that the user has declined to accept a bid from the subset of bids; determines whether more than a first threshold number of service providers submitted bids; at least partly in response to determining that more than the first threshold number of service providers submitted bids and the user has declined to accept a bid from the subset of bids, refunds bid emoluments to the service providers that were charged emoluments for submitting bids and charges the user a emolument.

Optionally, at least partly in response to receiving user input used to populate the reporting user interface, the remote system: identifies service providers that can provide service related to the reported incident to the user that meet one or more criteria; transmits over a network a notification to destinations associated with the identified service providers regarding: the reported incident subject matter, a start time for a reverse auction to bid on providing the user with reported incident related service, and a bid emolument that will be charged for a submitted bid; provides one or more of the identified service provider, via a service provider terminal, with anonymized user reported information; transmits to the user terminal at least a subset of the bids received in association with information regarding the service providers that submitted the subset of bids; receives a bid selection by the user; transmits non-anonymized user reported information to the service provider that submitted the bid selected by the user.

Optionally, the kiosk further comprises: a document scanner comprising a document feeder, wherein the document scanner is configured to receive the document via the document feeder, identify a document type for the document, and dynamically determine an image compression level based at least in part on the document type. Optionally, kiosk system is configured to detect an accident based at least in part on audible sounds received by the microphone, wherein based at least in part on the detected accident, content is selected and displayed via at least one of the kiosk system displays. Optionally, the kiosk further comprises or is in operative communication with a speech recognition system, the speech recognition system configured to receive user voice input and to populate one or more accident reporting user interface fields.

An aspect of the disclosure relates to a terminal system, comprising: a body; a plurality of antennas mounted to or within the body (e.g., Wi-Fi, Bluetooth, and/or cellular antennas); at least one touch display; a first wireless network interface coupled to a first of the plurality of antennas; a second wireless network interface coupled to a second of the plurality of antennas; a camera; a microphone; a computing system comprising at least a computing device and non-transitory memory that stores program instructions executable by the computing device to perform operations comprising: enable electronic devices to wirelessly connect to the first wireless network interface; receive via the second wireless network interface content from a remote system; display at least a portion of the received content on the touch display; display an accident, immigration, and/or matrimonial incident reporting user interface via the touch display; populate at least a portion of the reporting user interface with a user input provided via a keyboard and/or via the microphone; perform a geolocation operation to determine location information related to the report; securely transmit using the second wireless network interface at least a portion of the user input used to populate the reporting user interface and the location information to a remote system.

Optionally, with respect to the terminal system, the user input used to populate the accident reporting user interface comprises user contact information, accident location information, an indication as to whether the user was a driver of a vehicle involved in the accident, an indication as to how many people were injured in the accident, a description on injuries, a description of property damage, media recordings related to the accident, insurance information, whether the user is above a first age, whether the user is a citizen of the country where the accident occurred, whether the user is lawfully in the country where the accident occurred.

Optionally, at least partly in response to receiving user input used to populate the reporting user interface, the remote system: identifies service providers that can provide service related to the reported incident to the user that meet one or more criteria; transmits over a network a notification to destinations associated with the identified service providers regarding: the reported incident subject matter, a start time for a reverse auction to bid on providing the user with reported incident related service, an auction length, a bid period, and a bid emolument that will be charged for a submitted bid, the notification further comprising a control via which a service provider may indicate an interest in participating in the reverse auction; at least partly in response to an interest indication received from a given service provider terminal, provides the given service provider via a service provider terminal with anonymized user reported information; in response to receipt of a first bid comprising a first bid amount, transmits the first bid amount to destinations associated with service providers that indicated an interest in participating in the reverse auction, wherein the first bid amount is displayed in association with a countdown clock corresponding to the bid period; determines whether another bid for a bid amount lower than the first bid amount was received within the bid period; at least partly in response to a determination that another bid for a bid amount lower than the first bid amount was not received within the bid period, terminates the auction; transmits to the user terminal a subset of the bids received in association with information, including a respective service provider website link, regarding the service providers that submitted the subset of bids; receives a bid selection by the user; transmits non-anonymized user reported information to the service provider that submitted the bid selected by the user.

Optionally, at least partly in response to receiving user input used to populate the reporting user interface, the remote system: identifies a first plurality of service providers that can provide service related to the reported incident to the user that meet one or more criteria; transmits over a network a notification to destinations associated with the identified first plurality of service providers regarding: the reported incident subject matter, a start time for a reverse auction to bid on providing the user with a report incident related service, an auction length, a bid period, and a bid emolument that will be charged for a submitted bid; provides at least a portion of the first plurality of service providers with anonymized user reported information; in response to receipt of a first bid comprising a first bid amount, transmits the first bid amount to destinations associated with at least a portion of the first plurality of service providers, wherein the first bid amount is displayed in association with a countdown clock corresponding to the bid period; determines whether another bid for a bid amount lower than the first bid amount was received within the bid period; at least partly in response to a determination that another bid for a bid amount lower than the first bid amount was not received within the bid period, terminates the auction; transmits to the user terminal at least a portion of the bids received in association with information, including a respective service provider website link, regarding respective service providers; receives a bid selection by the user; determines whether the user has selected the lowest bid; at least partly in response to determining that the user has not selected the lowest bid, refunding bid emoluments to the service provider that provided the lowest bid; transmits non-anonymized user reported information to the service provider that submitted the bid selected by the user.

Optionally, at least partly in response to receiving user input used to populate the reporting user interface, the remote system: identifies a first plurality of service providers that can provide service related to the reported incident to the user that meet one or more criteria; transmits a notification to destinations associated with the identified first plurality of service providers regarding: the reported incident subject matter, a start time for a reverse auction to bid on providing the user with a report related service, an auction length, a bid period, and a bid emolument that will be charged for a submitted bid; provides at least a portion of the first plurality of service providers with anonymized user reported information; in response to receipt of a first bid comprising a first bid amount, transmits the first bid amount to destinations associated with at least a portion of the first plurality of service providers, wherein the first bid amount is displayed in association with a countdown clock corresponding to the bid period; determines whether another bid for a bid amount lower than the first bid amount was received within the bid period; at least partly in response to a determination that another bid for a bid amount lower than the first bid amount was not received within the bid period, terminates the auction; transmits to the user terminal at least a subset of the bids received in association with information, including a respective service provider website link, regarding the service providers that submitted the subset of bids; determines that the user has declined to accept a bid from the subset of bids; if the user has declined to accept a bid from the subset of bids, refund bid emoluments to the service providers that were charged emoluments for submitting bids.

Optionally, at least partly in response to receiving user input used to populate the reporting user interface, the remote system: identifies a first plurality of service providers that can provide service related to the reported incident to the user that meet one or more criteria; transmits a notification to destinations associated with the identified first plurality of service providers regarding: the reported incident subject matter, a start time for a reverse auction to bid on providing the user with a reported incident related service, an auction length, a bid period, and a bid emolument that will be charged for a submitted bid; provides at least a portion of the first plurality of service providers with anonymized user reported information; in response to receipt of a first bid comprising a first bid amount, transmits the first bid amount to destinations associated with at least a portion of the first plurality of service providers, wherein the first bid amount is displayed in association with a countdown clock corresponding to the bid period; determines whether another bid for a bid amount lower than the first bid amount was received within the bid period; at least partly in response to a determination that another bid for a bid amount lower than the first bid amount was not received within the bid period, terminates the auction; transmits to the user terminal a subset of the bids received in association with information, including a respective service provider website link, regarding the service providers that submitted the subset of bids; determines that the user has declined to accept a bid from the subset of bids; determines whether more than a first threshold number of service providers submitted bids; at least partly in response to determining that more than the first threshold number of service providers submitted bids and the user has declined to accept a bid from the subset of bids, refunds bid emoluments to the service providers that were charged emoluments for submitting bids and charges the user a emolument.

Optionally, at least partly in response to receiving user input used to populate the reporting user interface, the remote system: identifies service providers that can provide service related to the reported incident to the user that meet one or more criteria; transmits over a network a notification to destinations associated with the identified service providers regarding: the reported incident subject matter, a start time for a reverse auction to bid on providing the user with reported incident related service, and a bid emolument that will be charged for a submitted bid; provides one or more of the identified service provider, via a service provider terminal, with anonymized user reported information; transmits to the user terminal at least a subset of the bids received in association with information regarding the service providers that submitted the subset of bids; receives a bid selection by the user; transmits non-anonymized user reported information to the service provider that submitted the bid selected by the user.

Optionally, the terminal system further comprises: a document scanner comprising a document feeder, wherein the document scanner is configured to receive the document via the document feeder, identify a document type for the document, and dynamically determine an image compression level based at least in part on the document type. Optionally, the terminal system is configured to detect an accident based at least in part on audible sounds received by the microphone, wherein based at least in part on the detected accident, content is selected and displayed via the touch display. Optionally, the terminal system further comprises or is in wireless communication with a speech recognition system, the speech recognition system configured to receive user voice input and to populate one or more accident reporting user interface fields.

BRIEF DESCRIPTION OF THE DRAWINGS

Embodiments will now be described with reference to the drawings summarized below. These drawings and the associated description are provided to illustrate example embodiments, and not to limit the scope of the invention.

DETAILED DESCRIPTION

Figure 1:
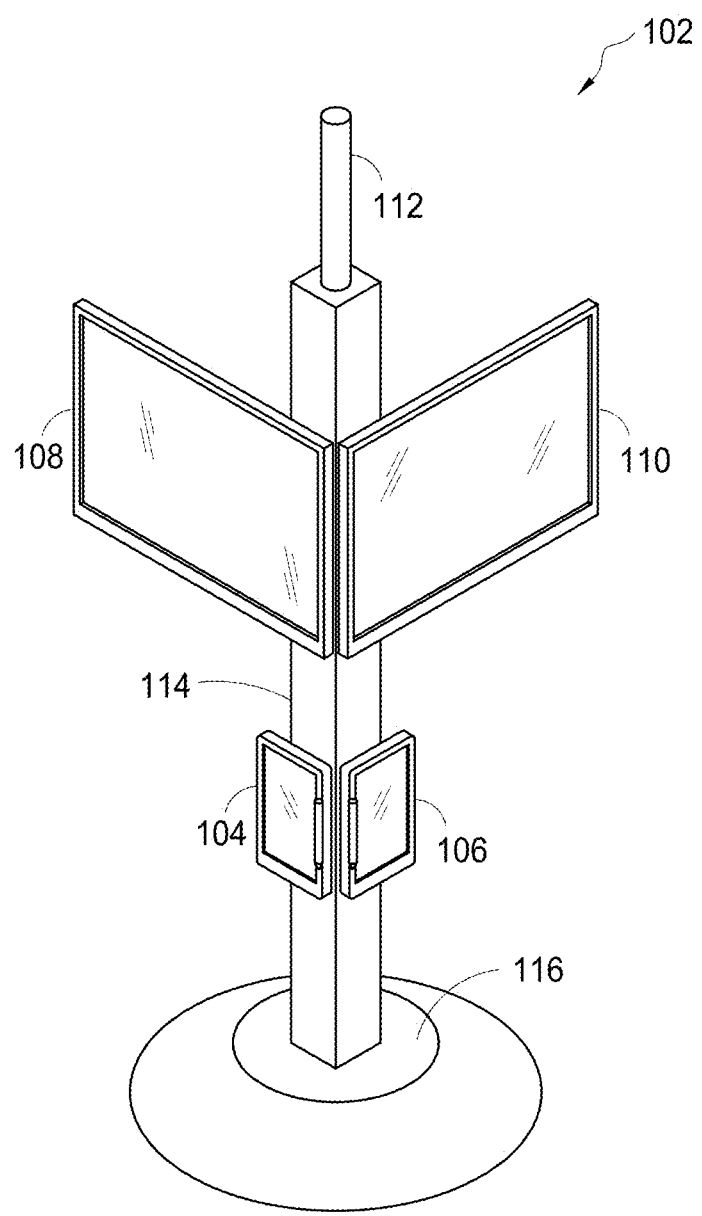
FIG. 1 illustrates an example kiosk.

A kiosk system is described that is configured to provide wireless network access to user devices, to display data on one or more displays, to interact with a user, to capture images, and/or to provide telephony services.

Systems and methods are disclosed for collecting and distributing information over a network, such as a data network and/or a telephony network via a kiosk or user terminal. For example, access to certain online services may be provided via distributed networked kiosks. The kiosks may be configured as a Wi-Fi hotspot, with a high speed (e.g., gigabit or higher) Wi-Fi network interface (including a Wi-Fi transceiver), and may provide wireless Internet access to user devices configured with Wi-Fi interfaces (e.g., phones, tablets, cars, etc.). The kiosk may be coupled to the Internet via a wired or wireless interface. The kiosk may encrypt communications from the kiosk to user devices and to remote systems (e.g., a cloud-based system that receives data/documents from the kiosk, and transmits data/documents to the kiosk), and decrypt communications received at the kiosk from user devices and remote systems. The kiosk may have a Wi-Fi range of 25 feet, 50 feet, 150, 200 feet, 500 feet or even greater range. The kiosk may be equipped with one or more large, prominently positioned upper level displays (e.g., flat panel LCD, OLED, plasma, or other display type). For example, there may be one, two, three of four upper level displays, which may be positioned on respective sides of the kiosk to enhance visibility to passerby's.

The displays may be configured to display content (e.g., informational content, entertainment content, ads, or other content) received over the Internet (or other wired or wireless network). If there are two or more upper level displays, they may be used to display the same content at the same time or different content at a given point in time. The upper level displays may be positioned between 4-20 feet above the surface on which the kiosk is mounted/seated (e.g., 4 feet, 5 feet, 6 feet, 7 feet, 8 feet, 9 feet, 10 feet, 11 feet, 12 feet, 13 feet, 14 feet, 15 feet, 16 feet, 16 feet, 17 feet, 18 feet, 18 feet, 19 feet, 20 feet). Several items of the content may be periodically downloaded to the kiosk computing device from one or more remote systems. In addition, instructions may transmitted to the kiosk computing device indicating when a given item of content is to be displayed, for how long a given item is to be displayed, on which displays the content is to be displayed, a display cycle, and/or an end display time. For example, the instructions may indicate that a first item of content is to be first displayed on a first upper level display at a designated date and time for a specified period of time (e.g., 12 seconds), that the content is to be repeatedly displayed once every minute for the specified period of time, and that the content is to be no longer displayed at a specified end date and time. By way of further example, rather than specify a display cycle, the instructions may specify specific times and/or dates the content is to be displayed (e.g., at 9 AM, 9:30 AM, 10 AM, 12 PM, 12:30 PM, 1:00 PM, 5:00 PM, etc.) and optionally the instructions may specify the same or different display period of time for each specific time and/or for each kiosk display.

The kiosk may be equipped with a touch screen display/user interface coupled to a computing device. The touch screen display may be positioned lower than the upper level displays, at a position configured to be easily accessible to a user standing in front of the kiosk. For example, the touch screen display may be positioned between 2 and 5 feet above the surface on which the kiosk is mounted/seated. There may be more than one touch screen display. For example, one touch screen display may be positioned for easy access by a user in a wheelchair and another touch screen display may be positioned for easy access by a standing user. Optionally, the lower level display may be height adjustable via rails or otherwise to accommodate a standing or sitting person.

The computing device may optionally be equipped with a physical keyboard. The computing device may be configured to execute applications, display user interfaces via the touch screen, and receive user inputs via the touch screen. The computing device may host a browser that provides access to remote networked resources. The user interfaces may include icons, tiles, links, text, videos, photos, telephone style keyboard, a virtual computer style keyboard, emergency call controls (e.g., a 911 button to place a call for police, ambulance, and/or fire department), or any combination thereof. The kiosk may also be configured with a microphone and speaker coupled to the computing device. The computing device may implement a VoIP phone using the speaker and microphone to enable a user to place and receive phone calls. The microphone and speaker may also be used to provide a voice command and response system. The kiosk may also be equipped with a camera coupled to the computing device. The camera may be utilized for video calls or to capture images (e.g., photographic images), such as images of documents and/or users. In addition, the kiosk may include a printer, which may be used to print documents, such as maps, receipts, and/or other documents.

The kiosk may include a scanner (e.g., a fax scanner coupled to a fax machine, a non-fax document scanner), optionally including a document feeder, in addition to a camera. The scanner may compress scanned documents to reduce the document image file size, thereby reducing memory needed to store such a file, and/or to reduce the network bandwidth needed to transmit the image file over a wireless or wired network. Scanning compression may be dynamically set higher for text documents (whose background typically do not contain relevant information and so may be highly compression) than for photographic documents (where compression may unacceptably reduce image quality). Optionally, the kiosk includes one or more biometric sensors (e.g., fingerprint scanner, iris/retinal scanner, etc.), which may be used to a enable a user to access secure sites and services, and/or to electronically sign documents.

As noted, the kiosk computing device may be configured to execute an application. A version of the application may be configured to execute on a user device (e.g., as an app for a portable device, such as a phone or tablet app). The application may be configured with fields and controls configured to enable a user to request an on-demand professional or other service. The functionality of the application may be described via the upper level displays. For example, the upper level displays may provide content indicating that the kiosk may be used to retain services of a given type (e.g., a lawyer, a bail bondsman, doctor, etc.) and/or sub-type (e.g., for a lawyer: an immigration lawyer, a personal injury lawyer, a workman compensation lawyer, a divorce lawyer, a landlord-tenant lawyer, a tax lawyer, etc.; for a doctor: an orthopedist, a surgeon, a family doctor, a psychiatrist, a psychologist, etc.).

The timing of a given item of content displayed on an upper level display may be on a fixed schedule or may be dynamically determined. For example, the content may be selected for display at least partly in response to substantially real-time events (e.g., events that have occurred within the past 15 minutes, 30 minutes, or 60 minutes), substantially current events (e.g., in the last 1 hour, last 24 hours, last week), or other events. By way of illustration, if an accident that has occurred in the last 30 minutes has been detected, the content selected for display on an upper level display may be for a personal injury lawyer or orthopedic doctor, whose services may be particularly useful to someone that has just been in an accident. Such content may be periodically displayed for a specified period of time at a specified frequency. For example, the content may be displayed every 5 minutes for at least 1 hour after an accident has been detected.

By way of further example, if it has been determined that an area from which the upper level displays is visible has more than a threshold number of vehicle related accidents within a specified period of time, then the content selected for display on an upper level display may be for an orthopedic doctor, a personal injury lawyer or a body shop, whose services may be particularly useful to someone that has just been in an accident.

By way of illustration, accident data may be accessed, optionally in substantially real-time, via one or more data stores, accident broadcast services, traffic services, navigation services, and/or video cameras positioned to capture images of road traffic. The accident data may optionally be accessed via web services and/or data files (e.g., a JSON file, a text file, or other file type). The accident data may include the location of the accident (e.g., in the form of street name(s), addresses, latitude and longitude, map grid identifier, or otherwise).

There may be a plurality of kiosk computing devices distributed over a small or large geographical area. For example, there may be kiosk devices located at various street corners (see, e.g., FIG. 4) or other locations across a city or portions thereof. Optionally, all of a given set of kiosk computing devices may display the same content on their respective upper level displays at about the same time. For example, a set of kiosks may include all kiosks within a specified geographic area (e.g., within four city blocks, within a 0.5 mile radius, etc. of a given point), or the set may comprise spaced apart kiosks (e.g., every third kiosk within a one mile radius of a central point). Optionally, each of a given set of kiosk computing devices may be individually configured to display content on their respective upper level displays, so that one kiosk computing device may display different content than another kiosk computing device at a given point in time. Optionally, a given kiosk computing device may host the same or a different set applications as another kiosk computing device.

An example kiosk computing device application, configured to enable a user to request services (e.g., professional services) and application environment will now be described. Optionally, rather than utilizing a dedicated application, the various user interfaces and services may be provided by a remote system (e.g., a cloud-based system) and accessed via a browser or the like.

The kiosk may host an operating system. For example, the operating system may be a Windows, Unix, Linux, Android, Ubuntu, or other operating system. The operating system may include a kernel including a variety of drivers, such as display drivers, touchscreen drivers, audio drivers, camera drivers, microphone drivers, Wi-Fi drivers, Bluetooth drivers, NFC drivers, and/or other drivers. A hardware abstract layer may be provided. In addition a variety of libraries may be provided. The kiosk may host a plurality of applications, such as one or more of the following: a browser, a VOIP application, a texting application, a payment processing application (e.g., an NFC pay application, a Bitcoin pay application, a magnetic card swipe application, etc.), a mapping application, and/or a services request application.

A home screen user interface may include a plurality of icons which may be used by a user to access a corresponding hosted application. For example, the home user interface (which may also be referred to as a kiosk desktop or home page), may include icons corresponding to a browser, a VOIP application, a texting application, a mapping application, one or more services request applications, other applications discussed herein, and/or other application.

A single services request application may be configured to provide interfaces for requesting different types of service (e.g., a lawyer, a bail bondsman, a medical service provider, etc.), or different applications may be provided to request different types of services. For example, if a single services request application is configured to provide interfaces for requesting different types of services, upon a user activating the services request application, the services request application may present a menu of types of services available for request. The menu may be in the form of icons, text, a drop down menu, or other type of menu.

For illustrative purposes as to how the systems and processes herein may optionally be utilized, an example user interface for a bail bondman will now be described. The user interface may include fields configured to receive some or all of the following information (e.g., via textual keyboard entry and/or voice entry): user identification and contact information (e.g., name, phone number, email address, physical address, etc.) identification and contact information for the person needing bail (where a control may be provided that enables the user to indicate that it is the user that needs the bail), the amount of bail, when the bail is needed by, the court that set the bail, the crime the person needing bail (the "client") is charged with, the name and/or address facility/ jail the client is being held, the client's previous criminal arrests and convictions, the number of times the client has previously obtained bail from a bail bondsman, whether the client has ever forfeited bail, who is going to pay the bail bondsman fee (e.g., 8%, 10%, or other percent of the bail amount), whether the fee to be paid to the bail bondsman will be in currency or other collateral (e.g., automobiles, real estate, stocks, bonds, jewelry, personal credit, bank accounts, etc.), and/or other information.

Some or all of the information may be made available/ transmitted to one or more bail bondman systems (e.g., associated with bail bondsman that have agreed to accept bail requests) via a Web service, a JSON file, a simple text files, an intermediary cloud-based system that receives the information from the kiosk, or otherwise. For example, personally identifying information for the client and/or user may be withheld and/or encrypted to protect the client's/ user's privacy at least until the client/user has agreed to accept an offer from a bail bondsman. A given bail bondsman (or bondsman system) may analyze the received user/ client information and decide to offer to provide the requested bail amount. The offer may be transmitted to the user/client. If the user/client decides to enter into an arraignment with the bail bondsman, the user/client activates an accept/proceed control. The user/client activation of the control may be received and stored in memory. The kiosk may print out via a printer a bail bond agreement that is in compliance with government regulations and/or has been approved by a government entity.

Government regulations may require that the user/client sign the agreement. The user may complete the agreement (e.g., using a pen or pencil) and execute/sign the agreement, and send the completed agreement to the bail bondsman. For example, the user may place the executed agreement in front of the kiosk camera, activate a shutter control, and the kiosk camera will capture an image of the executed agreement and forward it to the bail bondsman system (e.g., directly or via an intermediary system) as a digital file (e.g., a JPEG file, a TIFF file, a PNG file, a PDF file, or other file type). If the kiosk is equipped with a fax, the user may fax the agreement to the bail bondsman. A payment instrument form may be provided via a user interface enabling the user to specify a payment medium (e.g., credit card, debit card, Bitcoin, etc.). The kiosk may generate and print and/or email a receipt for the payment. The foregoing process may similarly be used for other types of service providers (e.g., lawyers, doctors, etc.).

Example aspects will now be described with reference to the figures.

As illustrated in FIG. 1, an example kiosk 102 may include one or more displays 108, 110 positioned at a relatively high level (e.g., having a lower edge at least 4 feet from ground level) on a body 114 of the kiosk (where the body may include a post or tower portion) so as to be viewable by passerby's. Displays 108, 110 may be relatively large (e.g., in the range of 32 inches-102 inches diagonal, 40 inches diagonal, 50 inches diagonal, 55 inches diagonal, 60 inches diagonal, 70 inches diagonal, 80 inches diagonal, 90 inches diagonal, or larger). The displays 108, 110 may be weather sealed (e.g., using an O-ring or other sealing technique) so as to withstand rain, snow, sleet, and/or freezing temperatures. The displays 108, 110 may be equipped with sunlight readable, anti-glare displays, and may be equipped with heaters. The displays 108, 110 may optionally be high definition (e.g. 1920×1080), 4K ultra-high definition (e.g., 3840×2160), 8K ultra-high definition (e.g., 7680×4320), or other resolution. The displays 108, 110 may be affixed to the kiosk body 114 via bolts, brackets, or otherwise. One or more of the displays 108, 110 may be built into or recessed into the kiosk body 114 to better protect the displays from weather and/or vandalism. Optionally, the actual display portion of the displays 108, 110 may be non-touch in the sense that the display portions are not configured to receive user touch instructions (although one or more touch controls may be provided on a display bezel or rear).

The kiosk 102 may be equipped with one or more internal and/or external antennas 112 (e.g., passive or active Wi-Fi antennas, cellular antennas, satellite antenna, and/or other antennas). The antennas may be mounted directly or indirectly to the kiosk body 114. The kiosk 102 may include a router that connects to the Internet via a wired and/or a wireless connection to an Internet Service Provider. The kiosk 102 may act as a Wi-Fi hotspot, optionally providing gigabit or higher Wi-Fi connections to Wi-Fi equipped devices. Optionally, the kiosk provides end-to-end encryption using HTTPS or SSH.

The kiosk 102 may be equipped with one or more terminals 104, 106, including user input devices. For example, a given terminal may include one or more touch screens configured to display user interfaces and receive user inputs via touch (e.g., via finger touch, stylus touch, etc.). The terminal may host a browser that provides access to remote networked resources. The user interfaces may include icons, tiles, links, text, videos, photos, telephone style keyboard, computer style keyboard, emergency call controls (e.g., a 911 button to place a call for police, ambulance, and/or fire department), or any combination thereof. The terminal may also be configured with a microphone and speaker. The terminal may implement a VoIP phone or a cellular phone using the speaker and microphone to enable a user to place and receive phone calls. The microphone and speaker may also be used to provide a voice command and response system. The microphone may be used to provide data entry for user interface fields, where a speech recognition system provided by the kiosk or a remote system converts the user's speech to text, and enters the text into a corresponding field for display to and approval by the user and for submission to the remote system. The terminal may also be equipped with a camera. The camera may be utilized for video calls or to capture images (e.g., photographic images), such as images of documents and/or users. The camera may also be utilized by the kiosk to receive user commands via gestures (e.g., hand and finger gestures). The camera may also be utilized in combination with a facial recognition system to recognize and authenticate a user. In addition, the terminal may include a printer (e.g., a laser printer, a thermal printer, an inkjet printer or other printer type), which may be used to print documents, such as maps, receipts, and/or other documents. The terminal may include a dedicated scanner (e.g., a fax scanner coupled to a fax machine) in addition to a camera. The terminals 108, 110, may include physical input controls, such as keyboards, call buttons, volume control buttons or knobs, and/or other physical controls.

Optionally, the terminals 104, 106 may include displays (e.g., touch screens) that are smaller than and/or positioned lower than the displays 108, 110. For example, the displays may be in the range of 10 inches-50 inches diagonal, although other sizes may be used. The terminal displays may be weather proofed/sealed as similarly discussed above with respect to displays 108, 110. The displays and controls of the terminals 104, 106 may be positioned at the same height but on different sides of the kiosk 102, or one terminal may be positioned so as to be accessible to someone in a wheelchair, and another terminal may be positioned relatively higher so as to be comfortably accessible by someone standing. Optionally, the terminals 104, 106 may be on rails or pivotable to enable a user to adjust the terminal height. Optionally, the kiosk 102 may be transportable. Optionally, the kiosk 102 may include two or more wheels to enable the kiosk 102 to be more easily moved/rolled and transported. Optionally, the kiosk 102 may include base brackets and may be bolted to a surface (e.g., a sidewalk). Optionally, the kiosk 102 may include a broad base 116 (e.g., a circular or polygon base) to provide stability.

Figure 2:
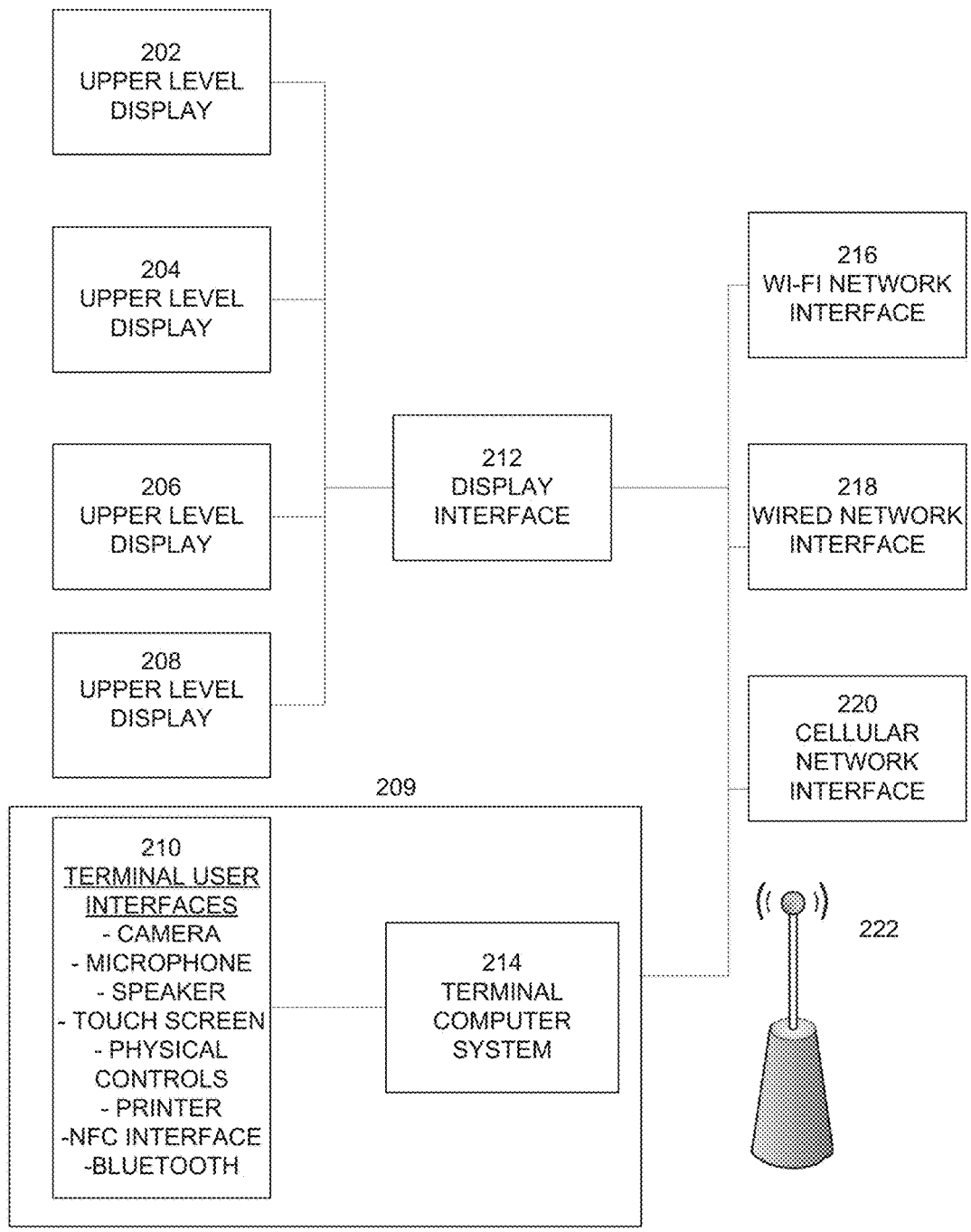
FIG. 2 illustrates example architecture.

FIG. 2 illustrates an example kiosk architecture. In this example, the kiosk includes four upper level displays 202, 204, 206, 208, although fewer or additional upper level displays. As discussed above, the upper level displays may be weatherproofed and sunlight readable. The upper level displays 202, 204, 206, 208 may be controlled by one or more display controllers 212.

In addition, a user terminal 209 may be provided. The user terminal 209 may include user input/output interfaces, such as one or more cameras, microphones, speakers, touchscreens, physical controls (e.g., volume control, keyboards, keypads, call buttons, etc.), printers, near field communication (NFC) interfaces (e.g., having a range in the range of 0.25 inches and 32 inches, and optionally using secret key authentication), Bluetooth interfaces, printers, and/or other interfaces. The terminal 209 may further include a computer system 214 comprising a processing device, volatile memory, non-volatile memory, programs, power management circuits, a touch screen controller, etc.

The kiosk may include various network interfaces. For example, the kiosk may include some or all of the following: a Wi-Fi network interface 216, a wired network interface 218, and/or a cellular network interface 220. One or more of the wireless network interfaces may be connected to one or more antennas 222. Optionally, the wired network interface 218 and/or the wireless cellular network interface 220 may provide a high speed wire connection to an ISP provider for Internet access. The Wi-Fi network interface 216 may provide hotspot access to the Internet for one or more Wi-Fi-equipped user devices (e.g., mobile phones, tablets, laptops, wearables, automotive vehicles, etc.). The kiosk may be optionally further equipped with a GPS receiver or other geolocation system which may be used to determine the kiosk's location. Optionally, the kiosk's location may be programmed into and stored in non-volatile kiosk memory.

Figure 3:
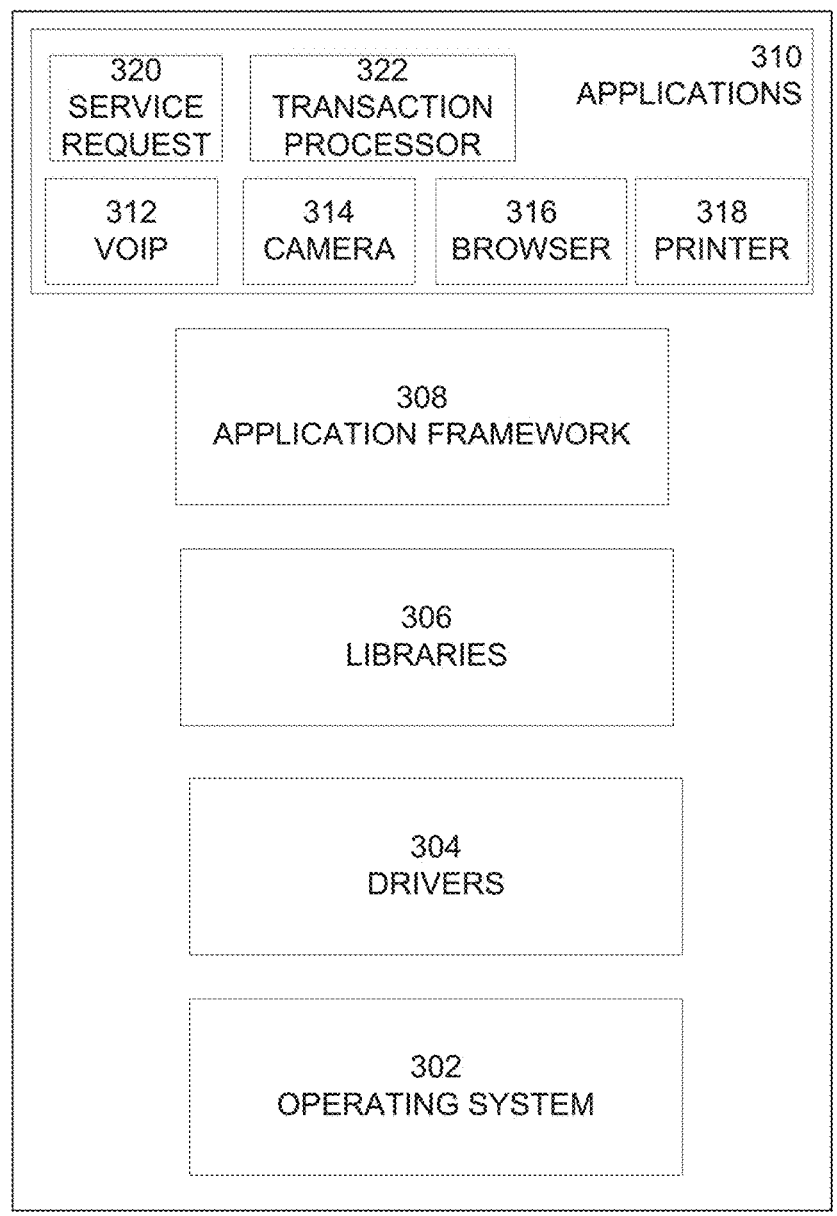
FIG. 3 illustrates an example software architecture.

FIG. 3 illustrates an example software architecture for a terminal computer system, such as terminal computer 214 of the kiosk illustrated in FIG. 2. The software architecture may include an operating system 302 (e.g., GOOGLE ANDROID, APPLE iOS, MICROSOFT WINDOWS, APPLE OS, UNIX, LINUX, etc.), drivers 304 (e.g., display, camera, microphone, keyboard, Wi-Fi, memory, etc.), libraries 306 (e.g., SSL, Webkit, SQL, etc.), an application framework 308, and applications 310. For example, the applications 310 may include a VoIP application 312, a camera application 314, a browser application 316, a printer application 318, a service request application 320, a transaction process application 322, and/or other applications. The applications 310 may include "apps" that are also generally available to users via an app store for download to mobile phones, tablets, laptops, desktop computers, automobiles, televisions, set top boxes, etc.

Figure 4:
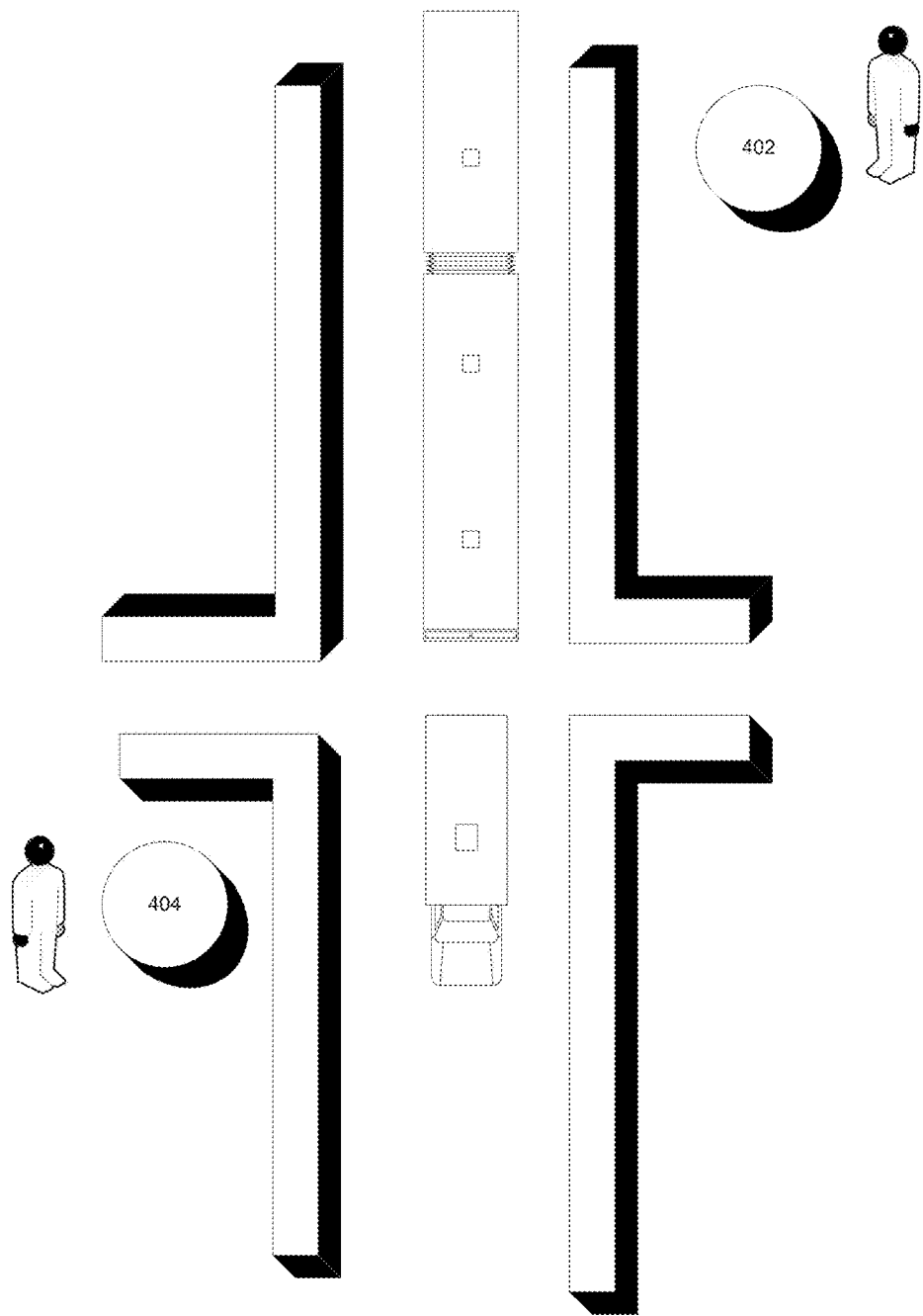
FIG. 4 illustrates an example kiosk placement.

FIG. 4 illustrates a plurality of terminals 402, 404 at different geographical locations. As similarly discussed elsewhere herein, the upper displays of terminals 402, 404 may display the same or different content.

Figure 5:
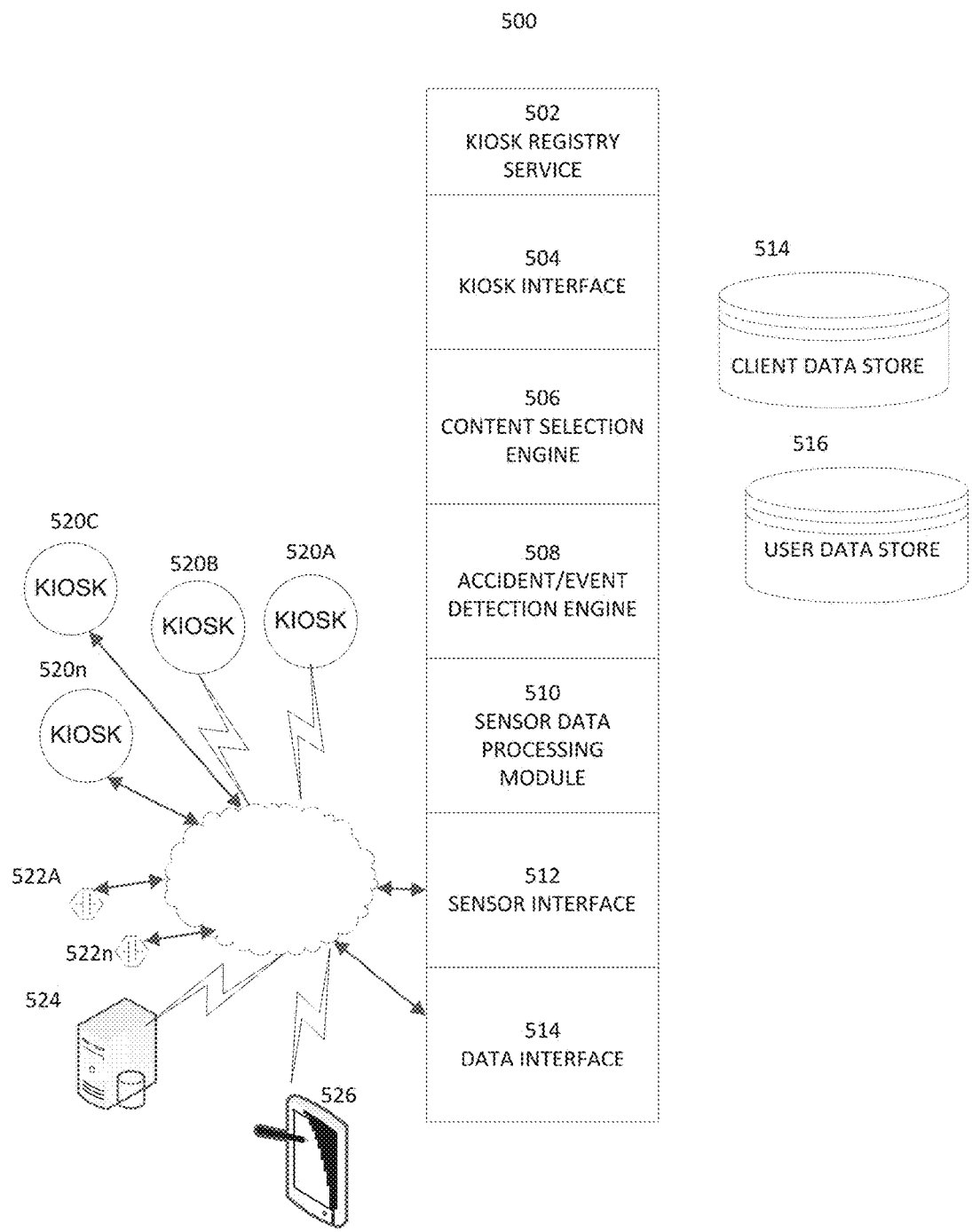
FIG. 5 illustrates an example system architecture.

FIG. 5 illustrates an example architecture including multiple kiosks (520A-520n) connected via a wireless or wired network to a remote system 500 (e.g., a cloud-based system). The system 500 may be configured to control what content is displayed on the kiosk displays, when the content is displayed on kiosks displays, and/or for how long content is displayed on kiosk displays, as described elsewhere herein. In addition, the remote system 500 may be configured to receive user input from the kiosk (and/or from user terminals, such as mobile phones, tablets, or laptop computers), act on the user input, and cause a response to be presented to the user via kiosk displays, speakers, or otherwise, as similarly described elsewhere herein.

The remote system 500 may include a kiosk registry service 502 that enables the kiosks to be registered with the remote system 500. For example, the kiosk registry service 502 may receive for a given kiosk a unique kiosk identifier, location information associated with the kiosk (e.g., in the form of street name(s), addresses, latitude and longitude, map grid identifier, or otherwise), kiosk equipment information (e.g., the number of kiosk upper level displays; the number of kiosk lower level displays; the display sizes; whether the kiosk is equipped with a camera, microphone, printer, fax, speaker; the installed applications, the type of Wi-Fi router; the Wi-Fi network interface speed; the types of personal network interfaces the kiosk is equipped with; the types of near field communication interfaces the kiosk is equipped with, etc.).

The kiosk interface 504 may be used to provide instructions, requests, content, and/or programs to the kiosks, and to receive requests, instructions, and/or content, from the kiosks. For example, the kiosk interface 504 may be used to transmit content, or a pointer to content, over a network to the kiosks for display on one or more kiosk displays. By way of further example, the kiosk interface 504 may be used to receive data provided by a user via one or more user interfaces of the kiosk. The data may be textual data, images captured via a kiosk camera, faxes of user documents received via a kiosk fax device, voice captured via a kiosk microphone, etc.

A content selection engine 506, may be used to select content for display on one or more kiosk displays based on a scheduling program and/or on real-time events, such as a determination by the accident/event detection engine 508 that an accident has occurred at a certain location, a police action has occurred at a certain location, there is a certain amount of vehicle or pedestrian traffic at a certain location, etc. The content selection engine 506 may be configured to determine what content is displayed on the kiosk displays, when the content is displayed on kiosks displays, and/or for how long content is displayed on kiosk displays.

Event information may be received by the accident/event detection engine 508 from one or more sensors 522A-522n (which may be sensors included in one or more kiosks, automobiles, street lights, dedicated cameras, etc.) and/or from one or more data stores 524, accident broadcast services, traffic services, navigation services, etc. For example, the sensors may be configured to detect accidents, such as car accidents. The sensors may comprise a microphone associated with a signal processing which can detect sounds and determine if the sounds correspond to an impact involving a motor vehicle (e.g., identify the sound of a sudden impact and/or bending or tearing metal such as would occur in a crash). The sensors may comprise a camera and an associated processing system that can visually identify accidents, police operations, etc.

The sensor data may have been received via the sensor interface 512, and the sensor data may have been processed via the sensor data processing module 510, which may normalize the sensor data, filter the sensor data, scale the sensor data, etc. The system 500 may receive data from the data stores 524, accident broadcast services, traffic services, navigation services, etc. via the data interface 514. The data interface may also be used to receive and transmit data to a user terminal 526, which may have a dedicated application or a web browser installed thereon providing user access to the various user interfaces and content described herein. The user terminal 526 may include user input/output interfaces, such as some or all of the following: cameras (e.g., to capture images of people, accidents, documents, etc.), microphones (e.g., which may be used to capture witness statements and/or other statements), speakers, touchscreens, physical controls (e.g., volume control, keyboards, keypads, call buttons, etc.), printers, near field communication (NFC) interfaces, cellular interfaces, Wi-Fi interfaces, network and/or peripheral interface antennas (e.g., for the cellar, Wi-Fi, and/or Bluetooth interfaces), fingerprint sensors, other biometric sensors, and/or other interfaces. The user interfaces presented via the user terminal 526 may be used to provide information and instructions to the system 500 as similarly discussed herein with respect to the kiosks.

A client data store 514 may be used to store information regarding service providers offering their services to users via the kiosks and/or system 500. The information may include a userID, a password, a client personal name, business name, specialty (e.g., lawyer, doctor, dentist, bail bonds person, etc.), sub-specialty (e.g., for a lawyer: an immigration lawyer, a personal injury lawyer, a workman compensation lawyer, a divorce lawyer, a landlord-tenant lawyer, a tax lawyer, etc.; for a doctor: an orthopedist, a surgeon, a family doctor, a psychiatrist, a psychologist, etc.), professional license number, when the service provider was first licensed, contact information (e.g., physical address, email address, telephone number, SMS address, Skype® address, etc.), payment information (e.g., credit card number or other identifier for a payment source), and/or other information received via the example user interfaces described herein. The client data store 514 may also store current and/or historical information on transactions conducted using the system 500 and/or kiosks, including the identities of the users to who they provided services, the amounts the clients paid to the system operator, the amount the clients received from users for services arranged using the system 500 and/or kiosks, etc.

A user data store 516 may be used to store information regarding users of the system 500 and/or kiosks, such as users seeking services from service providers. The information may include a user name, a userID, a password, contact information (e.g., physical address, email address, telephone number, SMS address, Skype® address, etc.) and/or other information received via the example user interfaces described herein. The client data store 516 may also store current and/or historical information on transactions conducted by the user using the system 500 and/or kiosks, including the identities of the service providers the user has used, which kiosks or user terminals the user used to provide information, etc.

Figure 6:
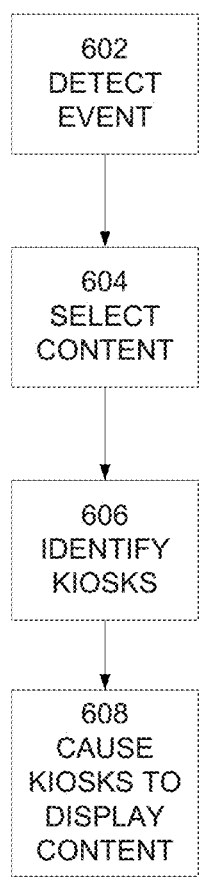
FIGS. 6, 7, and 8 illustrate example processes.

FIG. 6 illustrates an example process which, for example, may optionally be carried out in whole or in part by the system 500 and/or one or more kiosks. At block 602, an event is detected. The event may be an accident, police activity, other non-predicted event, and/or a scheduled event. The event may be detected via one or more sensors (e.g., a sound sensor, a vibration sensors, a camera) or from information received from one or more data stores or services (e.g., accident broadcast services, traffic services, navigation services, policy activity reporting services, etc.). The event may also be detected based on a user input via a kiosk or a user terminal (e.g., via an application or a general purpose browser). At block 604 content is selected for display on one or more kiosks. For example, the content may be selected for display on an upper level kiosk display and/or on a lower level kiosk display (e.g., notification information, user interfaces, etc.). At block 606, the process identifies one or more kiosks that are to display the content (e.g., one or more kiosks within a geographic area of where the event occurred). At block 606, the process causes the kiosks to display the selected content. The content may have been stored on the kiosks, streamed or downloaded from the system 500, or streamed or downloaded from another source (e.g., a remote content server).

Figure 7:
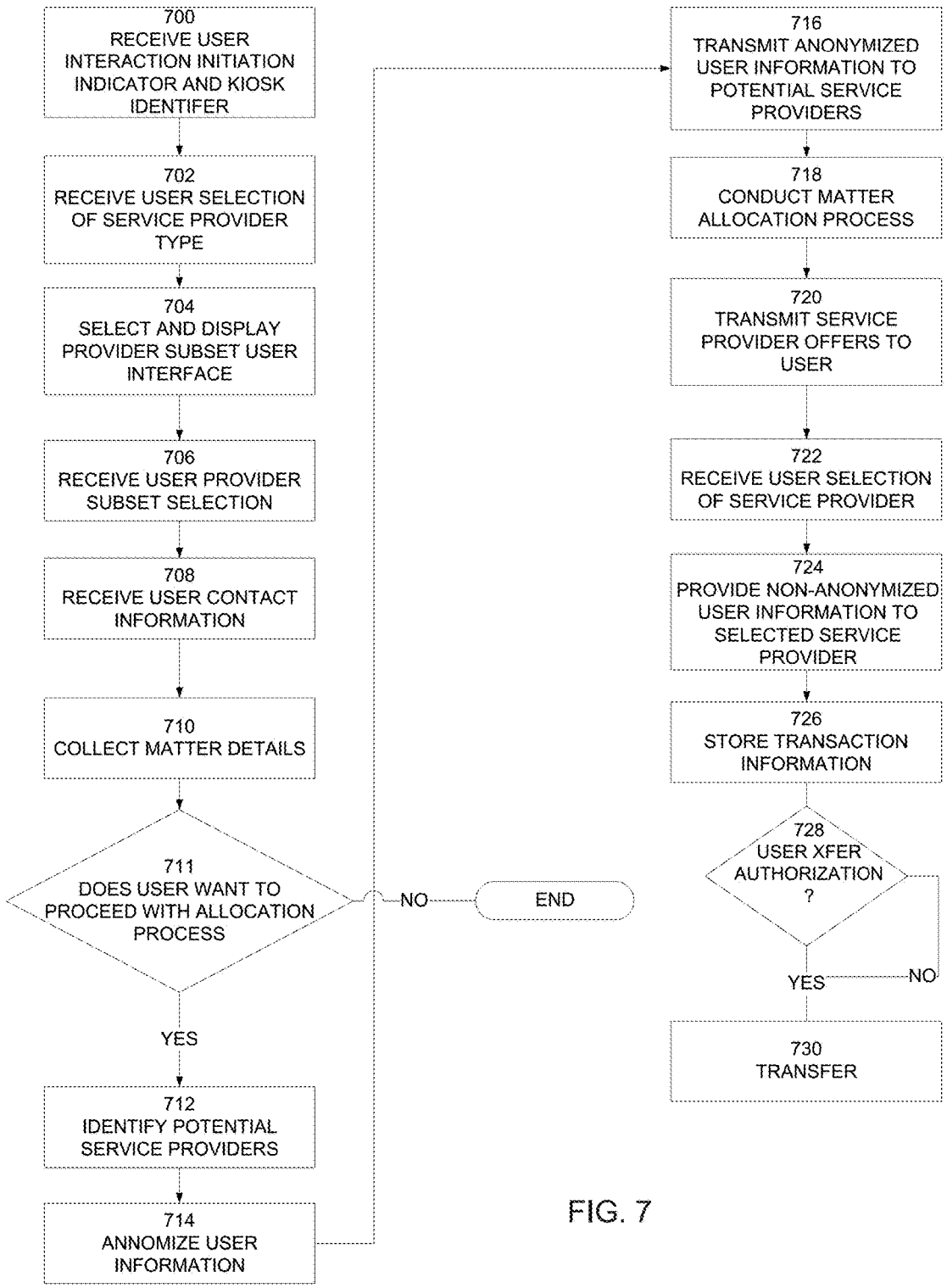

FIG. 7 illustrates an example process of an interaction with a user via a kiosk (although the process, as well as other processes described herein, may be executed with respect to a user accessing the services and user interfaces via a dedicated application (sometimes referred to as an "app") or a browser hosted by a user terminal that accesses a website hosted by a remote system rather than or in addition to the kiosk; optionally the user terminal may access various user interfaces by accesses the Wi-Fi network provided by a kiosk). At block 700, the process detects that a user is interacting with a kiosk. For example, the user may access a user interface presented via the kiosk (e.g., a user touch of a kiosk touchscreen or physical button). The kiosk may detect the user input. The kiosk may transmit the user input to a remote system, such as system 500. The kiosk may also transmit a unique kiosk identifier associated with the kiosk, and optionally geolocation information (e.g., in the form of street name(s), addresses, GPS signal information, latitude and longitude, map grid identifier, or otherwise).

At block 702, a user interface is provided via which the user can select a service provider type selection and/or indicate a matter type. The kiosk may receive the user selection. The kiosk may optionally transmit the selection to the remote system. For example, the user interface may enable a selection of a matter type from the set of car accident, immigration, criminal, landlord-tenant, etc. By way of further example, the user interface may enable a selection of an attorney, a medical service provider, or a bail-bonds persons, and the user may have selected a given service provider type. The user selection of the matter type or service provider type may be received. The kiosk may receive the user selection and may optionally transmit the selection to the remote system.

At block 704, optionally a user interface is selected and provided for display by the kiosk via which the user may select a service provider subtype. For example, if the user had selected a lawyer as the service provider type at block 702, than the selected sub-type user interface may, by way of example, list: immigration lawyer, personal injury lawyer, workman compensation lawyer, divorce lawyer, landlord-tenant lawyer, a tax lawyer, etc. At block 706, the kiosk may receive the user selection of a sub-type. The kiosk may optionally transmit the sub-type selection to the remote system.

At block 708, the process may prompt the user to provide contact information. For example, a user interface may be provided that includes fields for some or all of the following: name, mobile phone number, home phone number, work phone number, email address, Skype address, physical address, etc. The kiosk may receive the user contact information. The kiosk may optionally transmit the contact information to the remote system.

At block 710, matter details are requested and received from the user. For example, user interfaces may be provided with fields relevant to the matter-type or service provider type previously selected by the user. A given user interface may include one or more pages of fields. The kiosk may receive the user provided information and may optionally transmit the user provided information to the remote system. The information may include photographs or scans of documents and/or document optical codes (e.g., 1D or 2D barcodes (e.g., QR codes)).

By way of illustration, if the matter-type is a car accident, the process may select and present via the kiosk a user interface with fields (e.g., text fields, checkbox fields, menu selections, etc.) configured to receive some or all of the following information: when did the accident occur, where did the accident occur, was the user the driver, was anyone injured, how many people were injured, how many people in the user's vehicle were injured, how many people in other vehicles involved in the accident were injured, what were the injuries (e.g., cuts, abrasions, broken bones, concussion, whiplash, etc.) of people in the user's vehicle, what were the injuries of people in the other vehicles, etc. The user interface may also prompt the user to record (e.g., a video, voice, or text recording) statements from third party witnesses, capture and upload photographs and/or videos of the accident (e.g., the damaged vehicles and people involved in the accident), provide (e.g., as photograph or PDF file via email or an upload) a police report, and provide insurance information (e.g., insurance provider and insurance number, a photograph of an insurance card, etc.) for each driver or vehicle owner involved in the accident. The user interface may also prompt the user to provide additional information regarding the user, such as the user age (e.g., the exact age, or an indication that the user is over 18), and/or whether the user is a citizen, a lawful resident, and/or a lawful visitor of the country where the accident occurred.

By way of additional illustration, if the matter-type is a criminal matter, the process may select and present via the kiosk a user interface prompting the user to scan and upload a criminal complaint and affidavits filed with the criminal complaint. A user interface may be provided with fields configured to receive some or all of the following information: an indication as to whether the user has already made a court appearance, whether the user has posted bail and if so how much bail, whether there is a warrant out for the user's arrest, whether the user is already represented (e.g., by a public defender, a private lawyer, or is not represented), the number of felonies the user has previously been convicted of, the number of misdemeanors the user has previously been convicted of, etc. The user interface may further prompt the user to indicate whether a prosecutor has provided the user with other documents (in addition to the complaint) and/or whether a prosecutor has provided the user's lawyer with other documents. The user interface may also prompt the user to scan, email, or upload such documents.

By way of yet further example, if the matter-type is a divorce, the process may select and present via the kiosk a user interface with fields configured to receive some or all of the following information: the state of residence, whether the user has been a resident of the state for more than a first threshold period of time, the county of residence, whether the user has been a resident of the county for more than a second threshold period of time, how long the user has been married, whether the divorce is contested or uncontested, whether the user and the user's spouse agree to issues regarding the divorce, whether the user or the user's spouse has already filed a petition for dissolution or divorce and if so, has the petition/summons been served, whether financial disclosures have been filed with the court, etc. The user interface may further be configured with fields to receive some or all of the following information: whether the user can locate the user's spouse, whether the user and spouse are currently living together, whether the user and spouse have children below the age of 18 from the marriage, whether the user and spouse have a parenting plan in place, whether the user and spouse are serving active military duty, whether the spouse is represented by an attorney, whether the user and spouse own any real estate, whether the user and spouse have any material assets or debts, whether the user or spouse will be requesting spousal support, etc. The user interface may further prompt the user to scan, email, upload, or otherwise provide any documents served upon the user or filed with the court in the matter.

By way of still further example, if the matter-type is immigration, the process may select and present via the kiosk a user interface with fields configured to receive some or all of the following information: whether the user is at risk of deportation/removal, whether the user fears being persecuted if the user is returned to the user's home country (e.g., because of the user's race, religion, nationality, membership in a certain group, political opinion) and wants to apply for asylum, whether the user want to apply for United States legal permanent residency (e.g., a Green card) based on one or more reasons (e.g., employment, relatives in the United States, or other reasons (with a field configured to receive an explanation as to the other reasons), whether the user is marrying a U.S. citizen or legal permanent resident, whether the user is seeking employment authorization to work in the U.S. or apply for a visa based on employment (e.g., an H-1B visa) or training, whether the user wants to apply for U.S. citizenship, whether the user is attending school in the U.S. (e.g., under an F-1 visa), whether the user wants to petition on behalf of a relative for a visa or other form of residency permit, etc. It is understood that while examples provided herein may refer to the United States and certain types of visa, the user interfaces may be configured to receive similar information for other countries.

The immigration-related user interface may also be configured to receive some or all of the following information:

how many appearances the user has already made in court for the matter; whether the user was previously represented by an attorney in the matter, when the user's next court date is for the matter, whether the user has been previously convicted of a crime (and if so, when was the user convicted, in what jurisdiction was the user convicted, what type of crime was the user convicted of (e.g., drug possession, burglary, assault, etc.), whether the user is married to a U.S. citizen or legal permanent resident, whether the user is a U.S. citizen or legal permanent resident and wants to marry a foreign national (a non-U.S. citizen or legal permanent resident), whether the user has a relative who is a U.S. citizen or legal permanent resident, and the dates the user has entered or exited the U.S. The user interface may further prompt the user to scan, email, upload, or otherwise provide any documents served upon the user or filed with the court in the matter.

At block 711, the process prompts the user (e.g., via a user interface provided by the kiosk) to agree to certain terms and conditions of use. The process may provide instructions and guidance to the user, and may ask the user to confirm that the user wants to proceed with enabling service providers to indicate whether they are willing to take on the user matter, and if so, under what conditions. For example, terms and conditions may describe techniques for allocating the matter to service providers (e.g., via an auction (e.g., a reverse auction)), may specify that the operator of the process is not providing a recommendation of one participating service provider over another participating service provider, may specify that the user is not obligated to agree to accept service from a given participating service provider, etc.

The user interface may also describe information that should be included in offers from service providers to provide service (e.g., a link to the service provider's website, social media page, contact information, license number (e.g., bar or medical license number), etc. The user interface may instruct or advise the user not to accept service offers that is missing certain information (e.g., a website link, a license number, etc.). The user interface may also advise the user to inspect the service provider's website and to check whether the service provider is licensed to handle the matter (e.g., via state bar website whose link may be included in the user interface).

If an auction is to be conducted enabling service providers to bid on handling the user's matter (e.g., where the bid indicates how much the service provider will charge the user to handle the user's matter), the user interface may explain that an auction will be conducted enabling service providers to bid to handle the user's matter, that the user will be provided with the identity of the service providers bidding on the user's matter, and that the user's identity will not be disclosed to the bidding service providers unless the user accepts a bid from a service, at which point the user's identity (and optionally contact information) will be provided the service provider whose bid the user accepted.

The user interface may also indicate that the auction will last for a specified period of time (e.g., 30 minutes, 60 minutes, 4 hours, 12 hours, 24 hours, 48 hours, etc.), that whenever a service provider bids on the matter, information on the bid will be transmitted (e.g., via email or text message or displayed via a dedicated application on the user's terminal) to the user (e.g., in substantially real-time), optionally to a destination specified by the user (e.g., an email address and/or a text message address (e.g., a mobile device phone number)). The user interface may further inform the user that after the bidding starts, the user may accept a bid at any time and stop the auction process, may stop the auction process without accepting a bid, or may continue to review bids until the end of the auction and then decide to accept a bid or to refuse all bids. The user interface may further inform the user that if the user accepts a bid, the user will need to post funds (e.g., in an escrow account) to cover the bid amount or a portion thereof.

Optionally, the user interface may also include a preference user interface via which the user can specify certain service provider characteristics that the user prefers or requires. For example, the user interface may enable the user to specify a numbers of years of experience a service provider should have (e.g., how many years the service provider has been licensed to provide the service), how large the service provider should be (e.g., for a law firm, at least 3 lawyers, at least 10 lawyers, etc.), and/or a specific service provider geographical area (e.g., a specified zip code, or within a specific range of a specified address or zip code).

A field may be provided via which the user can accept the terms and conditions, and indicate that the user wants to proceed with the process of retaining a service provider (e.g., via an auction). At block 711, the process may determine from the user's input (or lack thereof for a specified period of time), whether user wants to proceed with the process of retaining a service provider, where the matter will be allocated to a service provider that the user agrees to. If the user elects not to proceed (e.g., by selecting a decline to proceed control, by closing a webpage or application displaying the user interface, or otherwise), the process may end. If a determination is made that the user wants to proceed, the process may proceed to block 712.

At block 712, the process may identify service providers that are suitable for the user's matter. For example, service providers may have established accounts via a system (e.g., system 500 illustrated in FIG. 5). A description of an example account setup and access process will now be described.

The account information may have been obtained from a given service provider via a user interface provided for display on a service provider terminal via a webpage, a dedicated application, or otherwise. The user interface for collecting information from a lawyer may include fields to receive some or all of the following information: name of lawyer, nickname/userID, license number, name of law firm, law firm address (e.g., street address, state, country, zip code), email address, mobile phone number, landline phone number, specialty (e.g., one or more of immigration, personal injury, workman compensation, divorce/matrimonial, landlord-tenant, tax lawyer), payment information (e.g., credit card number, a bank account number, PayPal account information, or other payment instrument identifier), and/or account information to which user payments are to be made (e.g., a bank account number, a PayPal account information, etc.). The account information may also include or be linked to ratings provided by users for the service provider. For example, the ratings may include a number rating (e.g., 1-5, or 1-5 stars), a letter rating (e.g., A-F), and/or a comment rating. The account information may be stored in a database, such as a relational database, a self-referential database, a graph database, or otherwise. Optionally, the stored data is encrypted (e.g., using transparent data encryption to encrypt the entire database, column-level encryption where columns are selectively encrypted using a column-specific key, field level encryption, etc.), using, for example, symmetric or asymmetric encryption.

To ensure the reliability of the information provided by the service provider, optionally some or all of the information provided by the service provider is confirmed with a professional association or government entity that licenses practitioners in the service provider's field. For example, if the service provider is a lawyer, using the license number and/or name provided by the service provider to identify corresponding records, some or all of the information may be corroborated using data accessed over a network from a database of the bar association of the state that the service provider claims he or she is licensed in. To further validate the information provided by the service provider, in order for the service provider to activate an account, a communication (e.g., an email, text message, or letter with a link and/or password) is transmitted to a corresponding address accessed from the professional association or government entity database (rather than the address provided by the service provider), and the service provider needs to successfully activate the link and/or enter the password via a login page. The service provider may login to access, view, and/or edit account information. The account information may include auction bid histories (as described elsewhere herein). Thus, data may be accessed from one or more networked databases and combined with data obtained during one or more user sessions to create to create a meaningful and verified record.

Advantageously, the storage of service provider information using a graph database (rather than as a table or rows and columns) provides index-free adjacency, where a given element in the database contains a direct link to its adjacent element and index lookups are not required. In a graph database, a given element/node knows what node or nodes it is connected with. A graph database utilizes graph theory to very rapidly examine the connections and interconnectedness of nodes. When performing a search using a graph database, results in associative data sets (where information is the aggregation of links between nodes) may be identified much faster than when performing a search using a relational database. Optionally, a database may be a hybrid of a relational database and a graph database.

The process may utilize the user selection of a matter-type or service provider-type, and user preferences (e.g., regarding the experience, size, and/or location of the service provider) if any, in a database query to locate service providers that match the query.

At block 714, the user information that will be provided to the service providers may be anonymized. For example, a random pseudonym may be assigned to the user which may enable the user to keep the user's identity hidden with respect to requests for service. Further, the process may inhibit the inclusion of other information (e.g., contact information) that may be used to personally identify the user in the request for service provided to the identified service providers. The system may convert scanned/photographed documents to text (e.g., via OCR) and analyze the text to identify personally identifying information (e.g., name, address, telephone number) and optionally physical identify the location (e.g., in terms of pixels) of the personally identifying information. For example, the system may utilize named entity recognition. The named entity recognition process may optionally utilize chunking and text representation, inference and ambiguity resolution algorithms, and modeling of non-local dependencies. Optionally, gazetteers or other external knowledge resources may be utilized. The system may then "white out" those locations or otherwise obscure or delete the personally identifying information before providing the scanned documents (and/or the text obtained via OCR), to service providers. For example, the white out process may identify the locations whose text is to be deleted, and then delete/redact the text so it cannot be recovered by find, search, moving of an image or comment or reversing of incremental updates. Optionally, in addition to the text redaction, a boundary may be applied to the corresponding location, and the boundary may be "filled" with a color (e.g., white) or image. Optionally, a human inspector may use visual inspection to perform the anonymization process, and/or a human inspector may review, and if needed, alter, the computerized anonymization process.

At block 716, a communication including the anonymized user information (or link to such information) may be transmitted (e.g., via an email, text/SMS message, MMS message, other short message, dedicated application, or otherwise) to the identified service providers in conjunction with a control (e.g., a link) enabling the recipient service providers to indicate that they want to offer to services to the user. Optionally, the anonymized user information (or link to such information) is only transmitted to a service provider in response to detecting that the services provider has activated an interest indication control (e.g., a link) in a communication related to the matter.

For example, if an auction is to be conducted, the control may be a link to a bidding user interface. The bidding user interface may include some or all of the matter information provided by the user, a cost for submitting a bid (e.g., a fixed dollar amount or a percentage of the bid amount) and/or a cost if the bid is accepted (e.g., a fixed dollar amount or a percentage of the accepted bid amount). The bidding user interface may show the current, real-time status of the bidding process optionally including some or all of the following: the number of bids, identities of the other bidders (e.g., userIDs or pseudonyms), ratings provided by users for the other bidders, ratings previously provided by service providers regarding the user (e.g., a number rating, a letter rating (e.g., A-F), and/or a comment rating), the current lowest bid (the lowest amount being asked to provide the requested service), the time remaining in the auction, a countdown clock indicating how long the service provider has to provide a bid (e.g., a specified or dynamically determined period of time since the last bid was received), and/or the like.

The bid may be in the form of a contingency percentage or amount. For example, a service provider bid may indicate the percentage of any damages collected for the user that the service provider will retain. By way of illustration, the maximum retained percentage may be set by statute or code, and the service provider bid may not bid to retain more than the maximum retained percentage (e.g., 30%, 33%, 40%, 50%) of any recovery (where optionally any costs of the service provider in obtaining the recovery may be retained in addition to the contingency percentage). Service providers may compete with each other by submitting lower and lower retained percentage bids.

At block 718, a matter allocation process may be conducted. For example, the matter allocation process may be performed using an auction and received bids as described elsewhere herein in greater detail. Optionally, instead, the allocation process may be performed in a round-robin manner, where matters are assigned to service providers in a circular order, where the process determines which of the identified service providers is the most distant, in terms of time, with respect to receiving a pervious matter via the system 500. Optionally, instead, the allocation process may be performed using a queue, where service providers may submit requests to provide service, and the service provider at the head of the queue is assigned the matter.

At block 720, the offers from the service providers may be transmitted to the user in substantially real-time. For example, if the allocation process is via an auction, the offer may include the bid amount (or percentage), a link to the service provider's website, service provider contact information (e.g., phone number, physical address, email address, etc.), user ratings of the service provider, and/or other service provider information discussed herein. At block 722, the process receives a user selection of an offer from one of the service providers. Optionally, the user is requested to transfer an amount to a specified account (e.g., an escrow or other holding account) to cover a portion of or all of the accepted bid.

At block 724, a notification is transmitted to the selected service provider indicating that the service provider has been selected to provide the user service. The notification may include non-anonymized user information, such as the user's name and/or contact information. At block 726, information regarding the transaction may be stored in association with the service provider's and/or the user's account. The information may include the identity of the service provider, the identity of the user, the date of the user's selection of the service provider, the date the user requested a service provider, the amount of the accepted service provider's bid, the amount of user funds placed in escrow, an identification of the escrow account, etc.

At block 728, the process monitors user inputs to detect whether the user has authorized transfer of the escrowed funds to the service provider. For example, such authorization may be provided after the service provider has satisfactorily provided the requested service to the user. If the user has provided such authorization, at block 730, the funds may be transferred from the escrow fund to an account specified by the service provider in the service provider's account information. A notification may be automatically transmitted to the service provider and/or the user regarding the transfer, including the transfer amount and date of transfer. Optionally, instead, the funds are automatically transferred to the service provider's account upon winning the reverse auction, rather than upon user authorization.

Figure 8:
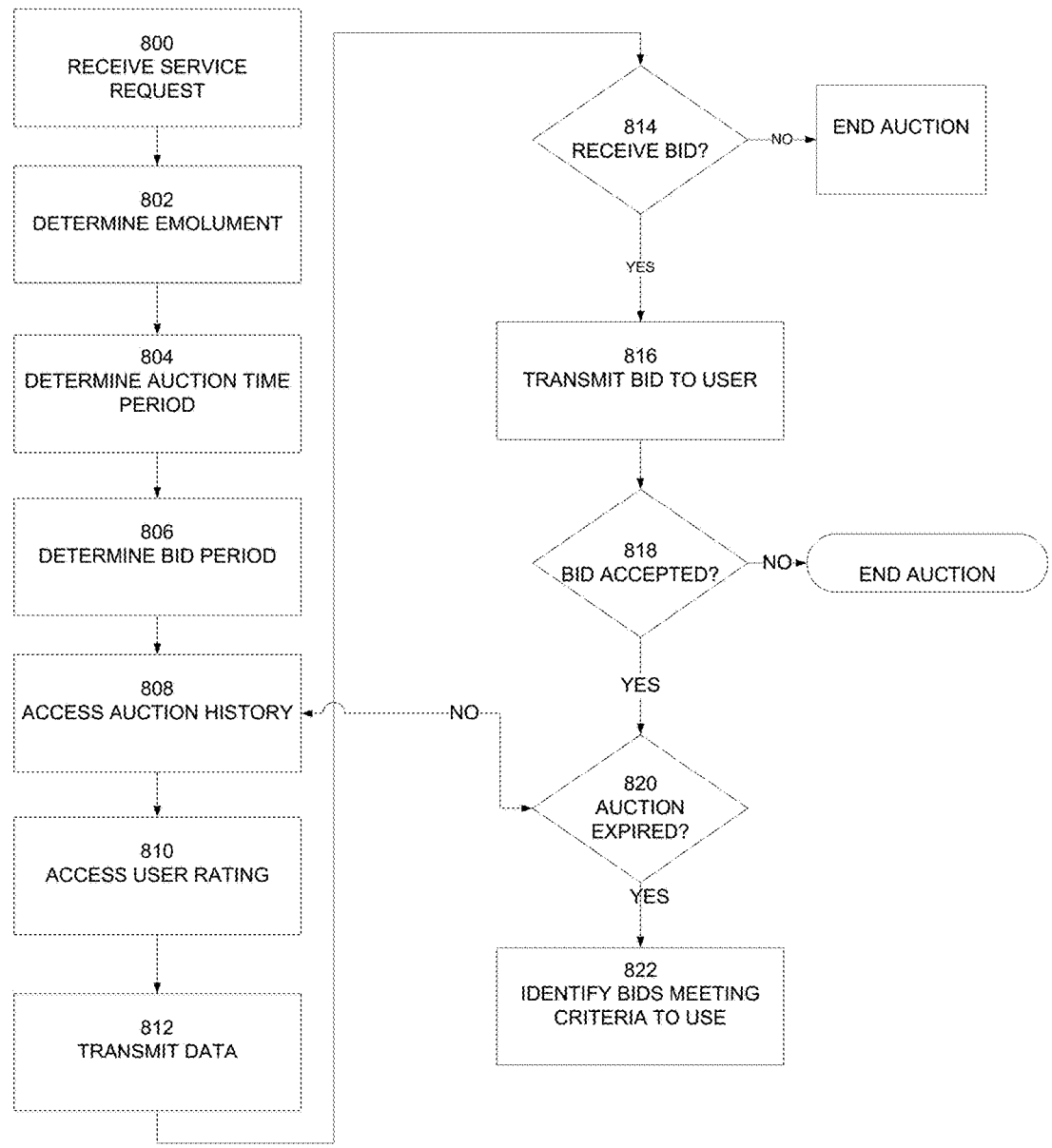

FIG. 8 illustrates an example auction process (a reverse auction process) that may be used in conjunction with the example process illustrated in FIG. 7 (e.g., block 718) or otherwise. The auction process may be executed by a system in communication with a terminal (e.g., via a dedicated application or a browser accessing an auction website) and/or a kiosk. The interfaces and communications from the system may likewise be provided to or via a terminal and/or a kiosk. The auction may be transacted in a secure manner.

For example, if the auction is being conducted via a website, in response to a webpage request from the terminal browser, the remote system (e.g., a web server) may optionally transmit its public key and certificate to a device participating in the auction (e.g., a kiosk, a user terminal, a service provider system, etc.) that hosts a respective browser. In this optional example, the browser determines whether checks that the certificate was issued by a trusted certificate authority, whether the certificate is still valid and whether the certificate is related to the auction site. If the certificate was issued by a trusted certificate authority, is still valid, and is related to the auction site, the browser uses the public key to encrypt a random symmetric encryption key and transmits the encrypted key to the server with the encrypted URL required as well as other encrypted http data. The remote system then decrypts the symmetric encryption key using the remote system's private key and uses the symmetric key to decrypt the URL and http data. The remote system transmits the requested html document and http data encrypted with the symmetric key back to the requesting terminal. The requesting terminal browser may then decrypt the received http data and html document using the symmetric key. The requesting terminal may then display the document (e.g., the auction user interface and data).

At block 800, an indication is received that a user is requesting service via an auction process. The request may be received over a wired or wireless network via a kiosk or a user terminal. At block 802, an emolument or fee amount is determined (e.g., a fixed dollar amount or a percentage of the bid amount) for submitting a bid. The amount may have been pre-specified for the service-type or service provider-type being requested and may be accessed from memory, or the amount may be dynamically determined based on one or more categories, such as the number of service providers eligible to submit a bid, the user location, the time of time, a determined importance or severity of the matter, an estimated value of the matter, a projection as to how many service providers will be participating in the auction, and/or other criteria. Optionally, the system may offer bid packages or bid plans for acquisition by service providers (see e.g., FIG. 9T). The bid package may comprise a pre-paid number of bids (e.g., 100 bids, where each bid has a $1 value, or a monetary value that may be applied to bids (e.g., $100), and that may be stored in a service provider's account. Thus, for example, when a service provider makes a bid, the bid may be deducted from the service provider's previously purchased bid package.

At block 804, an auction time period (e.g., 30 minutes, 60 minutes, 4 hours, 12 hours, 24 hours, 48 hours, etc.) may be determined. The time period may have been pre-specified for the service-type or service provider-type being requested and may be accessed from memory, or the auction time period may be dynamically determined based on one or more categories, such as the number of service providers eligible to submit a bid, the user location, the time of day, a determined importance or severity of the matter, an estimated value of the matter, a projection as to how many service providers will be participating in the auction, the number of auctions currently being conducted, and/or other criteria. If the time period is dynamically determined, it may be rounded or normalized (e.g., so that the time period will be an integer number of hours (e.g., 1 hour, 4 hours, etc.), days (1 day, 3 days, etc.), or other unit of time). For example, the auction time period may be set to be relatively longer at least partly in response to detecting that a large number of auctions are currently being conducted to thereby reduce peak system loading. Optionally, an auction time period is not used to terminate an auction, and instead, the auction may terminate if a bid period (as discussed below) expires without a new bid being received by the system.

At block 806, a bid period may optionally be determined. The bid period is the amount of time a service provider has to submit a bid (e.g., 20 seconds, one minute, five minutes, 1 hour, etc.). For example, optionally if the bid period expires with no further bids being received, the auction may be ended and the lowest/best bid(s) may be selected and provided to the user in ranked order as similarly discussed below with respect to block 820. The bid period may restart each time a bid is received, until the auction time period has expired. The bid period may have been pre-specified for the service-type or service provider-type being requested and may be accessed from memory, or the bid period may be dynamically determined based on one or more categories, such as the number of service providers eligible to submit a bid, the user location, the time of time, a determined importance or severity of the matter, an estimated value of the matter, a projection as to how many service providers will be participating in the auction, and/or other criteria. If the bid period is dynamically determined, it may be rounded or normalized so that the bid period will be a integer multiple of 10 seconds, 15 seconds, 30 seconds, 1 minute, 5 minutes, 2 hours, or other period of time.

At block 808, the auction history/real-time status may be accessed. For example, the auction history/real-time status may include the number of bids received, identities of the other bidders (e.g., userIDs or pseudonyms), ratings provided by users for the other bidders, the current lowest/best bid (e.g., the lowest amount or contingency percentage being asked to provide the requested service), the time remaining in the auction, a time remaining in the bid period, etc. At block 810, ratings previously provided by service providers regarding the user (e.g., a number rating, a letter rating (e.g., A-F), and/or a comment rating) may be accessed from memory. At block 812, some or all of the information obtained at blocks 808, 810, and from the user (as described elsewhere herein) is transmitted (optionally securely as discussed elsewhere herein to avoid third parties detecting bid requests, detecting bids, and/or modifying bids) to the service provider(s) (e.g., via a service provider system via a webpage, a dedicated application, a text message, an email, or otherwise). Optionally, the service provider is informed that the service provider's bid must be lower/better than an immediately preceding bid for the bid to be valid. A countdown clock indicating how long the service provider has to provide a bid based on the bid period may be provided for display on a service provider terminal. At block 814, a determination is made as to whether any bids have been received within the bid period. If not, optionally the auction is ended. Optionally, a service provider may configure an automatic bidding engine to automatically submit bids at set amounts/increments at specified times and/or a specified period before the auction is scheduled to end.

If a bid is received, at block 816, optionally, service providers that submitted bids (e.g., valid bids) are charged a bid fee for their bid (e.g., the emolument or fee amount determined at block 802). Optionally, a determination is made as to whether a bid is lower/better than a previous bid and if not, the bid may be rejected and optionally the bidder is not charged for the rejected bid. Optionally, rather than a user specifying a bid amount, each time a bid is received the previous lowest bid may optionally be decremented by a pre-specified amount. For example, if the initial maximum amount (e.g., as specified by the user) is 500 (e.g., 500 dollars or other units of currency or other value), and there is a set bid decrement amount of 5, then the first bid will cause the amount to be decremented to 495, and a bid fee is deducted from the bidder's account. The next time a service provider submits a bid (e.g., as submitted via a "bid" control), the 495 amount is decremented by another 5 to 490, and so forth. As discussed elsewhere herein, the service provider may be charged a fee for each bid submitted, whether or not the service provider wins the auction. Optionally, the fee may be deducted from a bid package as discussed elsewhere herein.

Bid information is optionally transmitted to the user (e.g., via a webpage, a dedicated application, a text message, an email, or otherwise presented via a kiosk or a user terminal). For example, the bid information may include the bid amount, the name of the bidding service provider, a link to the service provider's webpage and/or social media page, service provider contact information, information regarding the number years the service provider has been licensed, user ratings for the service provider, and the like. A control may also be provided via which the user can accept the service provider's bid. Activation of the control (e.g., a link) causes an acceptance indication to be transmitted (e.g., to system 500 illustrated in FIG. 5). At block 818, a determination is made whether the user accepted the bid (e.g., whether an acceptance indication was transmitted from the user's terminal). If a determination is made that the user accepted the bid, the auction is ended. Otherwise, the auction continues.

At block 820, a determination is made as to whether the auction time period has expired. If the auction time period has expired, the process identifies a threshold number of lowest/best bids (e.g., the lowest bid, the three lowest bids, or other number of lowest/best bids), and the bids are transmitted to the user with a ranking indicating which bid is the lowest, which bid is the second lowest, and so on. Optionally, bids older than threshold number of most recent bids are excluded from being transmitted to the user (e.g., bids that are prior to the most recent 15, 10, 5, or other threshold number of most recent bids are excluded from being transmitted to the user). The bids may be transmitted to the user in conjunction with other information, such as the bid amount (which may be in the form of a contingency percentage or in the form of a fixed sum), the name of the bidding service provider, a link to the service provider's webpage and/or social media page, service provider contact information, information regarding the number years the service provider has been licensed, user ratings for the service provider, and the like. The user may then accept a bid, as similarly discussed above with respect to the process illustrated in FIG. 7. Optionally, the lowest bidder automatically wins the auction and is provided the bid amount from the fee paid by the user held in a holding account (with the remainder refunded to the user), and the user is not provided with an acceptance control.

Optionally, if the user does not accept any bid when there are more than a threshold number of service providers bidding (e.g., 2, 3, 4, 5, or other threshold number of services providers), the service providers are refunded their bid fees and the user is charged a fee. Optionally, if the user does not accept any bid when there are less than a threshold number of service providers bidding (e.g., 2, 3, 4, 5, or other threshold number of services providers), the service providers are refunded their bid fees and the user is not charged a fee. Optionally, if the user does not accept the lowest/best bid, but does accept a higher bid, the service provider that submitted the lowest/best bid is refunded its bid fees.

As discussed in greater detail elsewhere herein, optionally, a user interface is provided to a service provider terminal via which the service provider may instruct the remote system (e.g., a cloud-based system) to provide the service provider with an alert when a user submits a new matter to the system that meets criteria (e.g., type of case, location of user, maximum amount set by user, etc.) specified by the service provider. The alert user interface may also include fields via which the service provider may specify one or more alert channels (e.g., a mobile phone number for voice or text alerts, an email address, etc.). When a client submits a new matter, the system compares some or all of the information submitted by the user against alert criteria specified by various service providers. When matches are found, alerts are transmitted to the respective service providers using the alert channel(s) specified by the service providers. The alerts may include some or all of the information provided by the user, optionally after the information is anonymized. The alert may optionally include a link which when activated will submit a bid for the matter and/or access a bid user interface/webpage for the matter. Optionally, the alert will be transmitted a specified period of time before the matter auction begins. Optionally, certain service providers will be provided with preferential new matter alerts as compared to other service providers, wherein preferred services providers may be given a new matter alert prior to less preferred service providers.

Certain example user interfaces will now be discussed with reference to FIGS. 9A-9OO. The user interfaces may improve the speed and accuracy with which a user can perform a task, such as submitting valid bids based on real-time information. The user interfaces may be presented via a kiosk display, via a browser on a computing device, via a dedicated application installed on a user device (e.g., an app installed on a smart phone), or otherwise. The user interfaces may be provided to a user terminal by the remote system (e.g., a cloud-based system, which may include networked servers distributed over a wide geographic area (e.g., in different states or countries) to provide faster response times with respect to interactions with users and user devices). Fields may be populated using information accessed from a data store hosted by or accessible by the system. For example, certain fields may be populated using data accessed from a client record, a service provider record, and/or a matter record. One or more records may be cross-linked, wherein the data set that has undergone record linkage reconciliation, where records in a data set that refer to the same entity across different data sources (e.g., websites, data files, and/or databases).

Figure 9A:
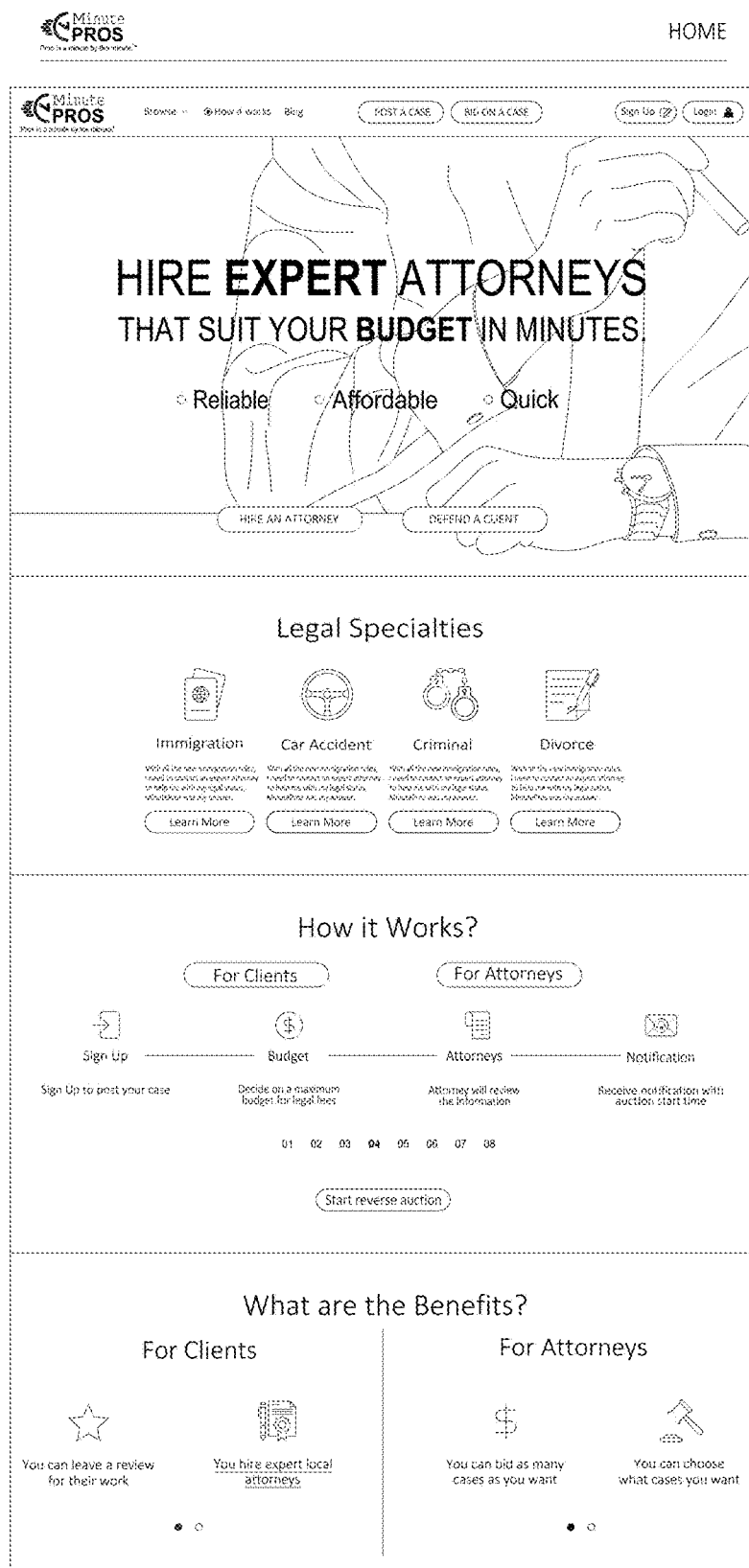
FIGS. 9A-9X and 9AA-9OO illustrate example user interfaces.

FIGS. 9A and 9A1 illustrates an example home screen user interface that may be provided for presentation via a user terminal. The example user interface includes service provider-category controls that when activated (e.g., clicked on, pointed to, or otherwise activated) act as links to additional information regarding the service provider sub-category (e.g., immigration, car accident, criminal, divorce, personal injury, etc.), which is presented to the user via the user terminal. The example user interface includes controls for clients and for service providers (e.g., attorneys) that, when activated, act as links to information on the processes performed by the system for clients and service providers respectively, which may be presented via the user terminal. A graphic may also be provided that illustrates process(es) that may be performed by the system.

The user interface may also optionally describe certain benefits provided by example processes for clients and/or service providers. For example, the client may be provided an interface via which the client may provide a review of a service provider, and the client may be able to retain a local service provider. Benefits for the service provider may include the ability to select which cases the service provider wants to bid on, and processes may enable the service provider may bid on multiple cases using real-time information. The user interface may also display featured service providers. The system may select a service provider to be featured based on the number of auctions won by service provider, user reviews for the service provider (e.g., point, star, score, or other forms of reviews), and/or on other criteria (e.g., payment by the service provider for the "featured" designation and placement). The user interface may also include contact fields via which a client or service provider can contact the system operator. In the example user interface, a start auction control is also provided.

Figure 9B:

As illustrated in FIG. 9B, a log-in user interface may be provided via which a user (a client or service provider) can log into an account previously set up by the user via the system.

If the user does not have an account, the user may be navigated to a user-category selection user interface, such as that illustrated in FIG. 9C. Controls are provided with which the user may interact (e.g., click on) to indicate whether the user is a prospective client seeking a service provider (e.g., an attorney), or whether the user is a service provider seeking a client (e.g., to defend or otherwise represent a client).

Figure 9D:

In response to the user selecting the service provider control, a service provider account setup user interface, such as that illustrated in FIG. 9D, may be presented. The interface may include fields via which the service provider may enter contact information (e.g., an email address, SMS address, etc.), a user name, and a password. An opt-in control may be provided configured to receive approval from the service provider to receive messages regarding updated features, how to use features, or other information. A control may be provided via which the user can access auction rules, site terms service, and/or privacy policies, and via which the user can agree to the foregoing. The system may transmit a verification message to the communication address (e.g., the email address, SMS address) provided by the service provider including a link which the service provider may need to activate in order to utilize the system. This technique inhibits other people from creating an account with the service provider's communication address and enhances the accuracy and correctness of data stored by the system. Once the service provider activates the link, the user's browser will access a webpage pointed to by the link, the service provider's email will be verified, and the service provider may be notified that the verification has been successful and that the service provider may now view or browse client-submitted matters. Optionally, the system prevents the service provider from accessing client matters on the system until the communication address submitted by the service provider is verified. This security feature reduces utilization of system resources by unqualified or improper users, and reduces the communication of false or incorrect data to other systems during processes discussed herein.

Optionally, fields may be provided via which the service provider can provide a destination (e.g., a bank account number) to which client payments (e.g., resulting from auctions won by the service provider) are to be transferred.

FIG. 9E illustrates an example registration user interface for a service provider. In this example, the service provider form is configured for an attorney. The registration user interface may be configured to receive information from the service provider. Some of the information requested by the registration user interface may be required and some of the information may be optional. If the system detects that the system has not received such required information, the system may prevent the service provider from bidding on a matter.

The example registration user interface illustrated in FIG. 9E includes a field configured to receive the service provider's website address, fields configured to receive contact information (name, street address, city, state, zip code, work phone number, work email address, mobile number, and/or other contact information), where some or all of the information is to match that which the service provider has previously registered with a corresponding licensing system (e.g., a state bar association), one or more fields configured to receive respective identification of licensing entities (e.g., state bar associations) the service provider is registered with and respective license identification codes (e.g., a state bar membership number), and one or more fields configured to receive respective identification of professional association entities (e.g., local bar associations) the service provider is registered with and respective membership codes (e.g., local bar membership number).

User interfaces may be provided (which may be in the form of buttons/links, a menu, or other interface) via which the service provider may indicate the service provider's area(s) of practice (e.g., immigration, personal injury, car accidents, criminal, family law, divorce, etc.). Some areas of practice/specialties may have specific state licensing requirements. User interfaces may be provided (e.g., a menu of states) via which the user can indicate (e.g., by clicking on a state entry in the menu) in which states the user is licensed to practice a given area of practice/specialty or in which the user has an expertise.

User interfaces may be provided via which the service provider is requested to agree to receive a physical confirmation letter at the address provided by the service provider and/or to confirm that the service provider has at least a specified threshold amount of professional liability insurance. A submit control may be provided, and if activated by the service provider, the information received via the registration user interface may be inspected by the system to determine if all required information and acceptances were provided by the service provider. If the system determines that all required information and acceptances were provided, the received information may be recorded in a corresponding account record in a service provider database, and the system may execute a verification process to determine that the service provider is who she/he claims she/he is. If the system determines that all required information and acceptances were not provided, the system may transmit a prompt notification to the service provider's terminal, causing the registration user interface to identify required information and/or acceptances not provided by the service provider. The service provider may then provide the required information and/or acceptances, activate the submit control, and the system may again inspect the submitted information as discussed above. Optionally, an account for the service provider is not created, and the verification process is not initiated, until all the required information and acceptances are received to prevent non-productive processes from being executed which would put an unproductive burden on processor, memory and network resources.

As discussed above, the system may optionally execute a verification process to determine that the service provider is who she/he claims she/he is. For example, the system may automatically generate an electronic communication (e.g., an email, short messaging service message, etc.) and/or physical communication (e.g., a physical, printed letter) that includes a unique code generated by the system. The communication is transmitted or physically mailed to the service provider with instructions to enter the unique code via the website hosted by the system or via a dedicated application (see, e.g., FIG. 9R). Optionally, the communication includes a URL that the service provider is to access to provide the code via a code field provided by a user interface at the URL. Optionally, in addition or instead, biometric verification may be performed (e.g., voice, facial, iris, and/or fingerprint verification where one or more input user characteristics input via one or more sensors is compared against those on record to determine whether there is a match or not).

Figure 10:
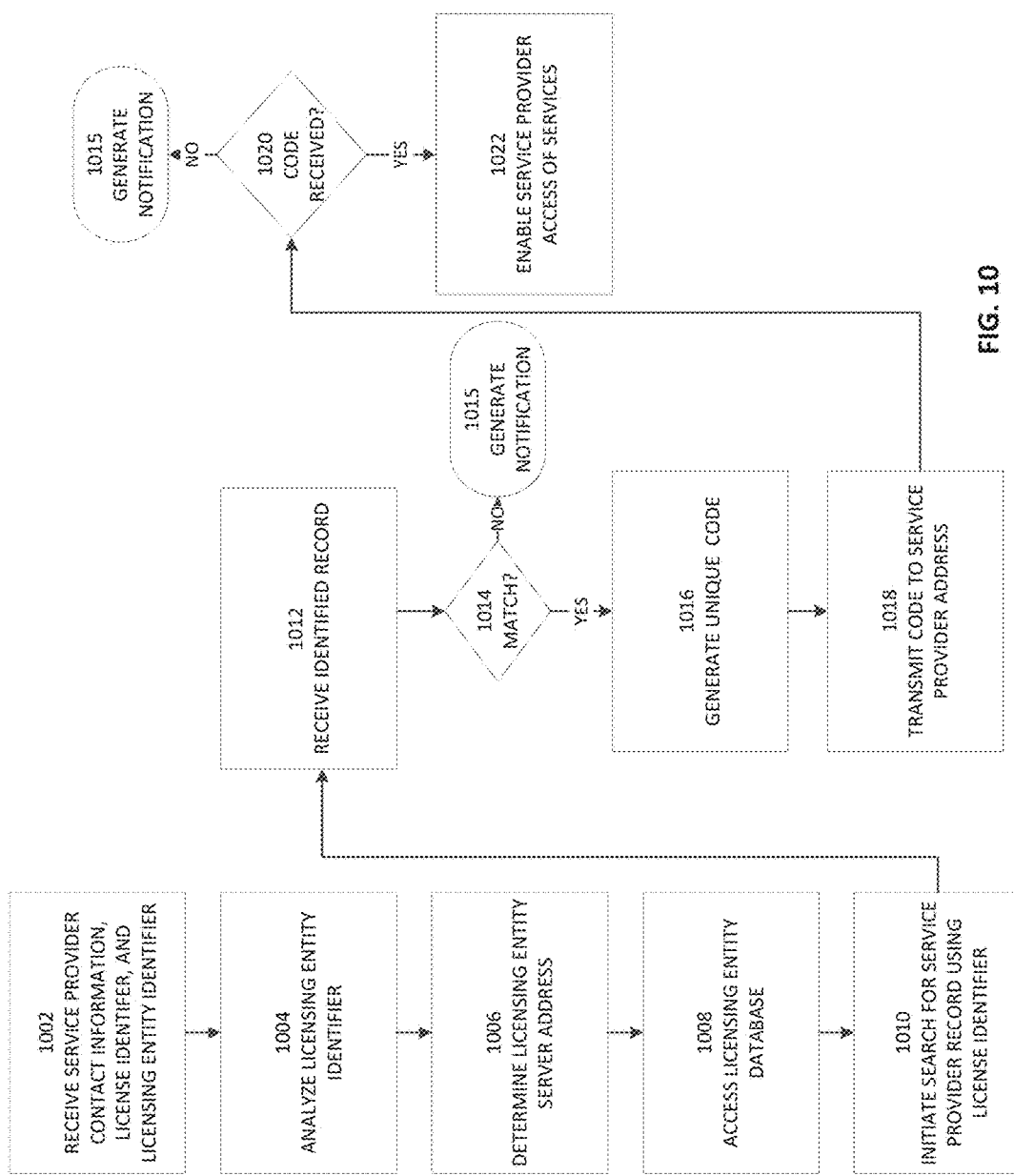
FIG. 10 illustrates an example process.

FIG. 10 illustrates an example verification process. At block 1002, the system receives (e.g., via a registration user interface, examples of which are described herein) service provider contact information provided by the service provider. The contact information may include some or all of the following: the service provider's name, a name of an employer of the service provider, a physical address (e.g., street address, suite number, city, state, zip code, etc.), work phone number, work email address, mobile number, and/or other contact information. The system may further receive one or more license (or other relevant certification) identifiers (e.g., a bar number), and an associated licensing entity identifier (e.g., a name of a bar association). Optionally, the example user interface may include a field via which the service provider may textually enter the licensing entity identifier, or a menu of licensing entity identifiers may be provided via the user interface from which the service provider is to select.

If the service provider textually entered the licensing entity identifier, at block 1004, the licensing entity identifier may be analyzed using a disambiguation technique to identify which corresponding licensing entity the identifier is intending to refer to. For example, if the licensing entity is the "State Bar of California," the service provider may have entered the identifier as the "California Bar", "CA bar", "Bar of California", etc.

The system may employ a variety of techniques to infer which licensing entity the service provider was likely referring to. For example, the system may maintain a table of aliases or alternative names that service providers may provide for a given licensing entity. The system may then compare a licensing entity identifier provided by the service provider against the actual licensing entity names to determine if a match cannot be found, and if a match cannot be found, the system may then compare the licensing entity identifier provided by the service provider against the alternative names. Such a two-step technique may reduce computer processing utilization when the licensing entity identifier provided by the service provider is the correct licensing entity name. Further, by inferring which licensing entity the service provider intended to refer to (rather than simply providing an error message to the service provider when the identifier provided by the service provider did not exactly match the actual names of any licensing entity), the amount of interaction by the system with the service provider is reduced, thereby reducing network bandwidth utilization, system processing power utilization by the system and by the service provider terminal, and the time that the service provider would need to devote to providing corrected information. Optionally, however, rather than using a two-step process, the identifier provided by the service provider may be compared against the actual name of the licensing entities and the aliases in the same pass.

At block 1006, an address of a database associated with the licensing entity is determined. For example, a record may be stored in a database that lists such address(es) for a given licensing entity. The record may be accessed via a search request submitted to the database (e.g., an SQL database) using the licensing entity name/identifier in the search query, and in response to the search request, the database address may be provided by the database.

At block 1008, the remote licensing entity database is accessed over a network (e.g., using an application programming interface (API)) via the address. At block 1010, a search of the certification entity (e.g., licensing entity) database is initiated using the certification identifier, such as a license identifier (e.g., bar number), received from the service provider. At block 1012, the record corresponding to the certification (e.g., license) identifier is received over the network from the remote licensing entity database. The record may include a service provider name, address, employer name, and other information (e.g., year graduated law school, name of law school, date of the certification (e.g., admission to practice law), disciplinary action, status (e.g., active, inactive, etc.), etc. At block 1014, the system compares certain information in the record (e.g., name and address) with the corresponding information provided by the service provider. If they do not match, the system may generate a failure to match notification which it may transmit to the service provider (e.g., via a webpage, an application, an email, a short messaging service, or otherwise), and the service provider may be prevented from using some or all of the services (e.g., the ability to bid on matters), until the issue is resolved (e.g., until the service provider provided matching information, which is then authenticated), thereby enhancing the security of the system by inhibiting access by those who may misrepresenting themselves and may be trying to spoof the system.

At block 1016, a unique code (e.g., alphanumeric code) is generated (e.g., in response to the system determining that the information from the record matches the corresponding information from the service provider). At block 1018, the code is provided to an address provided by the service provider. For example, the code may be provided via a letter generated and printed by the system and mailed to the address provided by the service provider. The letter may include a network address (e.g., a URL) for a code entry user interface that the service provider is to navigate to. Thus, a hybrid of physical and electronic mediums may be used to verify a user. The code entry user interface (see, e.g., FIG. 9R) may include a field configured to receive the code from the service provider. Optionally, instead or in addition, the code may be entered into an application hosted on a user device (e.g., a phone app).

At block 1020, a determination is made as to whether the code has been received from the service provider (e.g., over the network from a service provider terminal or other device). Optionally, if the code has not been received (e.g., within a specified or otherwise predetermined period of time), a notification may be transmitted over the network to the service provider at the service provider's electronic address (e.g., email address, short message service address, etc., provided via the registration user interface) notifying the service provider of the attempted account setup and of the failure of the same. The service provider may be prevented from using some or all of the services (e.g., the ability to bid on matters), until the issue is resolved.

If the code was received (e.g., within the predetermined amount of time), then at block 1022, the service provider may be provided access to services, such as the ability to bid on matters, view matters, etc., which may be accessed over the network via a service provider terminal.

FIG. 9F illustrates an example featured cases user interface. The featured cases may be dynamically selected by the system (e.g., based at least in part using real-time data) based on the starting bid amount, the bid decrement, charge per bid, the bid period/time decrement, the client rating, the client location, and/or other criteria. The case information may include some or all of the following accessed from a database of matters: title, case type—specialty/experience needed (e.g., immigration, personal injury, car accidents, criminal, family law, divorce, etc.), client identifier of the user that submitted the matter, client rating (e.g., provided by service providers), location (e.g., state, state/city, or other location), number of automated bids already scheduled by service providers for the matter, auction start date/time, starting bid, bid decrement, and time increment in which a bid needs to be received to avoid the auction ending. A control (e.g., a "Set up auto bid" control) may be provided via which the service provider may initiate setting up an automated bid by activating the control. The example user interface includes a matter search field via which the user may enter textual search terms. The example user interface further includes predefined specialty/experience filters and location filters which may be utilized by a search engine to locate matches in the matter database. The search tools may be utilized by a service provider to search for matters the service provider may want to bid on and/or to search for pending matters the service provider has already authorized bids for. A control may be provided via which the user can specify the criteria used to sort the displayed matters (e.g., by subject matter, location, starting bid, bid decrement, charge per bid, bid period/time decrement, or any combination thereof). A sort may be applied accordingly, and the sorted results may be displayed via the user interface. The case title may be linked wherein clicking on (or otherwise selected) the case title causes a case details user interface to be presented.

Figure 9H:
Figure 91:
Figure 9K:
Figure 9P:
Figure 9Q:
Figure 9X:
Figure 9A:
Figure 9B:
Figure 9D:
Figure 9F:
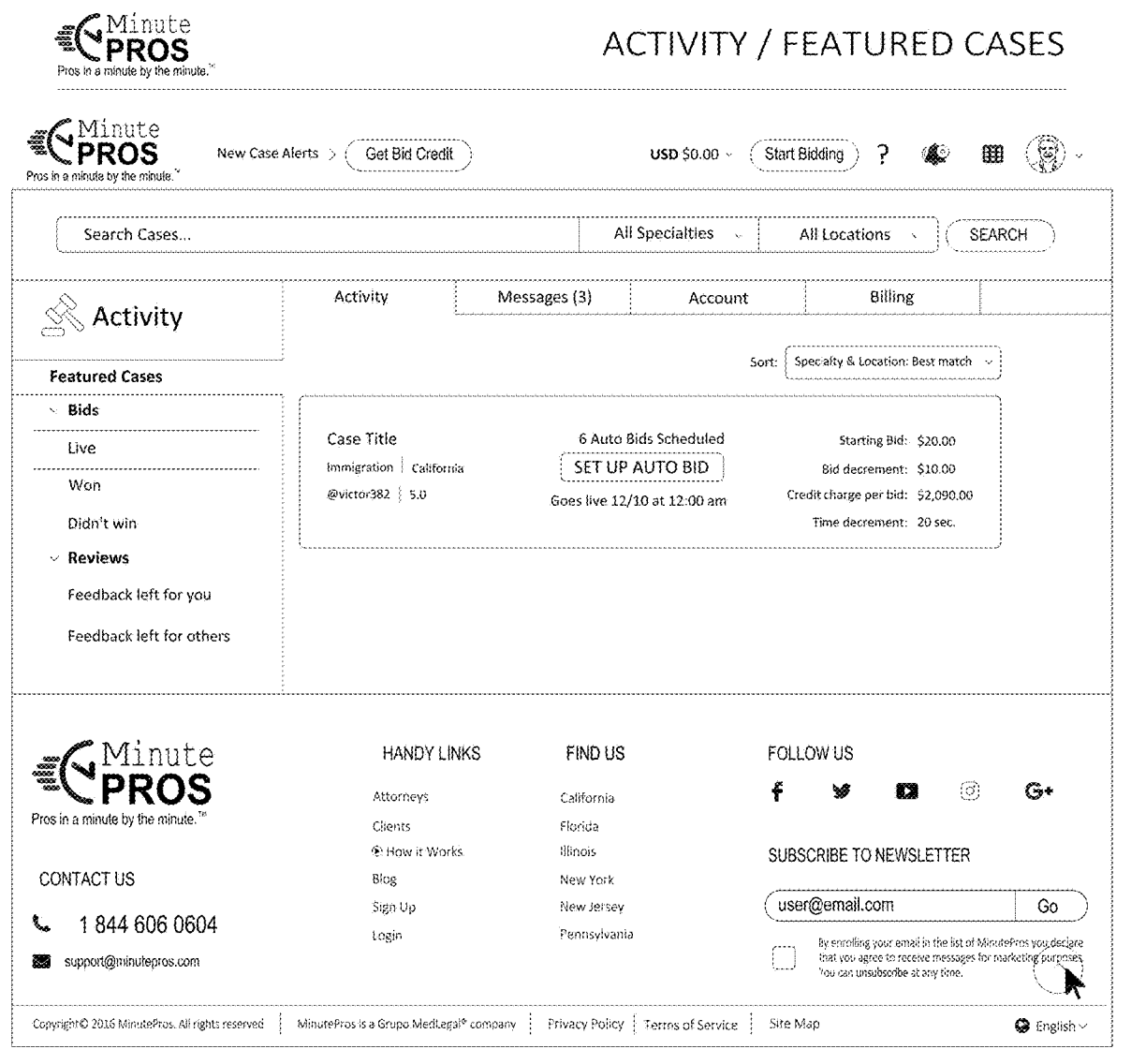
Figure 9G:
Figure 9H:
Figure 9J:
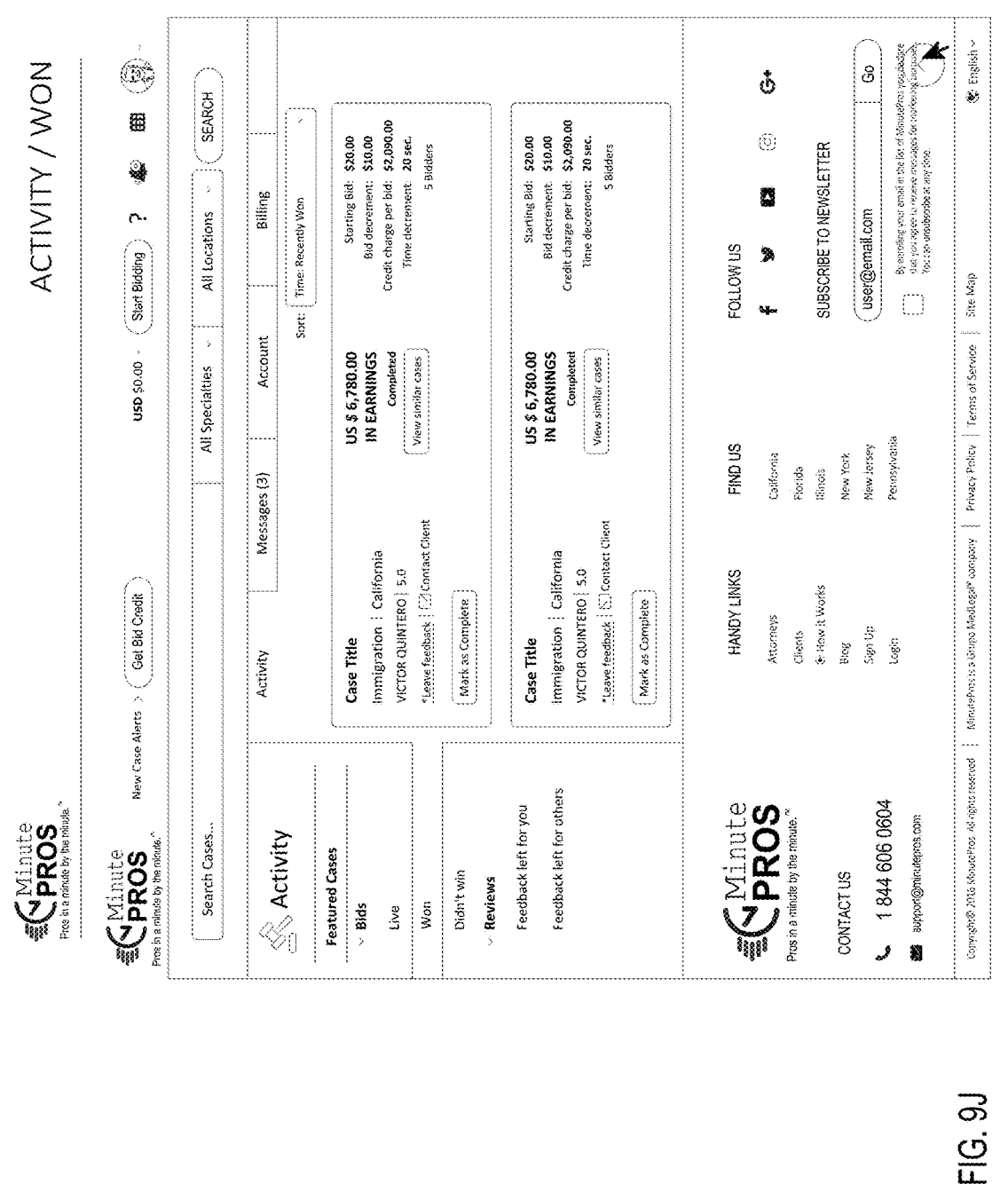
Figure 9K:

FIG. 9G illustrates an example case details user interface which populated using details accessed from a database. For example, in addition to the information presented via the user interface illustrated in the featured cases user interface, the case details user interface may provide details on the type of matter (e.g., for an immigration case, the additional detail may be deportation/removal, for a personal injury case that additional detail may be the type of injury, for a divorce case the additional detail may be an uncontested divorce, etc.), relevant facts about the client (e.g., the current state of residence of the client), and links to documents (e.g., court documents, immigration documents, a letter from an attorney representing an opposing party, etc.) provided by the client. The documents may include text documents, image files, video files, or the like. In addition, bidding activity may be reported by the system via the user interface (e.g., number of bids, number of auto bids scheduled, number of bid invitations issued by the client, etc.).

Once an auction goes live, the example user interface illustrated in FIG. 9H may be presented. The example user interface provides the case title, case type—specialty/experience needed (e.g., immigration, personal injury, car accidents, criminal, family law, divorce, etc.), location, current bid, number of remaining auto bids, number of bidders, time left to bid, starting bid, bid decrement, charge per bid, and bid period/time decrement. A bid history link may be provided which when activated causes bid history (e.g., the date/time of each bid, the bid amount, a bidder identifier) for the matter to be presented. The bid history may be updated in real-time as new bids are received. A place bid now control is provided which when activated causes a bid to be submitted, wherein the bid is equal to the current bid minus the bid decrement.

FIG. 9I illustrates another example case details user interface which may be presented when the auction for the case has already begun. The case details user interface illustrated in FIG. 9I is similar to that in FIG. 9G, however instead of the setup auto bid control, a place bid now control is provided. The example user interface also provides the current bid amount, the remaining number of auto bids, the number of bidders, number of auto bids scheduled, number of bid invitations sent by the client, number of unanswered invites, and the time left to bid, as well as the starting bid, the bid decrement, the charge per bid, and the time decrement. As noted elsewhere herein, the user interface improves the speed and accuracy with which a user can submit bids, by providing static information (e.g., case title, client name, starting bid, time decrement, etc.) and real-time information that may be dynamically updated as new data is received (e.g., the current bid, number of bidders, time left to bid, number of auto-bids scheduled, invites sent, unanswered invites, etc.), in conjunction with a bid submission control. Further, by activating a bid submission control, a preset bid is submitted (by decrementing the current bid by a preset, valid amount), thereby preventing an invalid bid from being submitted. Such features prevent errors that might otherwise occur when a service provider submits a bid without such static and dynamically updated data, thus improving the capability of the system as a whole. Further, by preventing invalid bids from being submitted, there is a reduction in the amount of system resources (e.g., processing power, memory, network utilization, and the like) that would be otherwise used in an attempt to process the invalid bid.

FIG. 9J illustrates an example activity user interface that lists cases that the service provider has won via an auction. The information may be populated from one or more databases, and may optionally be updated in real-time as new information is received or generated. For a given case, the user interface provides the case title, case type, client name, client rating, amount of earning, starting bid, bid decrement, charge per bid, time decrement, and number of bidders. A feedback control may be provided that when activated causes a feedback user interface to be presented via which the service provider can provide feedback on the client (e.g., in the form of textual feedback, a point rating, a letter grade, etc.). The date/time that the auction was won may be provided as well. A sort control may be provided via which the user can instruct how the cases are to be sorted for presentation (e.g., time, earning, completed, etc.), and the cases may be sorted accordingly. A "mark as complete" control may be provided which is to be activated by the service provider once the case has been completed/resolved. In response to detecting the activation of the "mark as complete" control, the system may record an indication that the case has been marked as completed by the service provider in a database for later access. In addition, the user interface may indicate whether the case has been marked as completed. A "view similar cases" control may be provided. In response to detecting activation of the "view similar cases" control, the system conducts a search using a search engine for similar cases and provides search results to the service provider (e.g., a list of such cases and related details) via the user interface. The search may use one or more of the following as search terms/criteria: case type/practice area, location (e.g., city and/or state), starting bid, bid decrement, charge per bid, time decrement, client rating and/or other criteria. The search results may be ranked according to closeness of match. Some search terms/filters may be weighted more heavily than others in determining closeness of match to thereby provide search results and/or a search results ordering that best correspond to the inferred user's interests and needs. For example, the location (e.g., the state) may be assigned the highest weighting while time decrement may be assigned a relatively lower weighting. A "contact client" control may be provided which when activated causes a contact client user interface to be presented.

FIG. 9K illustrates an example contact client user interface. In this example, the service provider is an attorney. The user interface automatically populates a "from" field with an attorney identifier (e.g., the attorney UserID or name and/or the attorney's employer name), a "to" field with a client identifier (e.g., the client name or alias/UserID), a "date won" field with the date that the service provider won the auction, and the case title/type. A subject field may be provided configured to receive text describing the subject of the communication from the attorney. A message field is configured to receive a message from the attorney. A save control is provided, wherein in response to activation of the save control, the system saves the communication without sending it to the client. A send control is provided, wherein in response to detecting activation of the send control, the communication is transmitted to the client via a channel (e.g., email, short messaging service message, an application installed on a client device, or otherwise) specified by the client or via a default communication channel. A cancel control is provided, wherein in response to activation of the cancel control, the user interface is closed without saving or sending the communication.

Figure 9M:
Figure 9N:
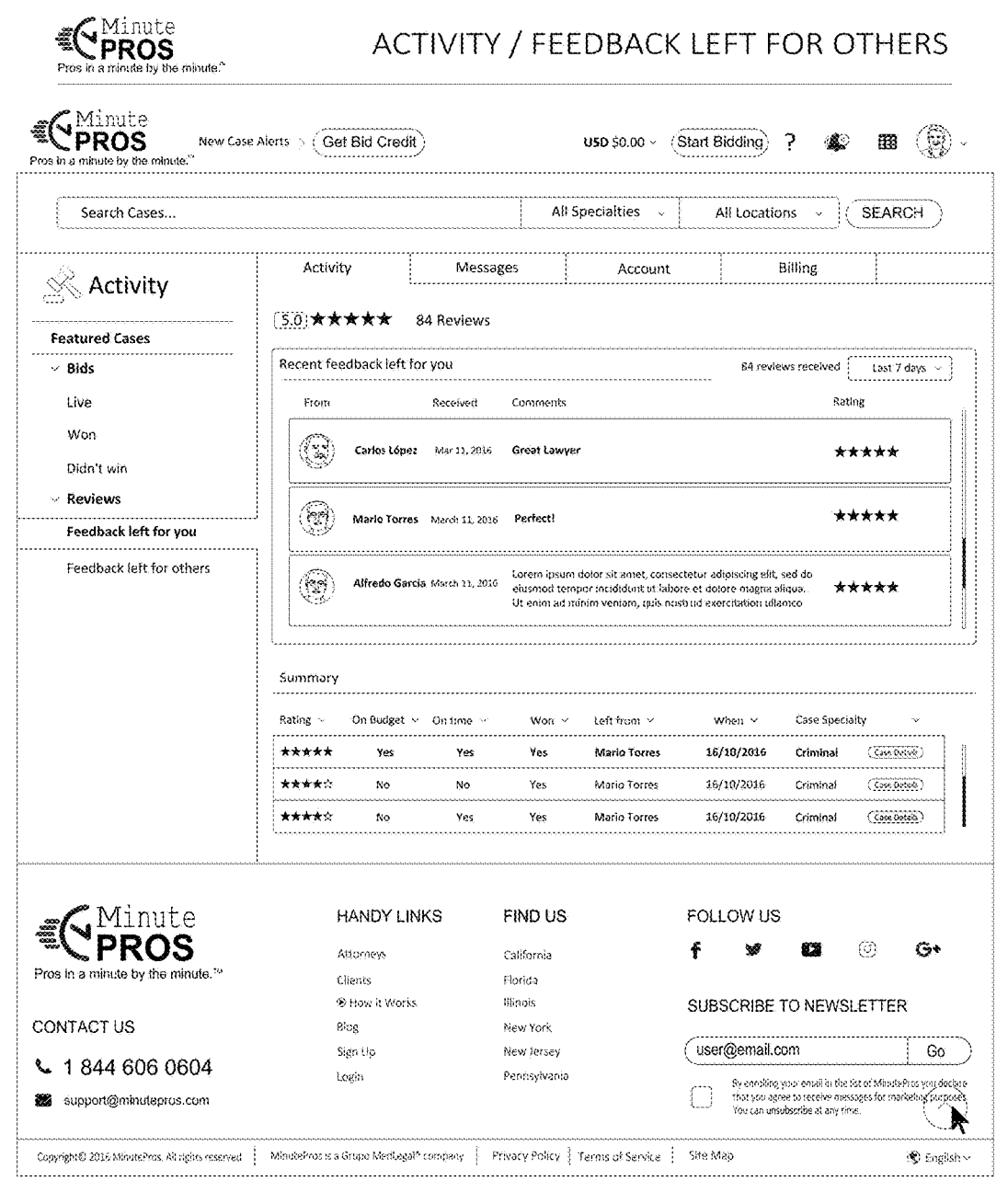
Figure 9O:
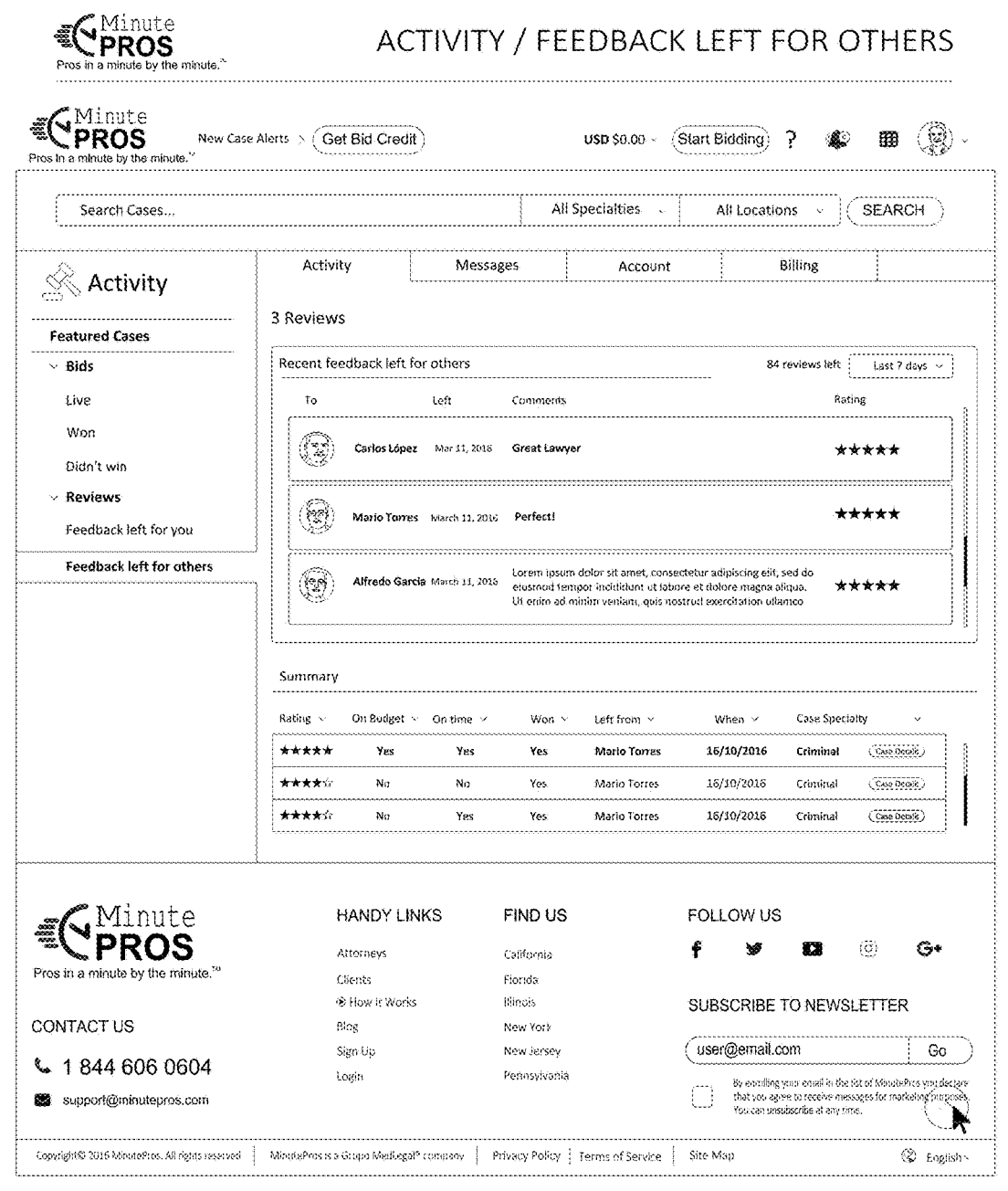
Figure 9R:
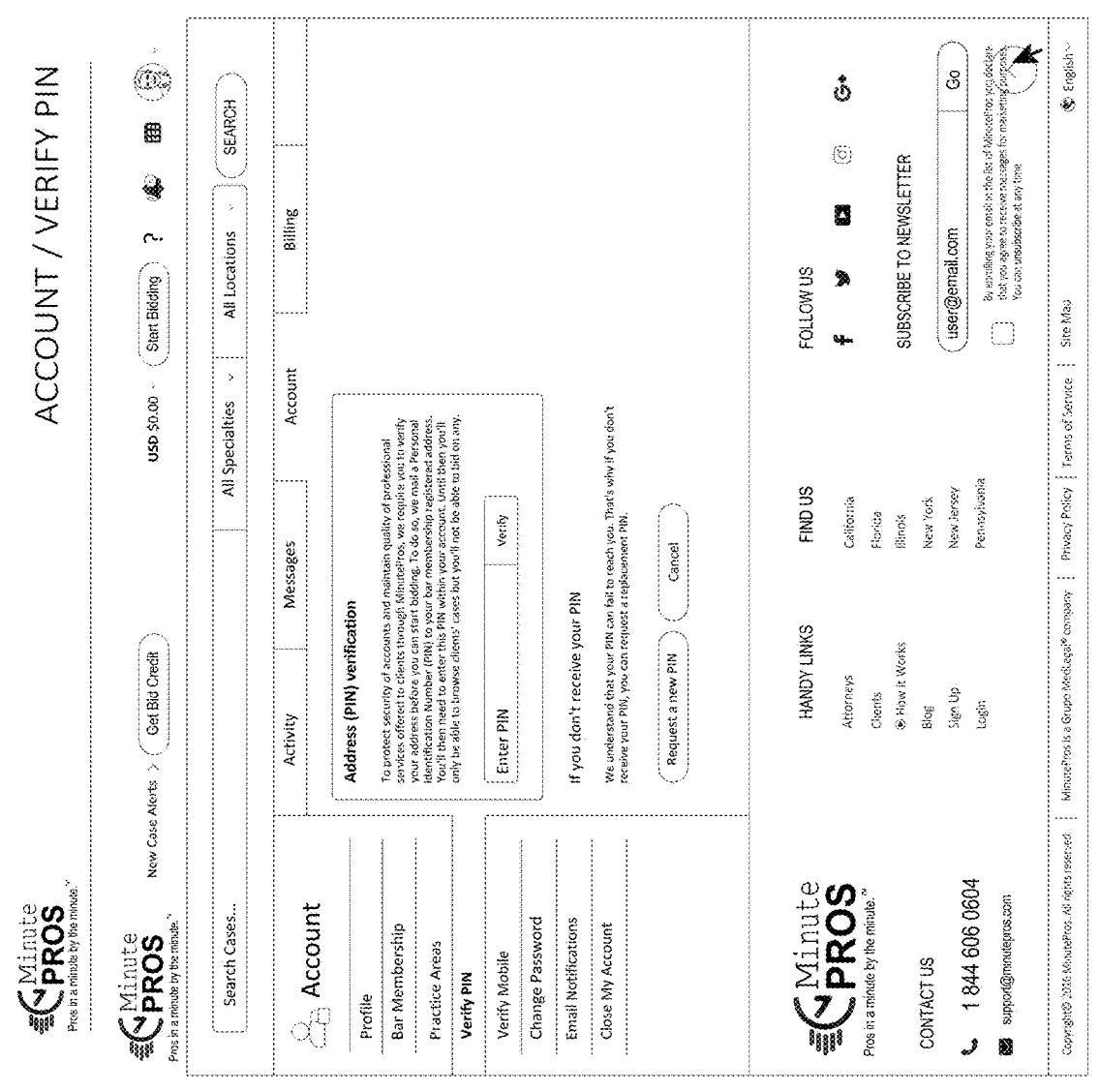
Figure 9T:
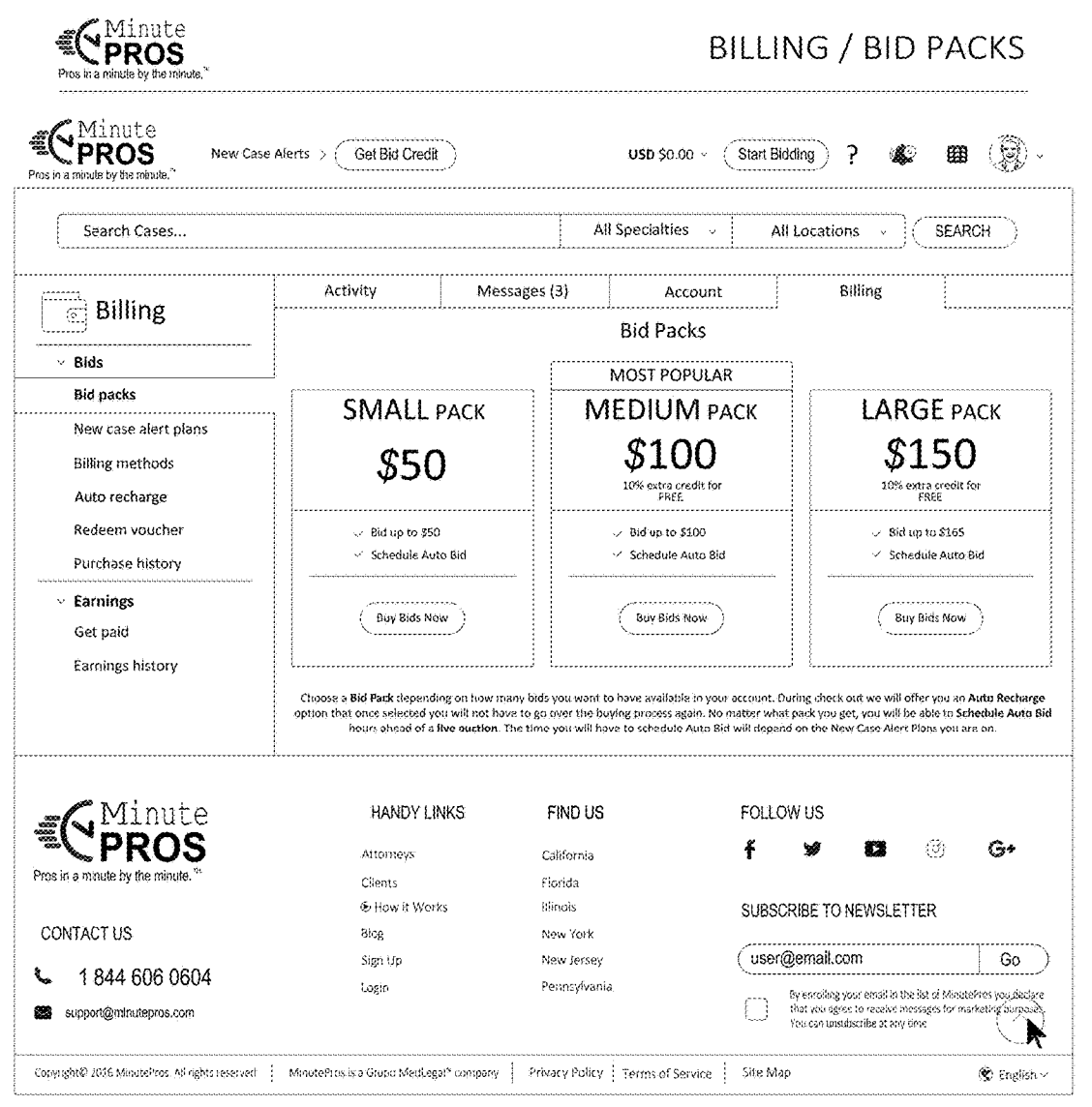
Figure 9U:
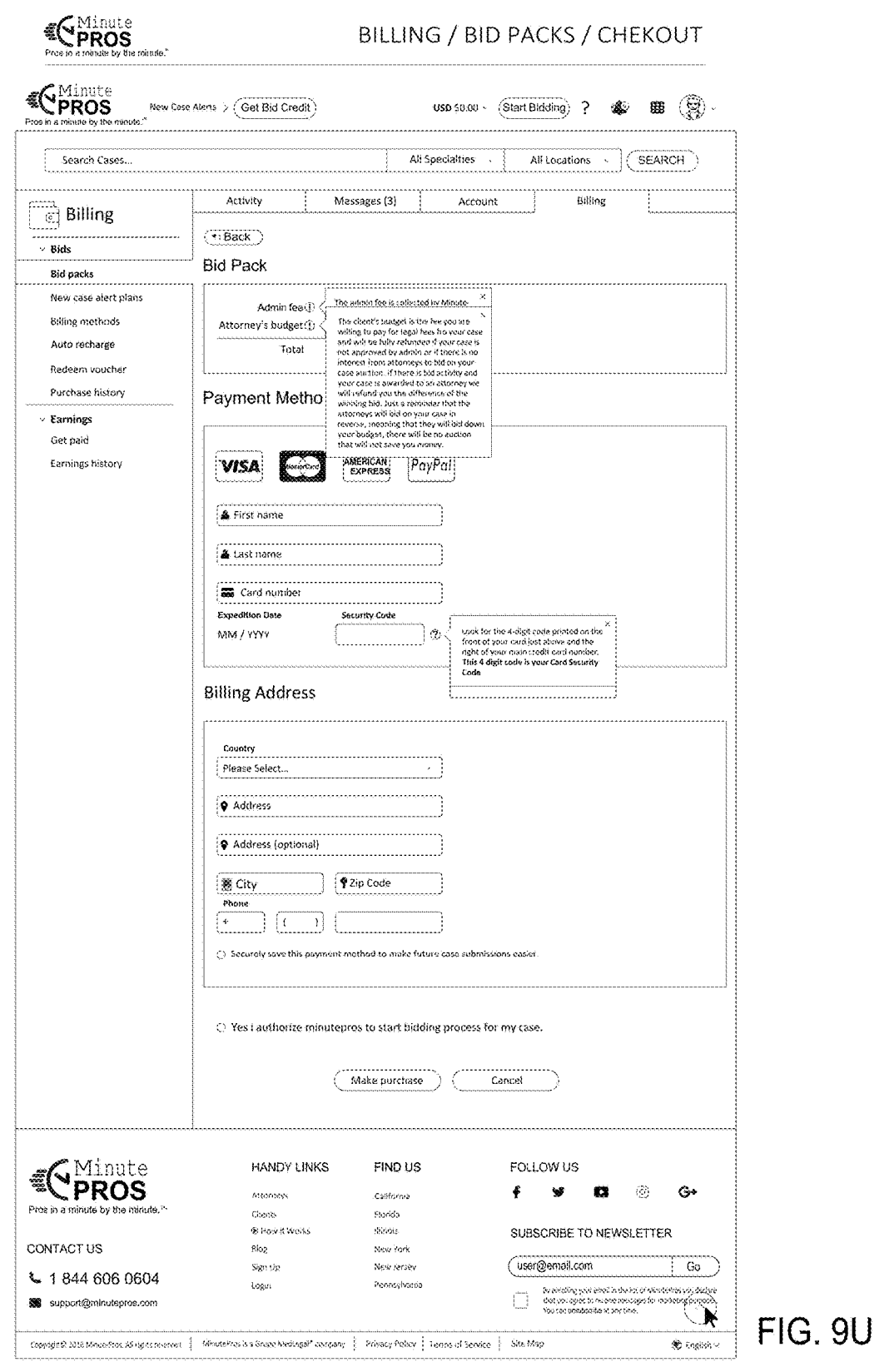
Figure 9V:
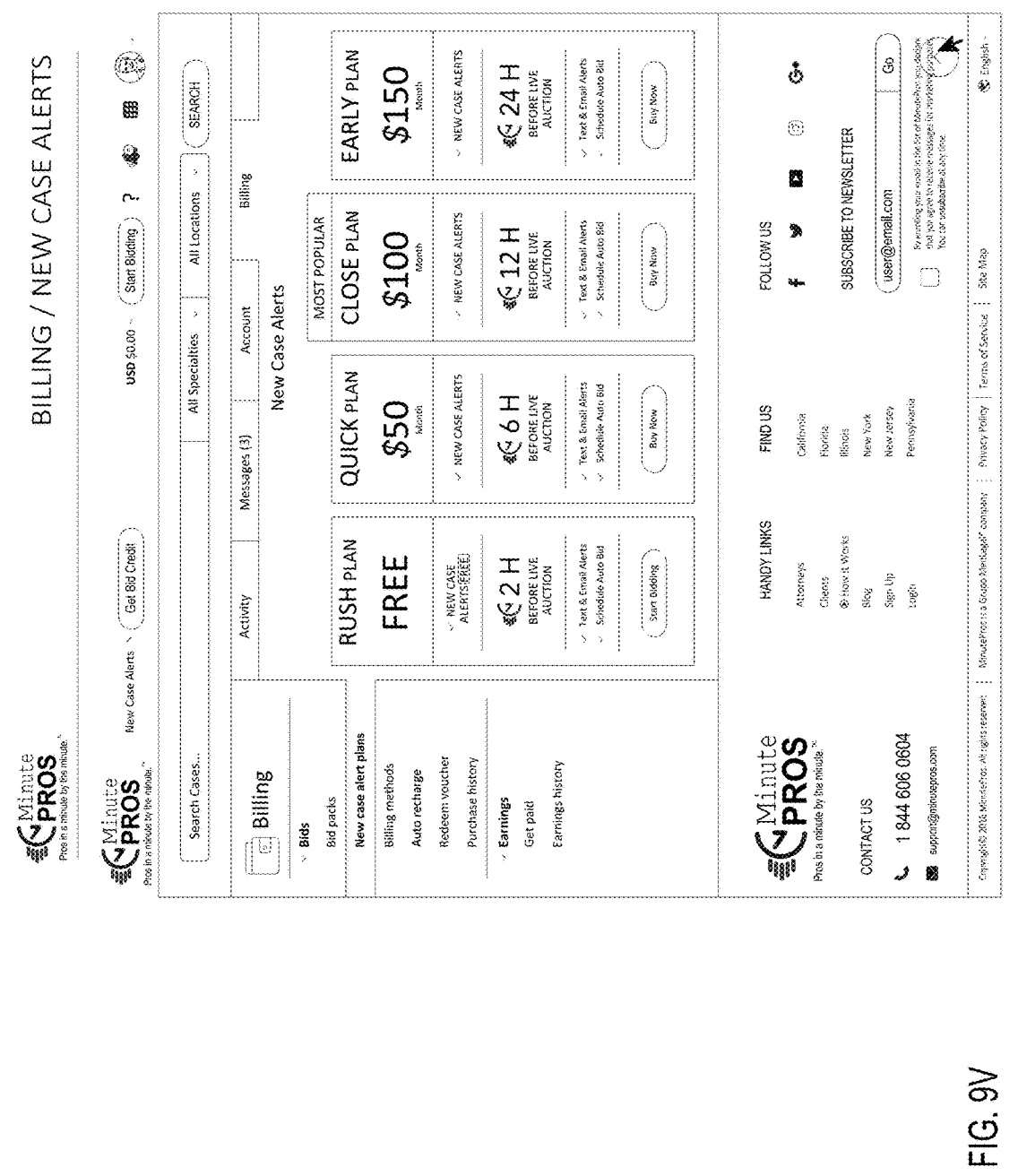

FIG. 9L illustrates an example feedback user interface via which a client can leave feedback regarding a service provider (e.g., an attorney). The user interface may be accessed by activating a feedback control associated with the service provider's name, or with a listing of matter that the service provider handled for the client. The user interface may include an overall rating interface via which the client can provide feedback on the overall performance of the service received from the attorney (e.g., positive, neutral, negative), or the client can indicate that the client wants to provide feedback at a later time, in which case the system may optionally later transmit a reminder message to the client to provide feedback. A field may be provided via which the client may enter a textual review of the attorney and/or services received. Fields may be provided via which the client can provide ratings for different aspects of the attorney and services received. For example, fields may be provided for rating the attorney on demonstrated job knowledge, how quickly the attorney responded to client communications, and/or did the attorney deliver the desired results. Once the client has completed entering the feedback, the feedback may be stored in association with the service provider's record. Optionally, the user interface may enable the client to edit the feedback prior to submitting. Optionally, the system prevents the client from editing or cancelling the feedback after the client has activated the leave feedback control. Optionally, once the feedback is submitted, other user interfaces being viewed on other user devices may be updated in real-time using the submitted feedback FIG. 9M illustrates an example activity user interface that lists cases that the service provider bid on but did not win. The information may be populated from a database. For a given case, the user interface provides the case title, case type, client name, client rating, winning bid, identifier of the service provider that won the auction (e.g., an attorney name or alias/UserID), starting bid, bid decrement, charge per bid, time decrement, and number of bidders. The date/time that the auction was completed may be provided as well. A sort control may be provided via which the user can instruct how the cases are to be sorted for presentation (e.g., time, earning, completed, etc.), and the cases may be sorted and presented accordingly A "view similar cases" control may be provided. In response to detecting activation of the "view similar cases" control, the system conducts a search for similar cases using a search engine and provides search results to the service provider (e.g., a list of such cases and related details). The search may use one or more of the following as search terms/criteria: case type/practice area, location (e.g., city and/or state), starting bid, bid decrement, charge per bid, time decrement, client rating and/or other criteria. A "contact client" control may be provided which when activated causes a contact client user interface to be presented.

FIG. 9N illustrates an example user interface providing feedback on the service provider from clients. The user interface may include an average rating (e.g., 5 stars) and the number of reviews received. The rating and number of reviews may be updated in real-time based on review and ratings received over the network from one or more client terminals. The user interface may provide the feedback provided by a given client. For example, the user interface may provide a photograph, video, or avatar submitted or selected by the client, the client name, the date the feedback was received, the textual comments provided by the client, the rating provided by the client (e.g., a numerical, grade, or star rating), the subject matter, and/or the date the auction was won. The user interface may display a summary of client feedback generated by the system. For example, the summary may include the overall rating provided by a given client, detailed feedback (e.g., indicating whether the client indicated the attorney was on budget, was on time, won the case, etc.), the client name, the date and/or time the feedback was received, and/or the case-type/specialty.

FIG. 9O illustrates an example user interface providing feedback on other service providers from their respective clients. The user interface may provide information as similarly discussed above with respect to FIG. 9N, and may further include a service provider identifier for whom a given item of feedback was provided. Optionally, the information provided via the user interface may be updated in real-time as additional feedback is received from client terminals.

FIG. 9P illustrates an example log of messages received by a service provider from clients. Optionally, the log is updated in real-time as messages are received from client terminals. A similar user interface may be provided to a client for messages received from a service provider. A given log entry may include an indication as to whether the message includes an attachment (e.g., via a paperclip icon), a client identifier for the client that sent the message, the subject line of the message, the date when the auction for that client's matter was won, and the date/time the message was received. A flag control may be provided in association with a given message which when selected will cause the message to be flagged. Filter controls may be provided via which the service provider can instruct that all messages are to be listed, only unread messages are to be listed, or only messages flagged by the service provider are to be listed. The user interface may accordingly display messages. A selection interface may be provided in association with a given message via which the service provider can select messages. A delete message is provided which when activated causes the selected messages to be deleted. A mark as menu is provided via which the service provider can mark the selected messages (e.g., a read, unread, flagged, unflagged). A search field is provided configured to receive search terms from the service provider. A search engine may search for client messages that match the search and cause the matching messages to be listed in search results via the service provider terminal.

FIG. 9Q illustrates an example service provider profile user interface which may be populated via the system database. Optionally, the displayed data may be updated in real-time as new data is received or generated. The example user interface may include a photograph, video, or avatar of the service provider, an indication how long the service provider has had an account with the system, the service provider name, time zone, rating, number of reviews received, contact information, case statistics (e.g., how many cases were completed, won, how many cases were completed on budget, how many cases were completed on time, and the like), how much the service provider spent on bid fees, bid statistics (e.g., number of live bids, number of auto bids, number of bids won), fees receive/earned from client payments, and/or number and types of bid packages and plans purchased.

FIG. 9R illustrates an example code entry user interface, discussed elsewhere herein, configured to receive a unique verification code (e.g., a PIN code) previously mailed to the service provider, in order to verify that service provider receives mail at the address provided during the registration process. A control is provided via which the service provider can request that a new unique code be physically mailed to the address provided by the service provider.

FIG. 9S illustrates an example "verify mobile phone number" user interface. The user interface lists phone numbers previously provided by the service provider (e.g., via a registration user interface) and accessed from a service provider record stored in a database. The user interface may indicate which phone numbers have already been verified, and which phone number is to be used as the primary phone number for voice calls and short messaging service messages from the system and/or with a client. A control may be provided in association with a given phone number enabling the service provider to delete the phone number from the service provider's profile/record. A control may be provided in association with a given non-primary phone number enabling the service provider to designate that phone number as the primary phone number. A control may be provided enabling the service provider to enable the system to transmit text messages (e.g., SMS messages) to a selected phone number. In order to verify that the service provider controls/owns the selected phone number, the system may transmit a verification code to the phone number and provides a field in a user interface via which the service provider is to enter the verification code. Optionally, in addition or instead, the service provider may transmit the verification via a short messaging service message or an email to a destination specified by the system. In response to receiving the verification code from the service provider, the system will record an indication that the phone number is activated to receive text messages and/or phone calls. If the verification code is not received, then the system will inhibit transmission of text messages from the system to the phone number, thereby reducing system resources that would otherwise be used to transmit text messages to non-existent or incorrect destination, and preventing people from spoofing the system.

FIG. 9T illustrates an example user interface via which the service provider may acquire (e.g., purchase) credits to be used to pay for future bid fees. The acquired credits may be stored in the service provider's account record. As similarly discussed elsewhere herein, when the service provider submits a bid, the bid fee may be deducted from the remaining credits. Optionally, payment may be made via credit card, debit card, bank transfer, or otherwise (see, e.g., FIG. 9U). Thus, rather than having to process a payment for each auction (which would typically involve several systems operated by respective entities (to authorize, batch, clear, and fund)), only a single payment process may need to be conducted in order to process payment for credits that may be utilized for multiple auctions (depending on the amount of credits purchased), thereby reducing the utilization of resources for several systems. Optionally, an additional administrative fee is charged. Optionally, a control may be provided via which the service provider may instruct the system to automatically purchase additional credits using the service provider's payment instrument when the service provider's credit balance falls below a service provider specified threshold or a default threshold.

FIG. 9V illustrates an example user interface via which the service provider may acquire case alert plans. A given alert plan may provide the service provider with an alert regarding a new case a specified period of time before the auction for that case begins. The alerts may be provided via a short messaging service message and/or an email. Different plans may provide alerts for different periods of time before an auction. In the illustrated example, a free alert plan may provide an alert two hours before the auction begins, a 50/month plan may provide an alert six hours before the auction begins, a 100/month plan may provide an alert twelve hours before the auction begins, and a 150/month plan may provide an alert twenty four hours before the auction begins. Optionally, an additional administrative fee is charged. Optionally, payment may be made via credit card, debit card, bank transfer, or otherwise.

FIG. 9W illustrates an example earning history user interface, listing the matters won by the service provider in one or more auctions, including the case type/specialty, the date the auction was won, the earnings received (e.g., the fees paid by the client), the payment method for the fees, and the real-time payment status (e.g., completed, processing, failed).

FIG. 9X illustrates an example client rating user interface that may be presented to the service provider in response to the service provider indicating that the service provider has completed the case or in response to activation of a corresponding client review control. The user interface may include an overall rating interface via which the service provider can provide feedback on the overall experience of dealing with the client (e.g., positive, neutral, negative, or leave feedback later). A field may be provided via which the service provider may enter a textual review of the client. Fields may be provided via which the service provider can provide ratings for different aspects of the client. For example, fields may be provided for rating the client on promptness of payment, whether the client provided accurate and/or timely information regarding the client's case, and/or whether the client provided the needed documents. Once the service provider has completed entering the feedback, the feedback may be stored in association with the client's database record (and/or other records described herein). Optionally, the user interface may enable the service provider to edit the feedback prior to submitting. Optionally, the system prevents the service provider from editing or cancelling the feedback after the service provider has activated the leave feedback control. Optionally, the submitted feedback may be provided in real-time to other users via respective user interfaces.

FIG. 9AA illustrates an example service provider directory user interface. The example service provider directory user interface includes a search field via which the user may enter textual search terms. The user interface further includes predefined specialty/area of practice (experience) filters and location filters. The user may select a particular specialty/area of practice filter (e.g., immigration, personal injury, car accidents, criminal, family law, divorce, etc.) or all specialties/areas of practice via the specialty area of practice filter. The user may select a particular location filter (e.g., user's city, user's zip code, within a certain radius of user address, etc.) or all locations (e.g., all locations within the state in which a case is being or going to be heard) via the location filter. A search system receives the user service provider query (e.g., including search terms entered by the user and filters selected by the user) identifies matching service providers, and presents information on the matching service providers to the user via the user terminal.

The service provider information may include some or all of the following data accessed from a database of service providers: name, user rating, number of reviews received, number of auctions won, number of matters (e.g., cases) completed, number of matters incomplete, location, specialty areas, states where service provider practices a given specialty, and a link to the service provider's website which when activated causes a user browser hosted on a user terminal to navigate to the website, and to access the website, where the website may be hosted on a remote web server. A control may be provided via which the user can specify if less or more information is to be presented regarding service providers. The search results may be ranked based on closeness of the match, rating of the service provider, number of reviews, number of auctions won, number of matters completed, number of matters incomplete, closes of service provider to user, alphabetically, and/or other criteria. A control may be provided via which the user can specify the criteria used to sort the search results, and the search results may be ordered in accordance with a user instruction. A submit control may be provided via which the user can initiate a case submission process. A control may be provided via which the user can specifically select one or more service providers to which invitations to bid on the user's matter may be transmitted.

FIG. 9BB illustrates an example case directory user interface. As similarly discussed above with respect to FIG. 9AA, the example case directory user interface includes a search field via which the user may enter textual search terms. The user interface further includes predefined specialties filters and location filters. The case directory user interface may be utilized by a service provider to search for matters that the service provider may want to bid on and/or to search for pending matters the service provider has already authorized bids for. A search system receives the case query (e.g., including entered search terms and selected filters), identifies matching cases, and presents information on the matching cases via the searcher's terminal.

The case information may include some or all of the following information accessed from a matter database (where a client may have submitted information to the database and other information may be generated by the system based on detected real-time auction activity): title, specialty needed (e.g., immigration, personal injury, car accidents, criminal, family law, divorce, etc.), client identifier of the user that submitted the matter, client rating (e.g., provided by service providers, where the client rating is optionally updated in real-time as new ratings are submitted), location (e.g., state, state/city, or other location), number of automated bids already scheduled by service providers for the matter, auction start date/time, starting bid, bid decrement, and time increment in which a bid needs to be received to avoid the auction ending. A control (e.g., a "Set up auto bid" control) may be provided in association with each case via which the service provider may initiate setting up an automated bid by activating the control.

Videos, animations, blogs, answers to frequently answered questions, and other information may be provided via which a user can access information on how the process works for a client or service provider. An interface may be provided via which the user may subscribe to updates on the services or processes provided by the system.

FIG. 9CC illustrates an example client account creation user interface. Fields are provided, in this example, configured to receive the client's name, email address, mobile phone number, a username, and a password. An opt-in control may be provided configured to receive approval from the client to transmit messages to the client regarding updated features, how to use features, or other information. A control may be provided via which the client can access auction rules, site terms of service, and/or privacy policies, and via which the client can agree to the foregoing. The system may transmit a verification message to the communication address (e.g., the email address) provided by the client including a link which the client may need to activate in order to utilize the system or certain features of the system. This technique inhibits other people from creating an account with the client's communication address. Once the client activates the link, the client's browser will access a webpage, hosted by a server, pointed to by the link, the client's email address will be marked verified, and the client may be notified that the verification has been successful, and that the client may now post a case. Optionally, the system prevents the client from posting a case until the communication address submitted by the client is verified.

FIG. 9DD illustrates a user interface via which the client may indicate (e.g., by selecting corresponding icons) what type of case the client has (e.g., immigration, personal injury, car accident, criminal, divorce) and in which state the user needs legal services.

If the client selects immigration as the case type, the example user interface illustrated in FIG. 9EE may be presented. The user interface includes fields configured to receive a case title and a user selection of immigration case-type (e.g., deportation/removal, fear of persecution, desire to become legal permanent resident, marrying a U.S. citizen or legal permanent resident, desire to obtain employment authorization to work in the U.S., desire to apply for citizenship, going to school in the U.S. and desire to apply for F-1 visa, desire to petition on behalf of relative). Fields may be provided via which the client may enter/select significant facts (e.g., the client has already made a specified number of court appearances, was previously represented by an attorney, the client's next court date, the client has been previously convicted of a crime (including year, city/state, type of crime), the client is married to a U.S. citizen or legal permanent resident, the client is a U.S. citizen or legal permanent resident and is married to or wants to marry a foreign nation, the client has a relative who is a U.S. citizen or legal permanent resident, the client currently resides in the U.S., the client entered and exited the U.S. on specified dates). An add file control is provided which enables the client to upload to the system relevant documents (e.g., image files of the documents) for the matter (e.g., documents served or sent to the client by a government entity, documents filed with the court, court orders, etc.). Optionally, the system or a browser script (e.g., downloaded in conjunction with the webpage displaying the user interface) will detect the size of the file and if it exceeds a pre-specified threshold size (e.g., 25 Mbyte, 50 Mbyte, or other size), the system or browser script will prevent the file from being uploaded and will cause a notification to be generated and displayed on the client terminal. This technique prevents excessive utilization of network bandwidth in communicating the file to the system and reduces the memory needed to store the file on the system's data store. A field may also be provided configured to receive the client's budget for the matter, where the budget may be used as the starting bid in a reverse auction. Fields may be provided via which the client may accept the terms and conditions of the auction, and agree to accept certain responsibilities.

If the client selects car accident as the case type, the example user interface illustrated in FIG. 9FF may be presented. The user interface includes a field configured to receive a case title. In addition, fields are provided that are configured to receive accident information from the client, such as date and time of the accident, and/or accident location (e.g., country, state, address, city, zip code). A field may be provided via which the client can indicate that the accident just happened. Fields are provided via which the client can indicate if the client was injured, if a passenger in the client's vehicle was injured (and how many passengers were injured), and whether anyone in another car involved in the accident was injured. Fields may be provided configured to receive information regarding the driver of the other vehicle (e.g., name, insurance company, insurance policy number, etc.). An add file control is provided which enables the client to upload to the system relevant documents (e.g., image files of an insurance card or other proof of insurance of the client and/or of the other driver, driver license, etc.) for the matter. Add file controls are provided which enable the client to upload to the system photographs and/or videos of damage to the client's vehicle and photographs of other vehicles involved in the accident. Similarly, add file controls may be provided via which the user can upload photographs or videos of drivers, passengers, and/or pedestrians involved in the accident to demonstrate their injuries or lack thereof. Optionally, as similarly discussed above, the system or browser script will detect the size of the file and if it exceeds a pre-specified threshold size, the system or browser script will prevent the file from being uploaded and will cause a notification to be generated and displayed on the client terminal. A field may also be provided configured to receive the client's budget for the matter, where the budget may be used as the starting bid in a reverse auction.

If the client selects criminal as the case type, the example user interface illustrated in FIG. 9GG may be presented. The user interface includes a field configured to receive a case title. In addition, fields are provided that are configured to receive case status information from the client, whether the client has already made a court appearance (and the number of court appearances), whether the client has posted bail to get out of jail (and the amount of bail), whether there is a warrant for the client's arrest, whether the client is represented by a public defender, whether the client is represented by a private lawyer, whether the client has no lawyer, whether the client has been previously convicted of any felonies (and the number of type of felonies), and whether the client has been previously convicted of any misdemeanors (and the number of type of misdemeanors). A field may be provided via which the client can indicate whether the prosecutor has provided documents (in addition to the complaint). An add file control is provided which enables the client to upload documents provided by the prosecutor (e.g., image files of police reports, etc.) for the matter. Optionally, as similarly discussed above, the system or browser script will detect the size of the file and if it exceeds a pre-specified threshold size, the system or browser script will prevent the file from being uploaded and will cause a notification to be generated and displayed on the client terminal. A field may be provided configured to receive an indication that the prosecutor provided documents (in addition to the complaint) to the client's previous/current attorney but that the client does not have copies of the documents. A field may also be provided configured to receive the client's budget for the matter, where the budget may be used as the starting bid in a reverse auction.

If the client selects uncontested divorce as the case type, the example user interface illustrated in FIG. 9HH may be presented. The user interface includes a field configured to receive a case title. In addition, fields are provided that are configured to receive case details from the client (e.g., does client and spouse agree to divorce issues, has client or spouse already filed a petition for dissolution/divorce, and if so, has the petition/summons been served, have financial disclosures been made to court, can client locate spouse, does client and spouse currently live together, are there minor children from marriage, does client and spouse have parenting plan in place, is client or spouse active in active military, is spouse represented by attorney, does client and spouse own real estate, are there any marital assets or debts, will either client or spouse be requesting spousal support, and the like). Fields may be provided to collect additional information about the client, such as state of residence, whether the client has been a resident of the state for more than a threshold period of time (e.g., 6 months), country of residence, whether the client has been a resident of the country for more than a threshold period of time (e.g., 3 months), length of marriage, and the like. An add file control is provided which enables the client to upload relevant documents (e.g., served upon client or filed with a court for the matter). Optionally, as similarly discussed above, the system or browser script will detect the size of the file and if it exceeds a pre-specified threshold size, the system or browser script will prevent the file from being uploaded and will cause a notification to be generated and displayed on the client terminal. A field may also be provided configured to receive the client's budget for the matter, where the budget may be used as the starting bid in a reverse auction.

Optionally, the client may be charged one or more fees for the services provided by the system (e.g., the auction service). A user interface may be provided via which the client can provide payment information (e.g., credit card number, debit card number, bank account, or other payment vehicle).

User interfaces may be provided that provide the client with status information on the client's case(s). FIG. 9II illustrates an example user interface providing real-time activity status information on an in-progress auction for a client matter to the client. The user interface provides the case title (e.g., previously specified by the client), the case type, the state, a client identifier (e.g., client name or alias/UserID), the current client rating, the current bid, the time left for a service provider to submit a bid, the bid decrement, the time decrement, and the number of bidders. Information (e.g., client rating, current bid, time left to submit a bid, number of bidders, and/or the like) may be updated in real-time as new information is generated (e.g., new client rating FIG. 9JJ illustrates an example user interface listing an activity summary for multiple submitted client cases for which auctions have not yet been scheduled, including the case type/specialty and the starting bid. A case details control may be provided which when activated causes additional case details to be accessed and presented (e.g., including some or all of the case information previously submitted by the client). FIG. 9KK illustrates an example user interface listing an activity summary for multiple client cases for which auctions have been scheduled but have not yet begun, including the case type/specialty, the scheduled auction date and time, and the starting bid. A "case details" control may be provided which when activated causes additional case details to be accessed and presented (e.g., including some or all of the case information previously submitted by the client).

FIG. 9LL illustrates an example user interface listing an activity summary for multiple client cases for which auctions have completed, including the case type/specialty, the identifier of the attorney that won the auction, the auction start date, the auction end date, the starting bid/budget, and the winning bid. A "case details" control may be provided which when activated causes additional case details to be accessed and presented (e.g., including some or all of the case information previously submitted by the client and the auction activity).

FIG. 9MM illustrates an example case detail user interface including the title of the case, the case type, when the case was submitted by the client, other information and documents provided by the client when submitting the case, and case activity (e.g., winning bid, time decrement, bid decrement, auto bids scheduled, number of invitations sent, number of unanswered invitations, and the like). A control may be provided via which the client can initiate contact with the attorney that won the auction for the case (e.g., via email, text message, VoIP, and the like).

FIG. 9NN illustrates another example case activity user interface that provides case activity information and which may be populated via the system database. In this example, the user interface provides, for a given case, the case specialty/practice area, when the auction started, when the auction ended, the starting budget/bid specified by the client, the winning bid amount, the amount saved (e.g., the starting budget minus the winning bid as calculated by the system), and the status (e.g., completed, incomplete, or no bids received).

FIG. 9OO illustrates an example client profile user interface which may be populated via the system database. The example user interface may include a photograph, video, and/or avatar of the client, an indication how long the client has had an account with the system, the client name, time zone, rating, number of reviews received, contact information, case statistics (e.g., how many cases: submitted, scheduled for auction, rejected (e.g., no bids), in-progress (attorney working on case), completed, won (and the type of case won); how much the client spent on attorney fees, and the amount saved/earned (e.g., the sum of all the client-specified budgets for cases awarded to an attorney via an auction, minus the sum of the corresponding finals bids)).

Thus, systems and methods are disclosed for collecting, processing, and distributing information using kiosks and/or user terminals.

Thus, there is currently a technical deficiency in the computer architecture and related software in the areas discussed above. For example, currently there is not a technological solution to the problem of providing anonymized data to multiple systems, providing a simplified overview of certain types of data, and/or providing an interactive functionality for updating associations of data. Further, there currently there is not a technological solution to the problem of collecting from and providing data to a user in a weather adverse area. These problems are addressed by the systems and methods discussed herein. For example, this specification describes certain specific embodiments of a system and user interfaces that allow a user to view data and images from multiple users and possibly multiple programming environments, filtered and/or sorted based on user criteria, among other features that address the technological shortcomings in the technical field. Further, certain embodiments provide a weather resistant kiosk system via which data may be received and provided.

Furthermore, various embodiments discussed herein include interactive user interfaces that improve the functioning of the basic display function of the computer itself. These interactive user interfaces improve the ability of the computer to display information and interact with the user, such as by allowing a user to quickly and easily view and/or provide updates to artifacts. Such user interfaces further inhibit a user's ability to submit erroneous data (e.g., invalid bids, incorrect electronic addresses, etc.). Design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.). The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, a data and image processing system.

The systems, methods, and media discussed herein may involve processing large pluralities of data that could not be done by a human. For example, a log of data and communications, and related metadata, may include hundreds of thousands, millions, tens of millions, hundreds of millions, or even billions of data items, and may consume significant storage and/or memory. Parsing of such data, selecting data relevant to a particular user, providing the optimized user interface displays of portions of the data, etc. as well as other processes described herein, cannot feasibly be performed manually, especially in a time frame (e.g., real-time or near real-time in response to a user's request for artifact data) in which the artifact information may be provided or updated to adequately address the technological problems noted above.

Certain embodiments may be implemented via hardware, software stored on media, or a combination of hardware and software. For example, certain embodiments may include software/program instructions/modules stored on tangible, non-transitory computer-readable medium (e.g., magnetic memory/discs, optical memory/discs, RAM, ROM, FLASH memory, other semiconductor memory, etc.), accessible by one or more computing devices configured to execute the software (e.g., servers or other computing device including one or more processors and comprising hardware, wired and/or wireless network interfaces (e.g., cellular, Wi-Fi, Bluetooth, T1, DSL, cable, optical, or other interface(s) which may be coupled to the Internet), content databases, customer account databases, etc.). Data stores (e.g., comprising databases) may be used to store some or all of the information discussed herein in memory. The results of the disclosed processed may be stored in a relational databases and/or flat file system.

By way of example, a database may optionally be an SQL (Structured Query Language), NoSQL, or NewSQL database. The NoSQL database may provide faster performance, does not require fixed table schemas, stores de-normalized data (e.g., to reduce or prevent join operations), and may be scaled horizontally. A NewSQL database may combine certain advantages of a NOSQL database with those of an SQL database.

By way of example, a given computing device may optionally include user interface devices, such as some or all of the following: one or more displays, keyboards, touch screens, speakers, microphones, mice, track balls, touch pads, tilt sensors, accelerometers, biometric sensors (e.g., fingerprint or face recognition sensors for authenticating a user) printers, etc. The computing device may optionally include a media read/write device, such as a CD, DVD, Blu-ray, tape, magnetic disc, semiconductor memory, or other optical, magnetic, and/or solid state media device. A computing device, such as a user terminal, may be in the form of a general purpose computer, a personal computer, a laptop, a tablet computer, a mobile or stationary telephone, an interactive television, a set top box coupled to a display, etc. Certain embodiments may be able to conduct hundreds (or more) of transactions and processes described herein within a second.

While certain embodiments may be illustrated or discussed as having certain example components, additional, fewer, or different components may be used. Processes described as being performed by a given system may be performed by a user terminal or other system or systems. Processes described as being performed by a user terminal may be performed by another system. Data described as being accessed from a given source may be stored by and accessed from other sources. Transmissions described herein may be via a wired and/or wireless network or other communications link. Further, with respect to the processes discussed herein, various states may be performed in a different order, not all states are required to be reached, and fewer, additional, or different states may be utilized.

User interfaces described herein are optionally presented (and user instructions may be received) via a user computing device using a browser, other network resource viewer, or otherwise. For example, the user interfaces may be presented (and user optionally instructions received) via an application (sometimes referred to as an "app"), such as a dedicated app configured specifically for accident reporting and/or communications activities, installed on the user's mobile phone, laptop, pad, desktop, television, set top box, phone, or other terminal. For example, an app may be downloaded to a user mobile device, such as a smart phone. Various features described or illustrated as being present in different embodiments or user interfaces may be combined into the same embodiment or user interface or separated into additional user interfaces. The example user interfaces illustrated herein need not be used. The user voice communications discussed herein may optionally be processed in whole or in part by a voice recognition system in the content of an interactive voice response system. The user voice communication may optionally be responded to by the interactive voice response system or a human agent.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. Further, embodiments may include several novel features, no single one of which is solely responsible for the embodiment's desirable attributes or which is essential to practicing the systems, devices, methods, and techniques described herein. In addition, various features of different embodiments may be combined to form still further embodiments. For example, aspects found in different user interfaces may be combined to form still further user interface.

What is claimed is:

1. A system, comprising:
a network interface;
a content processing component comprising one or more computing devices configured to execute specific instructions, the content processing component operable to:
receive via the network interface, from a terminal associated with a first service provider, service provider information, including a least:
a first certification identifier for a certification of a first type;
an identifier for an issuer of the certification of the first type;
an address of a physical location;
analyze the identifier for the issuer of the certification of the first type and identify an electronic address associated with a remote data store of the issuer, wherein when the received identifier for the issuer of the certification of the first type does not match an actual name of the issuer of the certification of the first type, a disambiguation process is performed comprising a comparison of the received identifier with one or more aliases associated with the issuer of the certification to identify a match;
access the remote data store associated with the issuer using the electronic address;
initiate a search of the remote data store associated with the issuer of the certification for a data record corresponding to the service provider using the first certification identifier;
determining whether a data record corresponding to the first certification identifier and/or the service provider has been located by the search of the remote data store associated with the issuer of the certification;
in response to a determination that a data record corresponding to the first certification identifier and/or the service provider has been located by the search of the remote data store associated with the issuer of the certification, causing a printer to print a unique code on a first physical carrier;
cause the first physical carrier to be transported to the address of the physical location;
determine whether the unique code has been received via a first user interface;
at least partly in response to a determination that the unique code has been received via the first user interface:
enable the service provider to access a data store of user-reported incidents, wherein a given user-reported incident is associated with a user requesting related services;
enable the service provider to request electronic notifications regarding user-reported incidents;
determine that a first user-reported incident has been received from a user device;
determine whether the certification associated with the service provider certifies that service provider is eligible to provide the services requested by the user;
at least partly in response to a determination that the certification associated with the service provider certifies that service provider is eligible to provide the services requested by the user, automatically transmit a notification to the service provider regarding the first user-reported incident, the notification comprising:
a start time for a reverse auction for providing the user with a service related to the first user-reported incident,
a bid decrement amount, and a bid period, wherein the bid period corresponds to an amount of time in which the service provider can submit a bid after a bid is received from another service provider;
wherein the notification is generated and transmitted prior to the start time;
receive a request comprising a Uniform Resource Locator for a first document from a device of the service provider;
transmit a public key to the service provider device;
receive an encrypted symmetric encryption key from a service provider device, the encrypted symmetric encryption key encrypted using the public key;
decrypt the symmetric encryption key using a private key;
use the symmetric encryption key to decrypt the Uniform Resource Locator for the first document;
provide the requested first document associated with the decrypted Uniform Resource Locator to the service provider device;
wherein providing the first document comprises providing a user interface for receiving a bid request;
in response to receipt of a first bid request from the service provider, calculate a first bid amount based at least in part on the bid decrement amount and on a current bid amount or a starting bid amount,
transmit in real-time the calculated first bid amount to destinations associated with one or more other service providers;
determine whether a subsequent bid request was received within the bid period, the bid period beginning when the first bid request is received;
at least partly in response to a determination that subsequent bid request was not received within the bid period:
terminate the auction; and
transmit to a terminal associated with the user the calculated first bid amount in association with information regarding the first service provider;
at least partly in response to a determination that subsequent bid request was received within the bid period, enable other service providers to submit additional bids; and
after termination of the auction, generate and transmit a notification to the user, the notification including a link to data regarding a service provider that won the auction.

2. The system as defined in claim 1, wherein the content processing component is operable to:
anonymize user-submitted information regarding at least one user-reported incident by at least identifying and redacting information that comprises personally identifying information;
provide the anonymized user-submitted information to a plurality of service providers; and
provide a non-anonymized version of the user-submitted information regarding the at least one user-reported incident to a service provider having a lowest bid to provide corresponding services in a corresponding reverse auction.

3. The system as defined in claim 1, wherein the content processing component is operable to verify a phone number submitted by at least one service provider by transmitting a message to the phone number and determining if the at least one service provider took a first action after the message was transmitted, and at least partly in response to determining that the at least one service provider failed to take the first action after the message was transmitted, inhibiting the at least one service provider from utilizing a least a first service provided by the system.

4. The system as defined in claim 1, further comprising a database that provides index-free adjacency, where a given element in the database contains a direct link to its adjacent element, the database configured to store at least service provider data.

5. The system as defined in claim 1, wherein the content processing component is operable to track communications between service providers and clients and to generate a log of such communications including an indication as to which auction a given communication is associated with.

6. The system as defined in claim 1, wherein the content processing component is operable to provide the user interface for receiving a bid request, the user interface including a bid request control, static data and dynamic data, the dynamic data updated in real-time, the static data including: a respective bid decrement amount, a respective bid period, a matter title, and location information associated with the matter;
the dynamic data including: a current bid amount, and a time left to bid;
wherein in response to a given service provider activating the bid request control, the system is configured to calculate a new bid amount calculated based on a respective current bid and the respective bid decrement amount, thereby preventing the given service provider from submitting an invalid bid amount.

7. The system as defined in claim 1, wherein the content processing component is operable to dynamically determine a compression level for a document submitted by a given user based at least in part on the document type.

8. The system as defined in claim 1, wherein the content processing component is operable to disambiguate identifiers for issuers of the certification of the first type submitted by service providers to identify which entity a given service provider is intending to refer to.

9. The system as defined in claim 1, wherein the certification identifier comprises a bar number.

10. A computer implemented method comprising:
receiving via a network interface, from a terminal associated with a first service provider, service provider information, including a least:
a first certification identifier for a certification of a first type;
an identifier for an issuer of the certification of the first type;
an address;
analyzing, using a computer system comprising hardware, the identifier for the issuer of the certification of the first type and identify an electronic address associated with a remote data store of the issuer, wherein when the received identifier for the issuer of the certification of the first type does not match an actual name of the issuer of the certification of the first type, a disambiguation process is performed comprising a comparison of the received identifier with one or more aliases associated with the issuer of the certification to identify a match;
accessing, by the computer system, the remote data store associated with the issuer using the electronic address;
initiating, by the computer system, a search of the remote data store associated with the issuer of the certification for a data record corresponding to the service provider using the first certification identifier;
determining, by the computer system, whether a data record corresponding to the first certification identifier and/or the service provider has been located by the search of the remote data store associated with the issuer of the certification;
at least partly in response to determining the data record corresponding to the first certification identifier and/or the service provider has been located, enabling the service provider to access a data store of user-reported incidents, wherein a given user-reported incident is associated with a user requesting related services;
enabling the service provider to request electronic notifications regarding user-reported incidents;
determine whether a certification associated with the service provider certifies that service provider is eligible to provide a service related to a first user-reported incident;
at least partly in response to a determination that the certification associated with the service provider certifies that service provider is eligible to provide the service related to a first user-reported incident, transmitting, by the computer system, a notification to the service provider regarding the first user-reported incident, the notification comprising:
a start time for a reverse auction for providing a user with a service related to the first user-reported incident,
a bid decrement amount, and
a bid period, wherein the bid period corresponds to an amount of time in which the service provider can submit a bid after a bid is received from another service provider;
wherein the notification is generated and transmitted prior to the start time;
receive a request comprising a Uniform Resource Locator for a first document from a device of the service provider;
transmit a public key to the service provider device;
receive an encrypted symmetric encryption key from a service provider device, the encrypted symmetric encryption key encrypted using the public key;
decrypt the symmetric encryption key using a private key;
use the symmetric encryption key to decrypt the Uniform Resource Locator for the first document;
provide the requested first document associated with the decrypted Uniform Resource Locator to the service provider device;
wherein providing the first document comprises providing a user interface for receiving a bid request;
in response to receipt of a first bid request from the service provider, calculating, by the computer system, a first bid amount based at least in part on the bid decrement amount and on a current bid amount or a starting bid amount;
transmitting, by the computer system, in real-time the calculated first bid amount to destinations associated with one or more other service providers;
determining, by the computer system, whether a subsequent bid request was received within the bid period, the bid period beginning when the first bid request is received;
at least partly in response to a determination that subsequent bid request was not received within the bid period:

terminating the auction; and
transmitting, by the computer system, to a terminal associated with the user the calculated first bid amount in association with information regarding the first service provider;
at least partly in response to a determination that subsequent bid request was received within the bid period, enabling, by the computer system, other service providers to submit additional bids for at least another bid period; and
after termination of the auction, generating and transmitting a notification to the user, the notification including a link to data regarding a service provider that won the auction.

11. The method as defined in claim 10, the method further comprising:
anonymizing user-submitted information regarding at least one user-reported incident;
providing the anonymized user-submitted information to a plurality of service providers; and
providing a non-anonymized version of the user-submitted information regarding the at least one user-reported incident to a service provider having a lowest bid to provide corresponding services in a corresponding reverse auction.

12. The method as defined in claim 10, the method further comprising verifying a phone number submitted by at least one service provider by transmitting a message to the phone number and determining if the at least one service provider took a first action after the message was transmitted, and at least partly in response to determining that the at least one service provider failed to take the first action after the message was transmitted, inhibiting the at least one service provider from utilizing a least a first service provided by the system.

13. The method as defined in claim 10, the method further comprising utilizing a database that provides index-free adjacency, where a given element in the database contains a direct link to its adjacent element, to store at least service provider data.

14. The method as defined in claim 10, the method further comprising tracking communications between service providers and clients and to generate a log of such communications including an indication as to which auction a given communication is associated with.

15. The method as defined in claim 10, the method further comprising providing the user interface for receiving a bid request, the user interface including a bid request control, static data and dynamic data, the dynamic data updated in real-time,
the static data including: a respective bid decrement amount, a respective bid period, a matter title, and location information associated with the matter;
the dynamic data including: a current bid amount, and a time left to bid;
wherein in response to a given service provider activating the bid request control, a new bid amount is calculated based on a respective current bid and the respective bid decrement amount, thereby preventing the given service provider from submitting an invalid bid amount.

16. The method as defined in claim 10, the method further comprising dynamically determining a compression level for a document submitted by a given user based at least in part on the document type.

17. A computer-readable, non-transitory storage medium storing computer executable instructions that, when executed by one or more computing devices, configure the one or more computing devices to perform operations comprising:
receiving via a network interface, from a terminal associated with a first service provider, service provider information, including a least:
a first certification identifier for a certification of a first type;
an identifier for an issuer of the certification of the first type;
an address;
analyzing, using a computer system comprising hardware, the identifier for the issuer of the certification of the first type and identifying an electronic address associated with a remote data store of the issuer, wherein when the received identifier for the issuer of the certification of the first type does not match an actual name of the issuer of the certification of the first type, a disambiguation process is performed comprising a comparison of the received identifier with one or more aliases associated with the issuer of the certification to identify a match;
accessing the remote data store associated with the issuer using the electronic address; initiating, by the computer system, a search of the remote data store associated with the issuer of the certification for a data record corresponding to the service provider using the first certification identifier;
determining whether a data record corresponding to the first certification identifier and/or the service provider has been located by the search of the remote data store associated with the issuer of the certification;
at least partly in response to determining the data record corresponding to the first certification identifier and/or the service provider has been located, enabling the service provider to access one or more services related to user-reported incidents, wherein a given user-reported incident is associated with a user requesting related services;
enabling the service provider to request electronic notifications regarding user-reported incidents;
determine whether a certification associated with the service provider certifies that service provider is eligible to provide a service related to a first user-reported incident;
at least partly in response to a determination that the certification associated with the service provider certifies that service provider is eligible to provide the service related to a first user-reported incident, transmitting a notification to the service provider regarding a first user-reported incident, the notification comprising:
a start time for a reverse auction for providing a user with a service related to the first user-reported incident,
a bid decrement amount, and
a bid period, wherein the bid period corresponds to an amount of time in which the service provider can submit a bid after a bid is received from another service provider;
wherein the notification is generated and transmitted prior to the start time;
receive a request comprising a Uniform Resource Locator for a first document from a device of the service provider;
transmit a public key to the service provider device;

receive an encrypted symmetric encryption key from a service provider device, the encrypted symmetric encryption key encrypted using the public key;

decrypt the symmetric encryption key using a private key;

use the symmetric encryption key to decrypt the Uniform Resource Locator for the first document;

provide the requested first document associated with the decrypted Uniform Resource Locator to the service provider device;

wherein providing the first document comprises providing a user interface for receiving a bid request;

in response to receipt of a first bid request from the service provider, calculating a first bid amount based at least in part on the bid decrement amount and on a current bid amount or a starting bid amount;

transmitting in real-time the calculated first bid amount to destinations associated with one or more other service providers;

determining whether a subsequent bid request was received within the bid period, the bid period beginning when the first bid request is received;

at least partly in response to a determination that subsequent bid request was not received within the bid period:

terminating the auction; and transmitting to a terminal associated with the user the calculated first bid amount in association with information regarding the first service provider;

at least partly in response to a determination that subsequent bid request was received within the bid period, enabling other service providers to submit additional bids for at least another bid period; and after termination of the auction, generating and transmitting a notification to the user, the notification including a link to data regarding a service provider that won the auction.

18. The storage medium as defined in claim 17, the operations further comprising:

anonymizing user-submitted information regarding at least one user-reported incident;

providing the anonymized user-submitted information to a plurality of service providers; and providing a non-anonymized version of the user-submitted information regarding the at least one user-reported incident to a service provider having a lowest bid to provide corresponding services in a corresponding reverse auction.

19. The storage medium as defined in claim 17, the operations further comprising verifying a phone number submitted by at least one service provider by transmitting a message to the phone number and determining if the at least one service provider took a first action after the message was transmitted, and at least partly in response to determining that the at least one service provider failed to take the first action after the message was transmitted, inhibiting the at least one service provider from utilizing a least a first service provided by the system.

20. The storage medium as defined in claim 17, the operations further comprising utilizing a database that provides index-free adjacency, where a given element in the database contains a direct link to its adjacent element, to store at least service provider data.

21. The storage medium as defined in claim 17, the operations further comprising tracking communications between service providers and clients and to generate a log of such communications including an indication as to which auction a given communication is associated with.

22. The storage medium as defined in claim 17, the operations further comprising providing the user interface for receiving a bid request, the user interface including a bid request control, static data and dynamic data, the dynamic data updated in real-time, the static data including: a respective bid decrement amount, a respective bid period, a matter title, and location information associated with the matter;

the dynamic data including: a current bid amount, and a time left to bid;

wherein in response to a given service provider activating the bid request control, a new bid amount is calculated based on a respective current bid and the respective bid decrement amount, thereby preventing the given service provider from submitting an invalid bid amount.

* * * * *